United States Patent [19]

Inoue et al.

[11] Patent Number: 5,739,968
[45] Date of Patent: Apr. 14, 1998

[54] RECORDING/PLAYBACK APPARATUS FOR DIVIDING ENCODED DIGITAL VIDEO DATA INTO ESSENTIAL INFORMATION AND HIGH-PRECISION INFORMATION AND FOR RECORDING BOTH THE HIGH-PRECISION INFORMATION ONTO A MAGNETIC TAPE

[75] Inventors: Sadayuki Inoue; Junko Ishimoto; Haruhisa Inoue; Ken Onishi, all of Nagaokakyo, Japan

[73] Assignee: Mitsubishi Denki Kabushiki Kaisha, Tokyo, Japan

[21] Appl. No.: 575,035

[22] Filed: Dec. 19, 1995

Related U.S. Application Data

[62] Division of Ser. No. 106,722, Aug. 16, 1993, Pat. No. 5,499,144.

[30] Foreign Application Priority Data

| Aug. 24, 1992 | [JP] | Japan | 4-224084 |
| Dec. 1, 1992 | [JP] | Japan | 4-321676 |
| Jul. 15, 1993 | [JP] | Japan | 5-175363 |

[51] Int. Cl.[6] .............................. G11B 5/09; G11B 5/584
[52] U.S. Cl. .................. 360/48; 360/18; 360/73.04; 386/78; 386/68
[58] Field of Search .................. 360/10.1–10.3, 360/73.01, 73.04, 73.05, 77.12–77.14, 78.02, 70, 48, 18, 33.1; 358/312, 335; 386/6–8, 33, 68, 78, 111, 112, 109, 69

[56] References Cited

U.S. PATENT DOCUMENTS

| 4,361,857 | 11/1982 | Sakamoto | 360/10.2 |
| 4,370,685 | 1/1983 | Hosoi et al. | 360/77.16 X |
| 4,656,539 | 4/1987 | Sugiki et al. | 360/18 X |
| 4,740,845 | 4/1988 | Kashida et al. | 360/48 |
| 4,956,730 | 9/1990 | Arai et al. | 360/70 |
| 5,057,949 | 10/1991 | Suga et al. | 360/70 |
| 5,136,391 | 8/1992 | Minami | 360/32 X |
| 5,231,487 | 7/1993 | Hurley et al. | 386/33 X |
| 5,301,070 | 4/1994 | Tanaka | 360/10.3 |
| 5,309,290 | 5/1994 | Sugiyama et al. | 360/32 |
| 5,319,500 | 6/1994 | Yu | 360/70 X |
| 5,337,194 | 8/1994 | Wilkinson et al. | 360/33.1 |
| 5,359,462 | 10/1994 | Park et al. | 360/10.2 |
| 5,377,051 | 12/1994 | Lane et al. | 360/10.3 |
| 5,418,623 | 5/1995 | Park | 386/68 |
| 5,434,716 | 7/1995 | Sugiyama et al. | 360/32 |
| 5,477,397 | 12/1995 | Naimpally et al. | 360/18 X |

FOREIGN PATENT DOCUMENTS 2117455  1/1992  Japan.

*Primary Examiner*—Aristotelis M. Psitos
*Assistant Examiner*—Larry T. Cullen

[57] ABSTRACT

In a magnetic recording/playback apparatus for recording and playing back a digital video signal on a helical track of a magnetic tape using two or more rotary heads, the playback image at the time of high-speed playback is improved by setting the tape travel speed at the time of high-speed playback at an even multiple of a normal playback speed. Further, a tracking phase is offset by one half the track pitch with respect to the tracking during normal speed playback. Alternatively, essential information of the information having been high-efficiency coded is recorded in the central part, and near the ends of the tracks, while high-precision information is recorded in intermediate parts intermediate between the central part and the parts near the ends. Still alternatively, the video data of one of the consecutive fields is recorded in the central part of the tracks and the video data of the other of the consecutive fields is recorded near the ends of the tracks.

20 Claims, 55 Drawing Sheets

TAPE TRAVEL ←

HEAD SCAN

|← 1 SCAN PERIOD →|

TIME →

TIME →

TAPE TRAVEL

HEAD SCAN

1 SCAN PERIOD

TIME

TIME

← PLAYBACK SIGNAL FROM TRACK A1

← PLAYBACK SIGNAL FROM TRACK A1

← PLAYBACK SIGNAL FROM TRACK A1

← PLAYBACK SIGNAL FROM TRACK A1

PLAYBACK SIGNAL FROM TRACK A1

ODD FIELD

| o1 | o2 | o3 | o4 |
|----|----|----|----|
| o5 | o6 | o7 | o8 |
| o9 | o10 | o11 | o12 |
| o13 | o14 | o15 | o16 |
| o17 | o18 | o19 | o20 |

EVEN FIELD

| e1 | e2 | e3 | e4 |
|----|----|----|----|
| e5 | e6 | e7 | e8 |
| e9 | e10 | e11 | e12 |
| e13 | e14 | e15 | e16 |
| e17 | e18 | e19 | e20 |

← PLAYBACK SIGNAL FROM TRACK A1

← PLAYBACK SIGNAL FROM TRACK B1

← PLAYBACK SIGNAL FROM TRACK A1

PERIPHERAL PORTION

FIVE-TIME SPEED

EIGHT-TIME SPEED

← PLAYBACK SIGNAL FROM TRACK A1

FIG. 56A
PRIOR ART
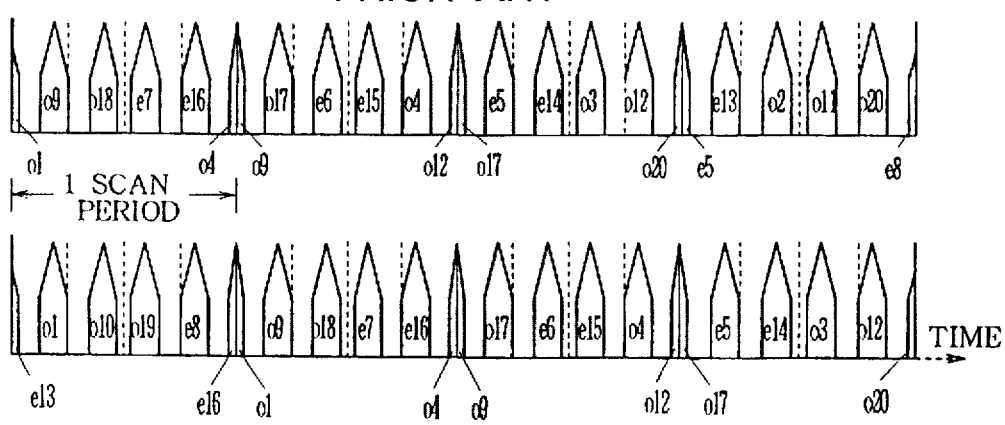
FIG. 56B
PRIOR ART
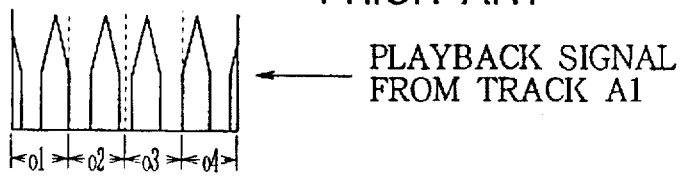
← PLAYBACK SIGNAL FROM TRACK A1
FIG. 56C
PRIOR ART
ODD FIELD      EVEN FIELD
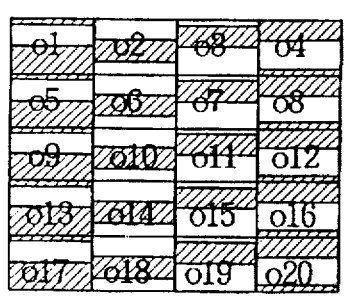 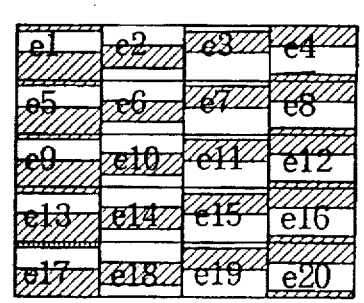
SYNTHETIC IMAGE
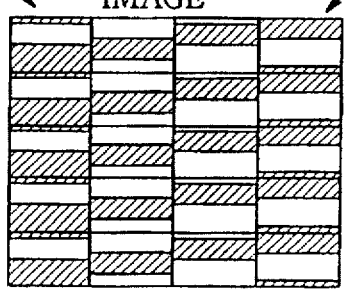

RECORDING/PLAYBACK APPARATUS FOR DIVIDING ENCODED DIGITAL VIDEO DATA INTO ESSENTIAL INFORMATION AND HIGH-PRECISION INFORMATION AND FOR RECORDING BOTH THE HIGH-PRECISION INFORMATION ONTO A MAGNETIC TAPE

This application is a divisional of application Ser. No. 08/106,722 filed on Aug. 16, 1993, now U.S. Pat. No. 5,499,144, the entire contents of which are hereby incorporated by reference.

BACKGROUND OF THE INVENTION

The present invention relates to a magnetic recording/playback apparatus for recording and/or playing back digital video signals, and particularly to the recorded data arrangement and the playback of this recorded data in order to obtain good quality high speed playback pictures.

Accompanying the trend in recent years toward large screen size for consumer color television receivers, progress has continued toward higher picture quality in video signal recording/playback media.

Also, as storage media for recording and playing back high quality images, many firms are developing a digital magnetic recording/playback apparatus (referred to below as digital VTR) for consumer use wherein the video signal is digitized and the band compressed (high-efficiency encoded) when performing recording and/or playback.

A prior art digital VTR recoding/playback system for consumer use is described in the IEEE Transactions on Consumer Electronics, Vol. 34, No. 3, Pages 597 to 605 titled "An Experimental Digital VCR with 40 mm Drum, Single Actuator and DCT-based Bit-rate Reduction" relating to a recording/playback system of Philips.

The block diagram of the recording system of a prior art consumer use digital VTR is shown in FIG. 41. As illustrated it is provided with an input 1a for the luminance signal Y and two additional inputs 1b and 1c for chrominance signals CR and CB. A/D converters 2a to 2c are used to convert signals from analog to digital form. A high-efficiency encoder 3 performs high-efficiency encoding of the input luminance signal Y and chrominance signals CR and CB. An error correction encoder 4 adds, to the outputs of the high-efficiency encoder 3, an error detection code used for correcting or detecting errors generated during playback. Digital modulators 5a and 5b apply digital modulation to the data outputs from the error correction encoder 4. Sync adders 6a and 6b add synchronization and ID signals. Further provided are recording amplifiers 7a and 7b to amplify the output of the sync adders 6a and 6b, and rotary heads 8a and 8b are used for magnetic recording and/or playback on a magnetic tape 9.

The block diagram of the playback system of a prior art consumer use digital VTR is shown in FIG. 42. As illustrated, it is provided with members 8 and 9 which are the same as those with identical reference numerals. Head amplifiers 10a and 10b amplify the signals played back by the rotary heads 8a and 8b. Data detectors 11a and 11b detect the data from the playback signals and detect and correct jitter in the playback signals. Digital demodulators 12a and 12b demodulate the outputs of the data detectors 11a and 11b. An error correction decoder 13 detects and corrects errors in the playback signal. A high-efficiency decoder 14 performs high-efficiency decoding of the error correction decoder 13 for restoring the video signal. D/A converters 15a to 15c convert digital signals into analog form. The outputs of the D/A converters 15a to 15c are output via output terminals 16a to 16c.

FIG. 43 shows a block diagram of a prior art high-efficiency encoder 3 provided in a magnetic recording/playback apparatus. As shown in the figure, this high-efficiency encoder 3 comprises field memories 17a and 17b, a DCT circuit 18, an adaptive quantizer 19, a variable length encoder 20, a buffer memory 21, and a buffer controller 22. The DCT circuit 18 performs two-dimensional discrete cosine transform (two-dimensional DCT) with respect to block data from field memories 17a and 17b.

An adaptive quantizer 24 quantizes the coefficients obtained by transformation by the DCT circuit. The variable length encoder 20 performs variable length encoding of the output of the adaptive quantizer 19. The buffer memory 21 is used for converting the output of the variable length encoder 20 into a fixed rate output. The buffer controller 22 changes the quantizing parameters of the adaptive quantizer 19 in order to avoid overflow of the buffer memory 21 and selects the components which are to be encoded by the variable length encoder 20.

FIG. 44 shows a high-efficiency decoder 14 provided in the prior art magnetic recording/playback apparatus. As illustrated, the high-efficiency decoder 14 comprises a variable length decoder 23, a buffer memory 24, an inverse adaptive quantizer 25, an inverse DCT circuit, and field memories 27a and 27b.

The variable length decoder 23 converts the variable length encoded data into the original data of the fixed length. The buffer memory 24 provides the data from the variable length decoder 23 at a fixed rate. The inverse DCT circuit 26 (IDCT) performs inverse discrete cosine transform on the data output from the inverse adaptive quantizer 25. Field memories 27a and 27b delay the playback digital signal output from the IDCT 26 by a predetermined amount and decode the blocks formed at the time of recording.

FIG. 45 shows a block diagram of a drum motor and capstan motor control system. As illustrated, this capstan motor control system comprises a motor driver 51, a drum motor controller 52, a control head 53, a capstan controller 54, and a capstan driver 55.

The motor driver 51 produces voltage for driving the drum motor 50. The drum motor controller 52 performs drum motor control on the basis of a reference signal supplied from a central controller 49, and drum PG and FG outputs from the drum motor 50.

The control head 53 reads the control (CTL) signal from the control track of the magnetic tape 9. The capstan motor driver 55 produces the voltage for driving the capstan motor 58. The capstan motor controller 54 uses the CTL signals from the drum motor controller 52 and the control head 53 for controlling the capstan motor 56.

The central controller 49 performs overall control of the digital VTR. For example, in order to perform recording, normal playback and high speed playback in accordance with a manually activated input signal at the manual input section 48, the control signals are sent to the various VTR sections. When selecting normal or high speed playback, the normal or high speed playback instruction signal, and, for a VTR model provided with a plurality of high speed playback speeds, the signal for selecting a desired speed from among these, is applied to the drum motor controller 52 and the capstan controller 54.

Following is a description of the recording format of this digital VTR. FIGS. 46A and 46B are schematic diagrams showing a magnetic tape and drum arrangement relationship and a track pattern formed on the magnetic tape 9 of a prior art magnetic recording/playback apparatus, wherein two-channel combination heads 8a and 8b are utilized for the rotary heads for the respective channels.

FIG. 46A shows the arrangement of two-channel rotary heads on the rotary head drum. The type of arrangement shown in the figure is used for two-channel combination heads. FIG. 46B shows the recording track pattern formed on the magnetic tape 9.

As illustrated, the two-channel rotary heads 8a and 8b are arranged adjacent to each other in a rotary drum 60. During recording, the above-mentioned two-channel recording signals are recorded substantially simultaneously on the magnetic tape 9 by the rotary heads 8a and 8b (see FIG. 46B).

It is customary to refer to the rotary head 8a as the channel A (CH-A in the following) rotary head and the rotary head 8b as the channel B (CH-B in the following) rotary head. The CH-A rotary head 8a and CH-B rotary head 8b possess mutually different azimuth angles. In the figure, A and B indicate the respective recorded tracks Formed by the different rotary heads for the respective channels. In prior art examples, the drum rotating speed is 9,000 rpm. Consequently, since two-channel recording is performed with a prior art example as mentioned above, as indicated in FIG. 46B, one field of video data is distributed among 5 tracks and thus, one frame of video data is distributed among 10 tracks.

Following is a description of the recording system operation with reference to FIG. 41.

The luminance signal Y and two chrominance signals CR and CB input via the input terminals 1a to 1c are converted to digital form by the A/D converters 2a to 2c, and the recording bit rate is reduced by the high-efficiency encoder 3. A detailed description of the high-efficiency encoder operation is given later. At the error correction encoder 4, an error correction (check) code is generated and added to the recording signal data for correcting and detecting errors produced during playback.

In accordance with a predetermined modulation method, the recording digital signal is applied to the digital modulators 5a and 5b, where the low frequency component of the recording signal is suppressed (digital modulation). Sync and ID signals are applied to the digitally modulated recording data by sync signal adders 6a and 6b. After amplifying by the recording amplifiers 7a and 7b, the signals are recorded on the tape 9 via the rotary heads 8a and 8b.

Similarly, following is a description of the playback system operation with reference to FIG. 42.

The two-channel signals played back from the tape 9 by the rotary heads 8a and 8b are amplified by the head amplifiers 10a and 10b. The data detectors 11a and 11b convert the signals into digital data and also absorb jitter (time base error) in the playback signal. The digital demodulators 12a and 12b demodulate the signals to form the playback digital signal, which enters the error correction decoder 13.

At the error correction decoder 13, on the basis of the error correction code added beforehand at the time of recording, errors produced in the playback signal are corrected or detected. The signal is then applied to the high-efficiency decoder 14 for such processing as variable length decoding and inverse DCT, after which the original luminance signal Y and two chrominance signals CR and CB are restored. These are converted to analog form by D/A converters 15a to 15c and sent out via the output terminals 16a to 16c.

Next is a description of the high-efficiency encoder 3 with reference to FIG. 43.

The input luminance signal Y and two chrominance signals CR and CB signals are delayed by a predetermined amount by the field memories 17a and 17b, then formed into blocks. In the block formation, the input signals are first divided among blocks of 8 picture elements by 8 lines. In the prior art example, the blocked luminance signal Y and two chrominance signals CR and CB are time-division multiplexed and applied to the DCT circuit 18, where discrete cosine transform is performed.

When the block picture element data is expressed as X (i, j) (i=0, 1, ..., 7; j=0, ..., 7), the DCT circuit computes 8 DCT points in the horizontal direction as follows.

$$f(0,j) = \frac{1}{\sqrt{8}} \sum_{i=0}^{7} X(i,j) \qquad \text{(Formula 1)}$$

$$f(m,j) = \frac{1}{2} \sum_{i=0}^{7} X(i,j) \cdot \cos\left(\frac{(2 \cdot i + 1) \cdot m \cdot \pi}{16}\right)$$

where $m = 1, \ldots, 7; j = 0, \ldots, 7$.

Then 8 point DCT is performed in the vertical direction with respect to this transformed data f (m, j) (m=0 ..., 7; j=0, ..., 7).

$$F(m,0) = \frac{1}{\sqrt{8}} \sum_{j=0}^{7} f(m,j) \qquad \text{(Formula 2)}$$

$$F(m,n) = \frac{1}{2} \sum_{j=0}^{7} f(m,j) \cdot \cos\left(\frac{(2 \cdot j + 1) \cdot n \cdot \pi}{16}\right)$$

where $n = 1, \ldots, 7; m = 0, \ldots, 7$.

This transform coefficients F (m, n) (m=0, ..., 7; n=0, ..., 7) are output.

The output transform coefficients from the DCT circuit 18 are quantized by the adaptive quantizer 19. The adaptive quantizer 19 possesses a plurality of quantizing tables with different quantizing steps. The quantizing steps are selected in accordance with the transform coefficients of each block and the parameters from the buffer memory 21. For example, a high contrast rising component is coarsely quantized, while a low amplitude detail component is finely quantized. The output of the adaptive quantizer 19 is variable length coded at the variable length encoder 20, and is then stored in the buffer memory 21.

The data stored in the buffer memory 21 are read out at a fixed rate. The buffer controller 22 detects the data stored in the buffer memory 21 and determines the quantizing parameters according to the data amount, and controls the adaptive quantizer 19. The buffer controller 22 also selects the encoding transform coefficients of the variable length encoder 20 from the amount of data amount in the buffer memory 21.

Similarly the operation of the high-efficiency decoder 14 is described below with reference to FIG. 44.

The playback digital signal output from the error correction decoder 13 is applied to the variable length decoder 23 for converting into fixed length data. This fixed length data is read out from the buffer memory 24 at a fixed rate, and is inverse-quantized at the inverse adaptive quantizer 25. It is then sent to the inverse DCT circuit 26, where inverse discrete cosine transform (IDCT) is applied to the input playback digital signal. The playback luminance signal Y and two chrominance signals CR and CB From the IDCT circuit 26 are temporarily stored in the field memories 27a and 27b, and delayed by predetermined amounts. Then, the block processing at the time of recording is decoded and the signals are sent to the D/A converters 15a to 15c.

Next is a description of the drum and capstan motor control system operation during playback with reference to FIG. 45.

During playback, the drum motor controller 52 uses an externally applied input reference signal and the drum PG and FG signal outputs from the drum motor 50 to control rotation of the drum motor 50. The drum controller 52 also produces the reference signal for capstan control during playback. On the basis of the control signal output from the drum motor controller 52, the drum motor driver 51 produces the voltage for driving the drum motor 50.

At the capstan controller 54, the CTL signal output from the control head 53 is used for controlling the tape transport speed, arid the reference signal output from the drum motor controller 52 and the CTL signal are used for controlling the phase of the rotary heads 8a and 8b. The capstan driver 55 produces the voltage for driving the capstan motor 56 on the basis of the control signal output from the capstan controller 54.

Following is a description of the high speed playback operation with the above mentioned digital VTR. As a starting point, investigations using the actual equipment for determining the amount of data obtainable during high speed playback with a digital VTR are described.

The configuration of the error correction codes of the digital VTR used in the investigations is shown in FIG. 47. The code in the recording direction (referred to below as code C1) is a (241, 225, 17) Reed-Solomon code, and the code in the vertical direction (referred to below as code C2) is a (116, 108, 9) Reed-Solomon code. As the recording format, one error correction block composed of the product code format is recorded on one track.

In the measurement for the studies with the actual equipment, since the track data of the playback signal from the rotary heads 8a and 8b is played back intermittently as shown in FIG. 50B, error correction was performed only by the C1 code and not by the C2 code.

The results of the experiment are illustrated in FIGS. 48 and 49. The results of error correction by the code C1 at five-time speed playback are shown in FIG. 48 and for eight-time speed playback are shown in FIG. 49. In this prior art example, code C1 is a Reed-Solomon code with minimum distance 17 and capable of correcting a maximum of 8 errors. In FIGS. 48 and 49, the horizontal axes indicate the corrected error data incidents and the vertical axes indicate their occurring frequency. For example, at five-time speed, the data quantity where the corrected error quantity is 0 (i.e., error absent data) is about 36%.

Actual measurement results confirmed that, when performing high speed playback with a digital VTR, the data of the portion above 50% of the approximate output during normal playback can be correctly restored by error correction. These measurement results were obtained with the rotary heads 8a and 8b tracking adjusted at the lower edge of the tape 9. For a detailed description regarding his point, refer to Okuma, et al., "Measurement of Error Incidents at High-speed Playback in Digital VTR", on 1991 Papers from the Convention (44th Convention) of Kyushuu Branch of Electrical and Related institutes, page 158.

FIG. 50A shows the track pattern and the scanning traces of the two-channel rotary heads 8a and 8b during six-time speed search With the above-mentioned digital VTR. Since the rotary heads possess mutually different azimuth angles, the playback data from the channel rotary head 8a and 8b of the respective channels are as illustrated in the hatched portions of the Figure. FIG. 50B shows, at the upper half, the playback signals obtained by the rotary head 8a. FIG. 50B also shows, at the lower half, the signals which are obtained as correct data through error correction. As indicated in the figure, in one rotary head scanning period, about ½ track (50%) of the video data is obtainable.

In the following description, it is assumed that, on the basis of the above results, if the amplitude of the playback signal at the output of the rotary head is 50% or more of the amplitude of the signal obtained at normal playback, the playback signals is restored as correct data through error correction.

Next is a description of a prior art recording format with reference to FIGS. 51A and 51B. FIG. 51A shows the video data of each field divided into 20 equal blocks according to their positions on the screen, with the blocks numbered according to the order of scanning. FIG. 51B shows the arrangement on the magnetic tape of the video data in each field divided into these blocks.

The blocks described above are termed recording format generating blocks, and are taken as units of recording format generation. In the actual VTR, shuffling is applied to each of the DCT blocks, but for ease of description, the shuffling operation is not included in the following description.

FIG. 52A illustrates the track pattern and the scanning traces of the two-channel rotary heads 8a and 8b when performing six-time speed search with a digital VTR comprising the two-channel combination heads shown in FIGS. 48A and the above-mentioned recording Format. Since the rotary heads possess mutually different azimuth angles, the playback data from the rotary heads 8a and 8b of the respective channels are as indicated by hatched portions in the figure.

The playback signal from rotary head 8a is indicated in FIG. 52B. FIG. 53A shows the signals output by the rotary head 8a and obtained as correct data through error correction during high speed playback.

In the following description, it is assumed that if the amplitude of the playback signals at the output of the rotary head 8a is 50% or more of the amplitude of the playback during normal playback, the playback signal is restored as correct data through error correction.

In FIG. 53A, o1, o2, . . . , o20 and e1, e2, . . . , e20 correspond to the positions on the screen of each field illustrated in FIG. 51A. FIG. 53B shows the playback signals from a First track A1 (the track in which blocks o1 to o4 are recorded) of the odd field shown in FIG. 51B and synthesized by means of the field memory. The playback signals from the other 9 tracks are omitted. FIG. 53C shows the image obtained by synthesis by means of the field memory, on the basis of the video information (shown in FIG. 58A) of each field played back through the rotary heads 8a and 8B. FIG. 53C also shows the composite image obtained by synthesizing the video information of the two fields. The hatched areas in FIG. 53C correspond to the portions where the playback information is restored during six-time speed playback.

Thus, in a VTR possessing the prior art recording format, during six-time speed playback, playback data at certain positions within each block is completely unobtainable, as shown in FIG. 53C, even when the playback data is synthesized using a field memory. The video data at certain positions are therefore never rewritten or renewed, as shown in FIG. 53C, and the quality of the high-speed playback picture is not satisfactory.

FIG. 54A shows a two-channel opposing head arrangement on the rotary drum, which differs from the above-mentioned two-channel combination head arrangement. The recording track pattern formed on the magnetic tape 9 is shown in FIG. 54B.

In the prior art example of FIG. 54A, pairs of two-channel rotary heads 8a and 8b of respective channels are provided adjacent to each other in a rotary drum 60, and are used For recording and playing back from information on a magnetic tape 9. During recording, the recording signals of two channels are substantially simultaneously recorded on the magnetic tape 9 by the rotary heads 8a and 8b (FIG. 54B).

For the purpose of the following description, the rotary head 8a is assumed to be one for channel A (CH-A) and the rotary head 8b is assumed to be one for channel B (CH-B). The CH-A rotary head 8a and CH-B rotary head 8b possess mutually different azimuth angles. The figure also shows the recorded tracks A and B formed by the rotary heads the respective channels CH-A and CH-B. Also, in the prior art example in FIG. 54B, when two-channel opposing heads are used, with two-channel recording being performed by setting the drum rotation to 4500 rpm, one field of video data is divided among 5 tracks, i.e., one frame video data is divided among 10 tacks.

Next, the description is continued assuming that the recording format used in this example is as shown in FIG. 51B, i.e., the same as the recording format used in the previous example in which the two-channel combination heads are used. FIG. 55A shows the track pattern and the scanning traces of the rotary heads 8a and 8b during six-time speed playback with a digital VTR using two-channel opposing heads. FIG. 55B shows the playback signal output pattern from the CH-A rotary head 8a.

FIG. 56A shows the playback output signal from the rotary head 8a during high speed playback, which can be restored as corrected data through error correction. The reference marks o1, o2, . . . , o20 and e1, e2, . . . , e20 correspond to the positions on the screen of the respective fields shown in FIG. 51A. FIG. 56B shows the playback signals blocks 1, 2, 3 and 4 within each field synthesized by using a field memory.

FIG. 56C shows the images obtained by synthesizing the video information of the respective fields obtained through the rotary heads 8a and 8b. A synthetic image obtained by synthesizing the video information of the two fields is also shown. The areas indicated by hatching in FIG. 56C correspond to the part where the playback information is obtained during six-time speed playback.

In the above manner, during six-time speed playback with a VTR using the prior art recording format, since playback data of certain fixed positions are not obtained at all, and the video data of the certain positions are not rewritten or renewed even when the playback data is synthesized using a field memory, so that satisfactory playback picture is not obtained.

Thus, it is seen from FIGS. 56A and 56B, that the use of two-channel opposing heads does not solve the problem in which the playback signals of certain positions are never obtained, and the picture of such certain positions remain unchanged.

In a conventional analog recording VTR for consumer use, by G4 head development, the video data within 1 scanning period can be played back from the track with nearly 100% efficiency. Also, since the video data of 1 field is recorded on 1 track, satisfactory high-speed playback is achieved using the playback signals which are obtained with nearly 100% efficiency within 1 head scanning period. In general, since the playback signal can be obtained with nearly 100% efficiency during 1 scanning period of the rotary heads, use of a field memory is not required for high speed playback.

On the other hand, with a consumer type digital VTR, the problem was encountered in that, since the data played back within 1 scanning period of the rotary head was about 50 as indicated in FIGS. 53A and 56A, playback efficiency was poor. Thus, and when an integer multiple speed was used, the data of certain positions of the track was completely omitted, the data corresponding to the positions on the screen was never rewritten, and satisfactory high speed playback could not be achieved.

SUMMARY OF THE INVENTION

An object of this invention is to resolve the above type of problems by providing a magnetic recording/playback apparatus which enables efficient video data playback from the magnetic tape during high speed playback as well.

According to one aspect of the invention, there is provided magnetic recording/playback apparatus for playing back digital video signals recorded on helical tracks on a magnetic tape using at least two rotary heads, comprising:

rotary speed control means (52) for controlling the rotary speed of the rotary head;

tape travel and tracking control means (54) for controlling the speed of tape travel and controlling the tracking phase at the beginning of tracing on the tape by the rotary heads; and a control circuit (49) for selectively causing normal playback or high-speed playback, and giving a ½ track-pitch offset command to said tape travel and tracking control means (54) at the time of the high speed playback;

wherein said tape travel and tracking control means is responsive to said ½ track-pitch offset command for offsetting the phase of the tracking of the rotary heads by ½ track-pitch with reference to the tracking phase of the tracking during normal playback; and the tape travel speed during the high speed playback is set substantially at an even multiple of a normal playback speed.

With the above configuration, the amount off the video data which is played back per one scanning of the rotary head is increased, and the quality of the high-speed playback image is improved.

The tracking may be so controlled that the playback output from the central part along the longitudinal direction of the recording tracks are fully obtained.

An envelope detecting means (130) may be additionally provided for detecting an envelope of the playback signal obtained by the rotary head, and the tracking may be so controlled as to maximize the output of the envelope detecting means at the central part along the longitudinal direction of the track.

With the above configuration, even where the tracks are not straight due for example of the characteristics of the mechanical system, a maximum output is obtained at the central part of each track.

The control circuit may permit selection of the speeds for the high-speed playback From a double speed and a six-time speed, and said tape travel and tracking control means may be responsive to a command from said control circuit to cause said tape to travel at a speed substantially twice or six times the speed of the normal playback. This will further increase the amount of video data played back per scanning of the rotary head.

According to another aspect of the invention, there is provided a magnetic recording/playback apparatus comprising:

means (3) for collecting digital video data for a plurality of pixels to form blocks, to thereby perform a high-efficiency coding;

means (4, 5a, 5b, 6a, 6b, 7a, 7b) for recording the digital video data onto a magnetic tape using at least two rotary heads ( 8a, 8b);

means (8a, 8b, 11a, 11b, 12a, 12b, 13, 110, 14, 15a, 15b, 15c) for playing back the digital video data using the rotary heads; and recording format generating means (100) for dividing the data having been high-efficiency coded into essential information and high-precision information, and generating a recording format so as to record said essential information at central parts along the longitudinal direction of tracks, and parts near upper and lower ends of the tracks, and to record said high-precision information at intermediate parts positioned between said central part and said parts near upper and lower ends of the tracks.

With the above configuration, at the time of high-speed playback of a relatively low speed when the details of the picture are important, the high-precision information in the DCT blocks are also reproduced, while at the time of high-speed playback of a relatively high speed, when the details of the picture do not matter much, the essential information alone is reproduced, so pictures of satisfactory quality are obtained at either situation.

According to a further aspect of the invention, there is provided a magnetic recording/playback apparatus comprising:

means (7a, 7b, 8a, 8b) for recording digital video data along helical tracks on a magnetic tape;

means (2a, 2b, 2c, 3) for applying a predefined signal processing to said digital video data of each field or frame; and recording format generating means (100) for generating recording format for recording on the tape the video data having been subjected to the signal processing;

wherein said recording format generating means arranges the data such that the recording video data of one of two consecutive fields or frames are recorded in a central part of each recording track and the recording video data of the other of said two consecutive fields or frames are recorded at end parts of each track.

With the above configuration, during high-speed playback, the playback output of the odd and even fields or frames are from positions complementary to each other, so that the contents of the field memories or frame memories are rewritten periodically and the resultant picture does not contain fixed or unchanging parts.

To realize the above described arrangement of data, each track on the magnetic tape may be divided into four regions along the direction of the scanning by the rotary head, and two of said regions are made to form said central part of each track and the remaining two regions are made to form said end parts of each track.

The region of a track in which video data of a certain position in the screen of one of said two consecutive fields or frames and the region of a track in which video data of said certain position in the screen of the other of said two consecutive fields or frames may be separated by at least another region.

With the above arrangement, the video data of the same positions within the screen of consecutive fields or frames are not in the adjacent regions on the said track. The playback output during a high-speed playback of the odd and even fields or frames are of positions complementary to each other, and the contents of the field or frame memories are rewritten periodically, so that the resultant picture does not contain fixed or unchanging parts.

The video data may be arranged such that in the order from one of the upper and lower edges to the other of said upper and lower edges of the tape in regions in the central part of each track, and in the order from said other of said upper and lower edges to said one of said upper and lower edges of the tape in regions at both end parts of each track.

With the above arrangement, the playback output during a high-speed playback of the odd and even fields or frames are of positions complementary to each other, and the contents of the field or frame memories are rewritten periodically, so that the resultant picture does not contain fixed or unchanging parts.

The tape speed during a high-speed playback may be selected substantially at an even multiple of a normal playback speed.

The efficiency of data reproduction is improved.

The tracking control during a high-speed playback may be performed such that the tracking of the rotary heads is adjusted at or near the center of each track.

The efficiency of data reproduction is improved.

The video data may be arranged such that the video data of said two consecutive fields or frames are divided into a plurality of tracks. The video data for the same position on the screen of the two fields or frames are recorded on different tracks. Further, at least part of the data of two consecutive fields or frames are recorded in the same track. Also, the video data at the same position in the consecutive fields or frames are recorded in different tracks.

With the above arrangement, the data is interleaved, and even when one of the heads clogs and is unable to pick up the video data, interpolation is conducted to obtain the lost data using the data of the other field or frame. The degradation in picture quality is thereby minimized.

The video data may be so arranged that each track is divided into 2M (M being a positive integer) regions, and the video data of one of said two consecutive fields or frames are recorded in M of said 2M regions. Further, and the video data of the other of said two consecutive fields or frames are recorded in the remaining M regions.

With the above arrangement, the playback output during a high-speed playback of the odd and even fields or frames are of positions complementary to each other, and the contents of the field or frame memories are rewritten periodically. Thus, the resultant picture does not contain fixed or unchanging parts.

These and other objects of the present invention will become more readily apparent from the detailed description given hereinafter. However, it should be understood that the detailed description and specific examples, while indicating preferred embodiments of the present invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitive of the present invention and wherein:

FIG. 40A is a diagram showing division of the video data of each frame into recording format generating blocks in Embodiment 27;

FIG. 40B is a diagram showing the arrangement, on the magnetic tape, of the data of the recording format generating blocks of FIG. 40A;

FIG. 56A shows the playback signals that can be restored as correct data through error correction when the two-channel opposing heads are used;

FIG. 56B shows the playback signals of blocks which are recorded on one of the tracks and which can be restored as correct data through error correction in the situation described in connection with FIG. 56A; and FIG. 56C shows the positions on the screen of the signals that can be restored as correct data through error correction.

DETAILED DESCRIPTION OF THE PREFERRED EMBODIMENTS

Embodiment 1

Following is a description of a first embodiment. Embodiment 1, off this invention with reference to the attached drawings.

Figure 1:
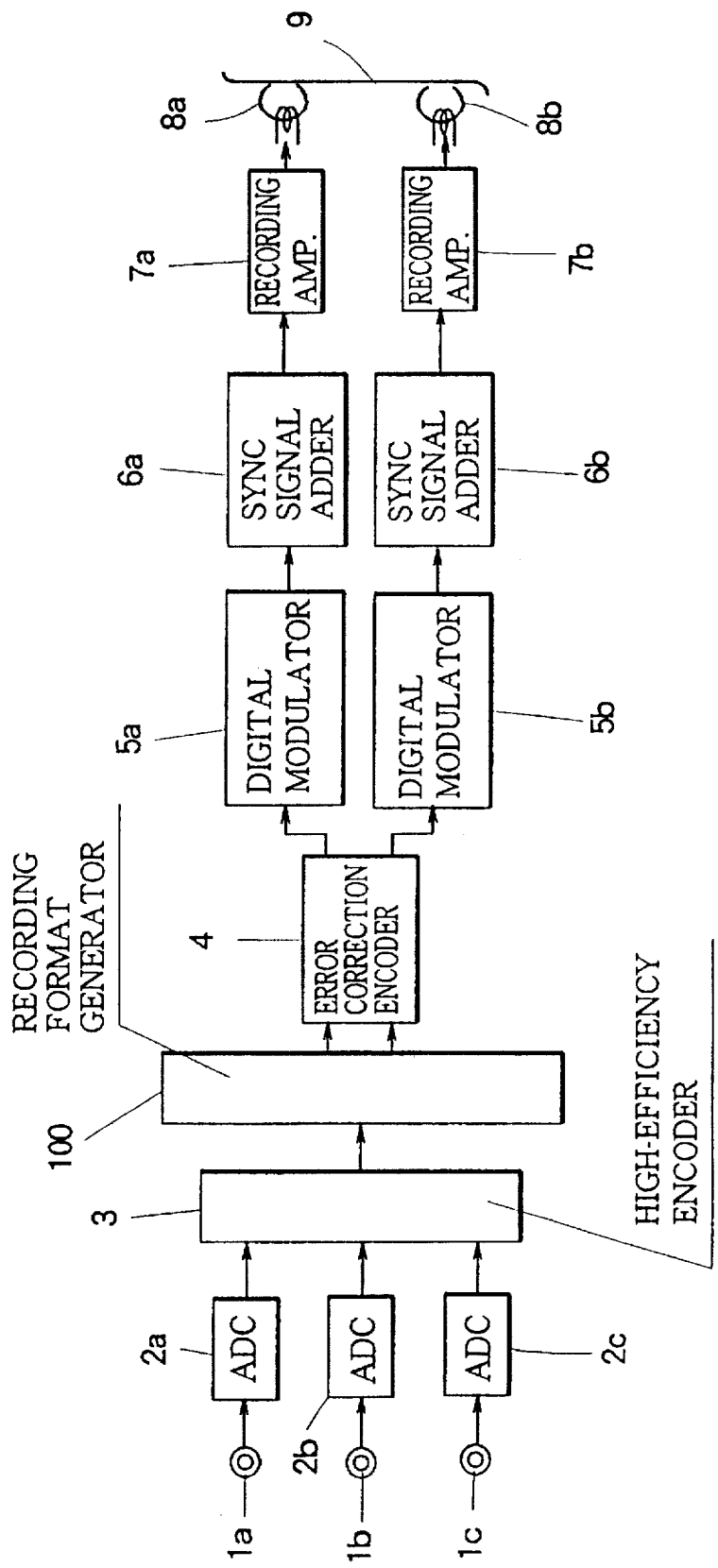
FIG. 1 is a block diagram showing a recording system of a magnetic recording/playback apparatus of Embodiment 1 of the invention.
Figure 41:
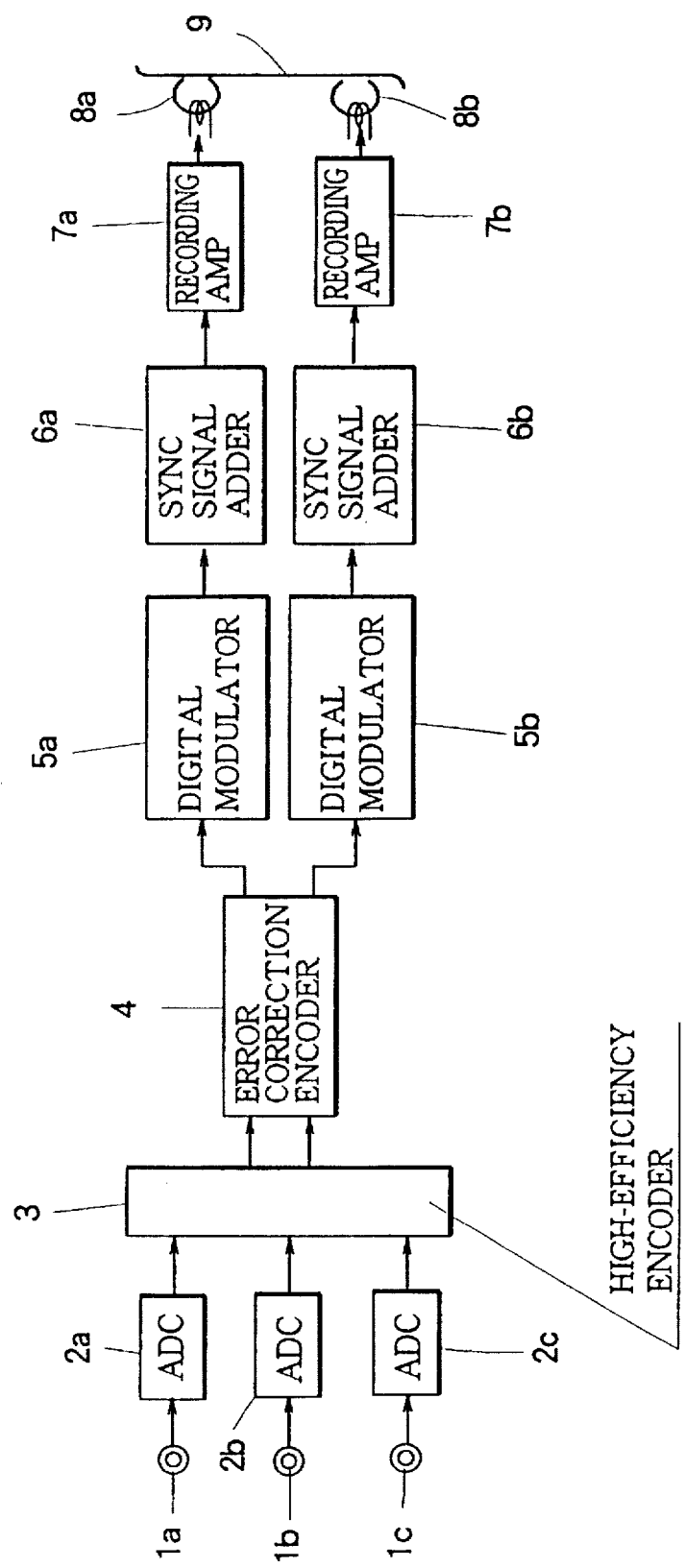
FIG. 41 is a block diagram showing a recording system of a conventional digital VTR.

FIG. 1 shows a recording system of a magnetic recording/playback apparatus in accordance with this first embodiment. Members or circuits identical or corresponding to those in FIG. 41 are denoted by identical reference numerals. The recording system further comprises a recording format generator 100.

Figure 2:
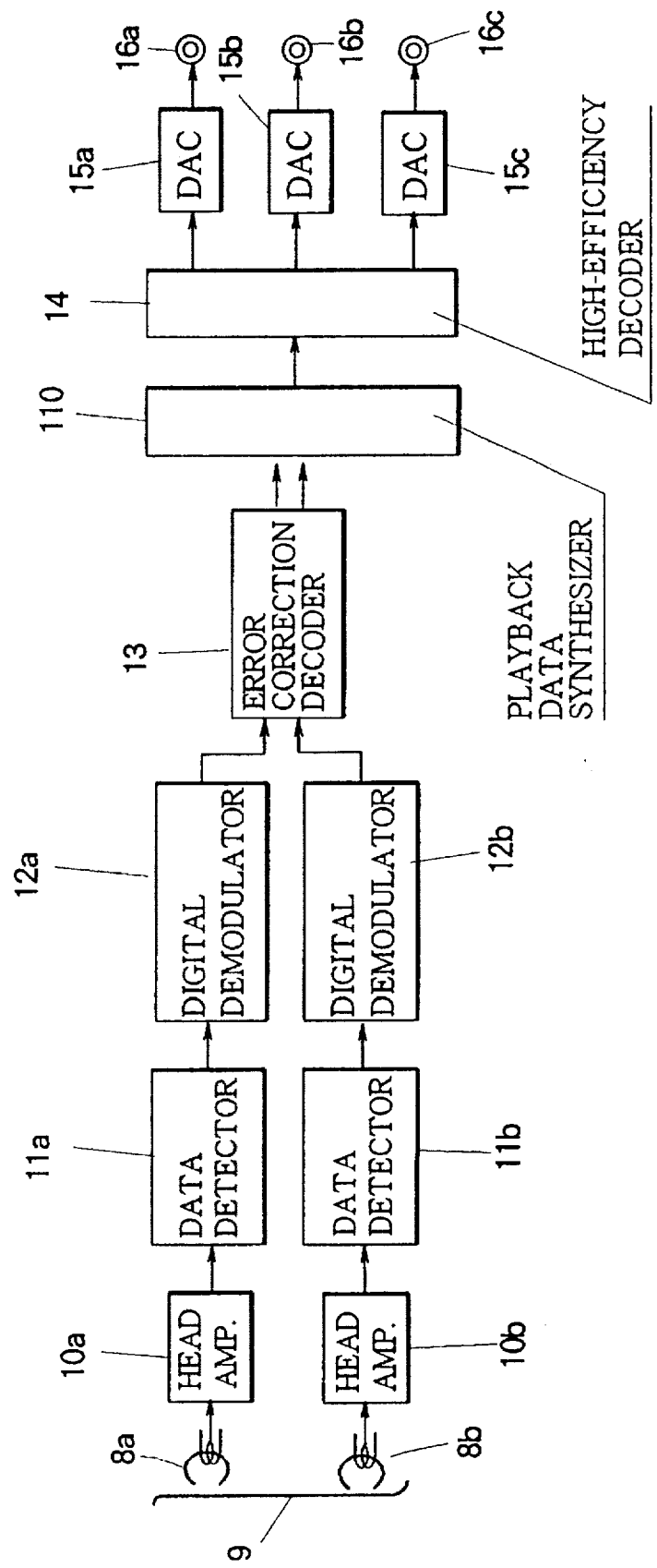
FIG. 2 is a block diagram showing a playback system of the magnetic recording/playback apparatus of Embodiment 1.
Figure 42:
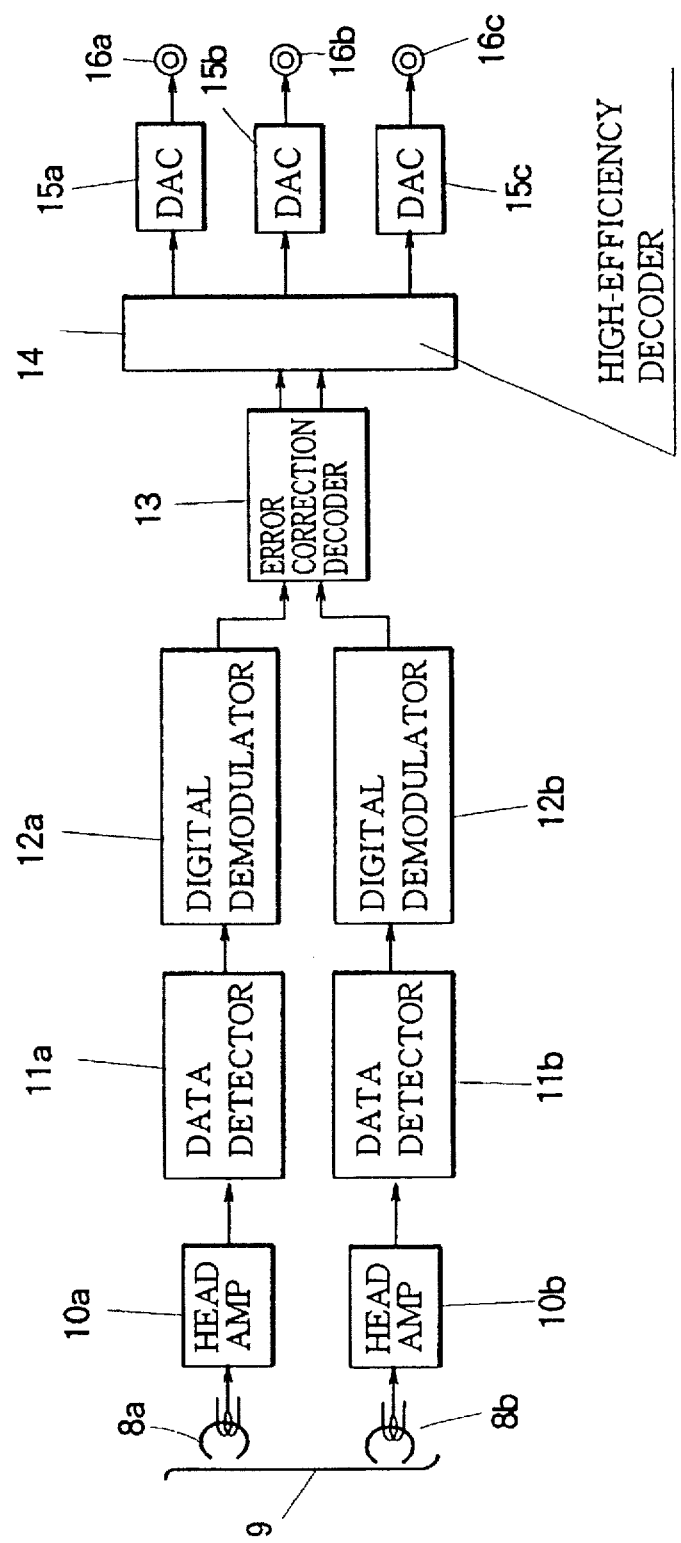
FIG. 42 is a block diagram showing a playback system of the conventional digital VTR.

FIG. 2 shows a playback system of a magnetic recording/playback apparatus in accordance with this first embodiment. Members or circuits identical or corresponding to those in FIG. 42 are denoted by identical reference numerals. The playback system further comprises a playback data synthesizer 110.

Figure 3:
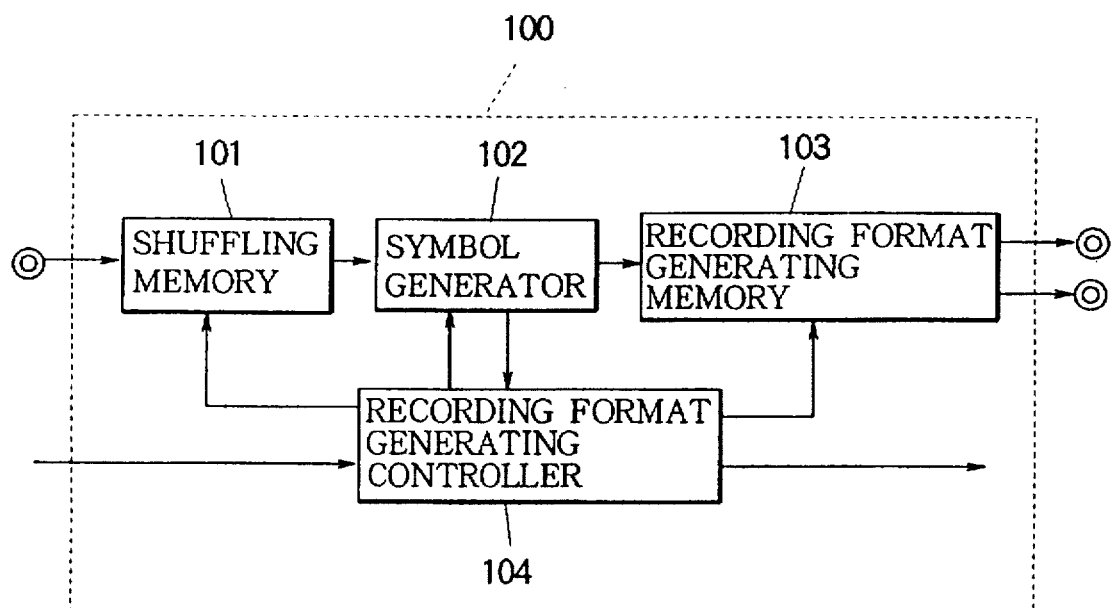
FIG. 3 is a block diagram showing a recording format generator used Embodiment 1.

FIG. 3 shows a recording format generator 100 used in this embodiment. As illustrated, this recording format generator 100 comprises a shuffling memory 101, a symbol generator 102, a recording format generating memory 103, and a Format generating controller 104.

The symbol generator 102 converts the input variable length encoded data with differing codeword length into bit serial form, and then composes a codeword (symbol) of a fixed bit quantity. In the following description of this embodiment, this fixed bit quantity is taken as 8 bits.

The recording format generating memory 103 temporarily stores the 8 bit codeword output from the symbol generator 102 and generates the recording format. The format generating controller 104 controls the shuffling memory 101, symbol generator 102 and recording format generating memory 103.

Figure 4:
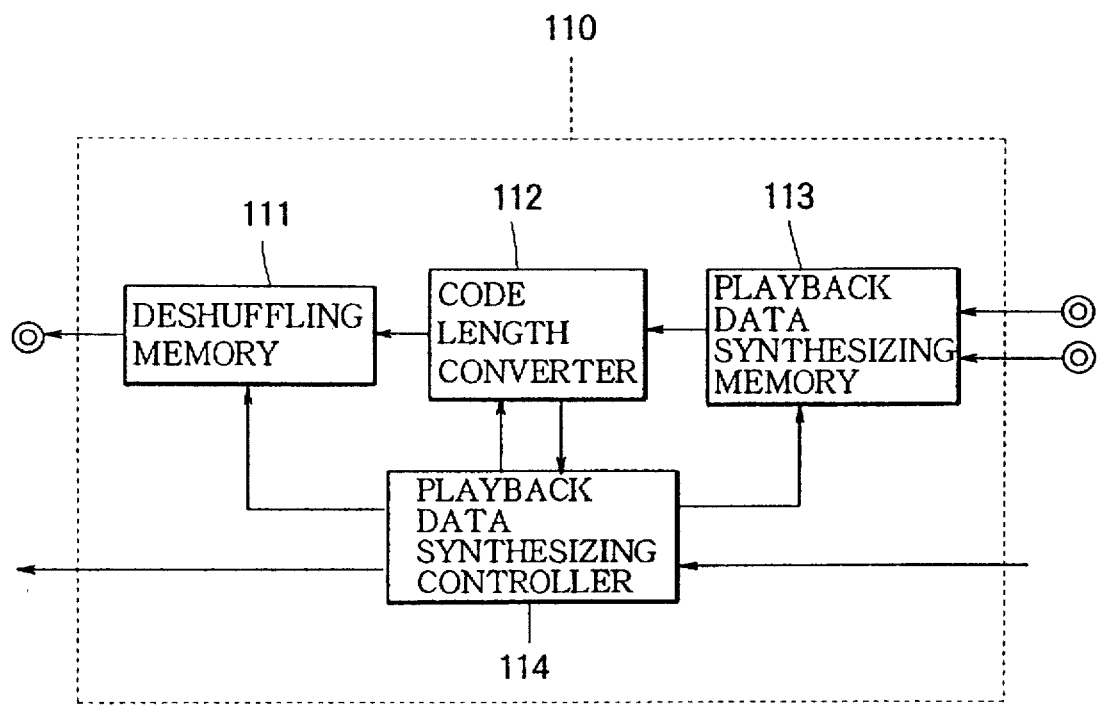
FIG. 4 is a block diagram showing a playback data synthesizer used in Embodiment 1.

FIG. 4 shows a playback data synthesizer 110 used in this embodiment. As illustrated, this playback data synthesizer 110 comprises a playback data generating memory 113, a code length converter 112, a deshuffling memory 111 and a playback data synthesizing controller 114.

The playback data generating memory 113 returns the data arranged by the recording format generator 103 to original sequence. The code length converter 112 converts the 8 bit symbols into bit serial data, and then restores the original variable length codeword. The playback data synthesizer 114 controls the deshuffling memory 111, the code length converter 112 and playback data generating memory 113.

Figure 5:
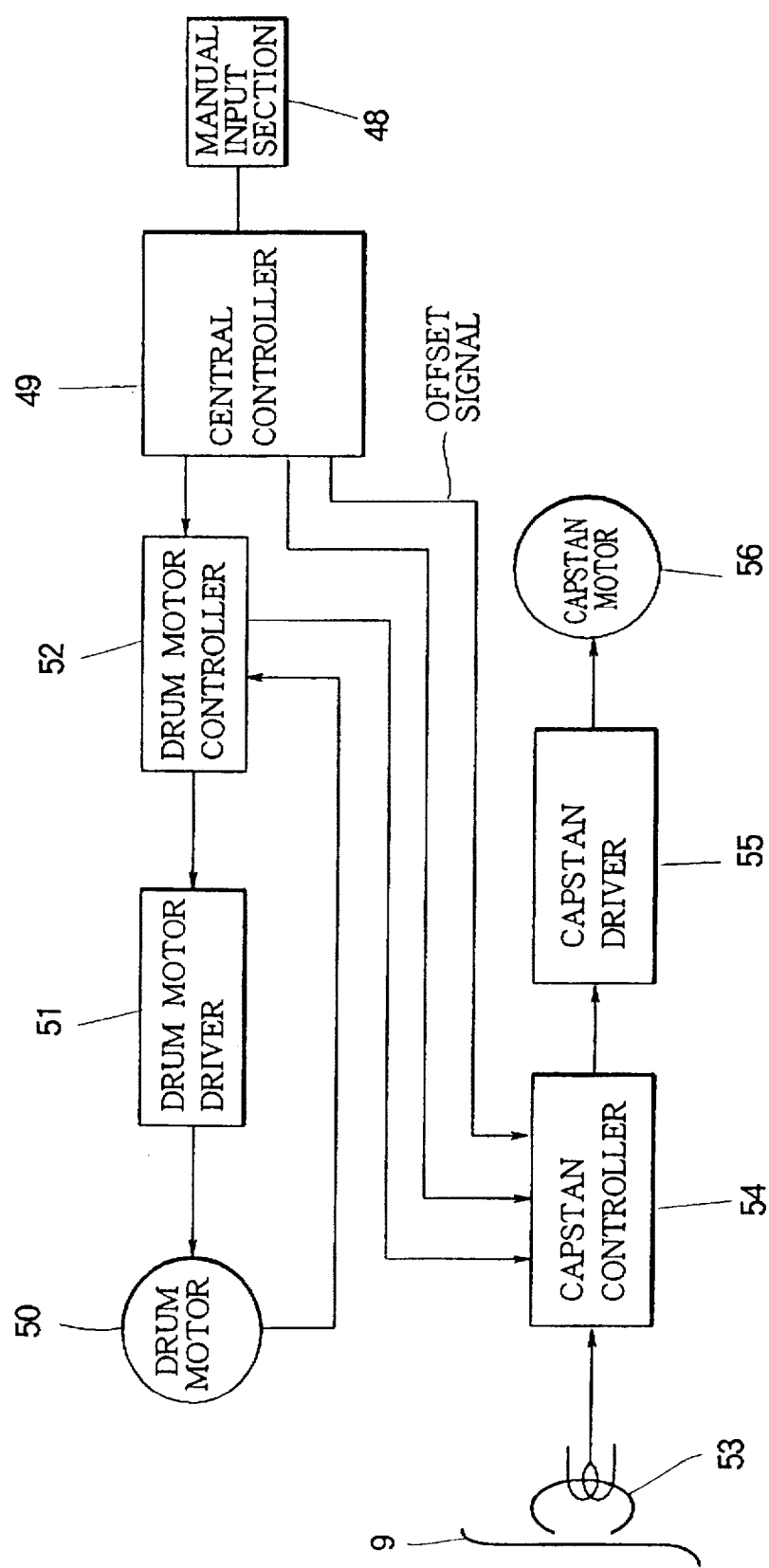
FIG. 5 is a block diagram of a drum and capstan motor control system performing control over the rotary drum and the capstan motor used in the magnetic recording/playback device of Embodiment 1.
Figure 45:
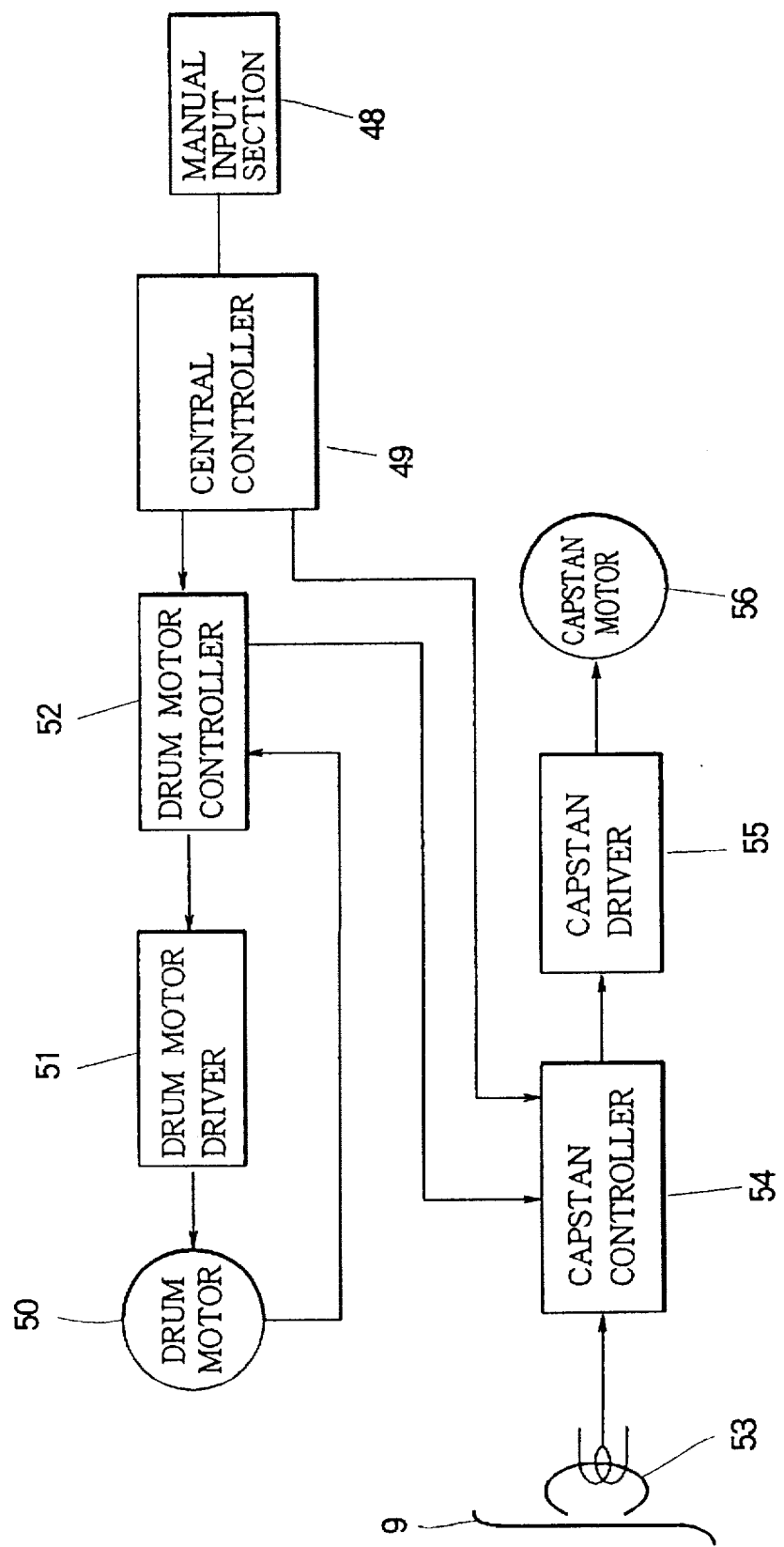
FIG. 45 is a block diagram of a drum and capstan control circuit for controlling the rotary drum and the capstan motor in the conventional digital VTR.

FIG. 5 shows a rotary drum and magnetic tape transport control system used in Embodiment 1. Members and circuits identical or corresponding to those in FIG. 45 are denoted by identical reference numerals. In this embodiment, in addition to the control signal, an offset instruction signal is applied from the central controller 49 to the capstan controller 54. This signal assumes the ON state when performing high speed playback and instructs ½ track pitch offset. When ½ track offset is applied, the tracking is adjusted at the track center. During normal speed playback, the offset signal is in the OFF state and ½ track pitch offset is not applied.

Following is a description of the recording system operation with reference to FIG. 1.

The input luminance signal Y and two chrominance signals CR and CB via inputs 1a to 1c are converted to digital form by A/D converters 2a to 2c and applied to the high-efficiency encoder 3. The high-efficiency encoder 3 encodes the input digital data and reduces the recording bit rate. The high-efficiency encoder 3 will be later described in detail.

The digital video data with a reduced recording bit rate from the high-efficiency encoder 3 is arranged in a predetermined sequence and is also divided into two channels at the recording format generator 100. The recording format generator 100 will also be later described in detail. The outputs of the recording format generator 100 are supplied to the error correction code circuit 4, where an error correction code for correcting and detecting errors which may occur in playback is generated and added.

The recording digital signal with added error correction code is modulated at a predetermined method by digital modulators 5a and 5b. Sync and ID signals are added to the digitally modulated recording signals by sync signal adders 6a and 6b. The signals are then amplified by the recording amplifiers 7a and 7b, and recorded on the magnetic tape 9 by means of the rotary heads 8a and 8b. In this embodiment, the recorded ID data comprise the recording track number and recording line address.

Figure 43:
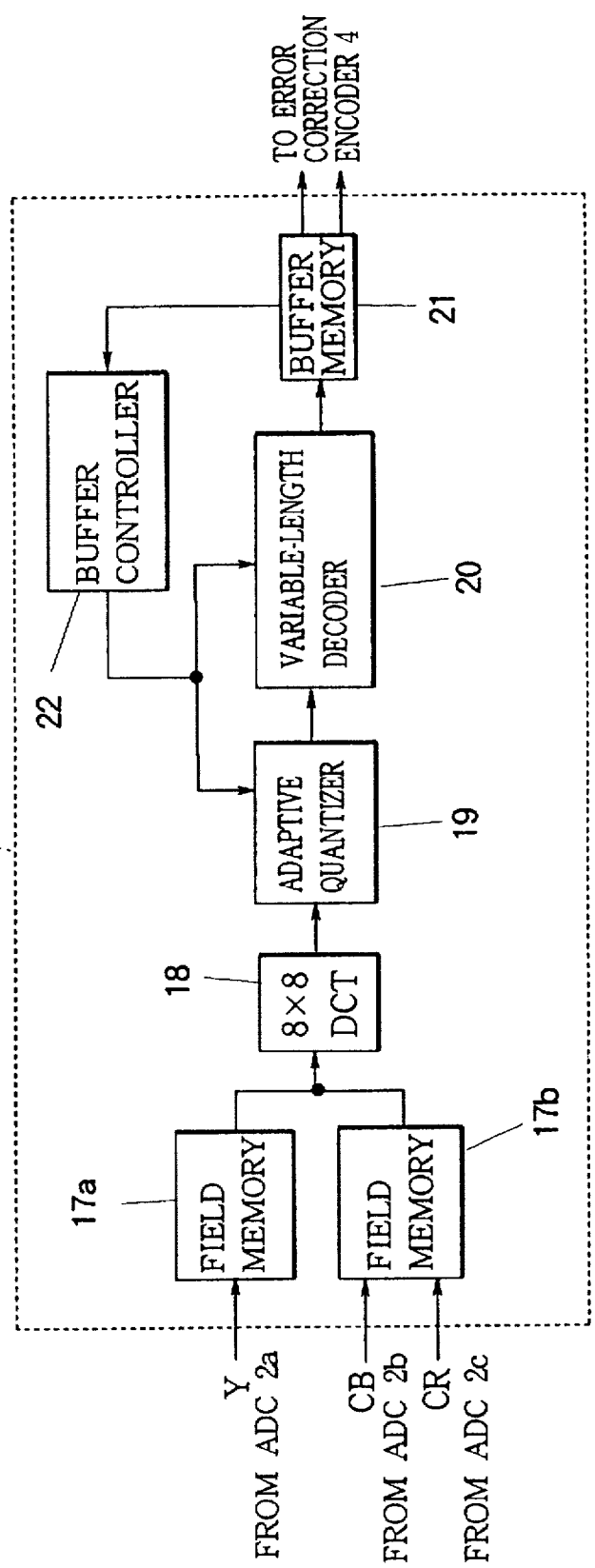
FIG. 43 is a block diagram of a high-efficiency encoder provided in the conventional digital VTR.

Following is a description of the operation of the high-efficiency encoder 3 with reference to FIG. 43. The input luminance signal Y and two chrominance signals CR and CB are delayed by predetermined amounts by field memories 17a and 17b, and formed into blocks. In the block formation, the input signals are first divided into blocks of 8 picture elements by 8 lines. Then the blocked luminance signal Y and two chrominance signals CR and CB are time-division multiplexed and applied to the DCT circuit 18, where discrete cosine transform (DCT) is performed.

The output transform coefficients from the DCT circuit 18 are quantized by the adaptive quantizer 19. The adaptive quantizer 19 possesses a plurality of quantizing tables with different quantizing steps. In accordance with the transform coefficients of each block and the parameters from the buffer memory 21, the quantizing steps are selected. The output of the adaptive quantizer 19 is variable-length encoded at the variable length encoder 20, and is then stored in the buffer memory 21.

The data stored in the buffer memory 21 are read out at a fixed rate. The buffer controller 22 detects the data stored in the buffer memory 21, determines the quantizing parameters according to the amount of stored data and controls the adaptive quantizer 19. The buffer controller 22 also selects the encoding transform coefficients of the variable length encoder on the basis of the amount of data stored in the buffer memory 21.

The high-efficiency encoding system is described in further detail.

Figure 6:
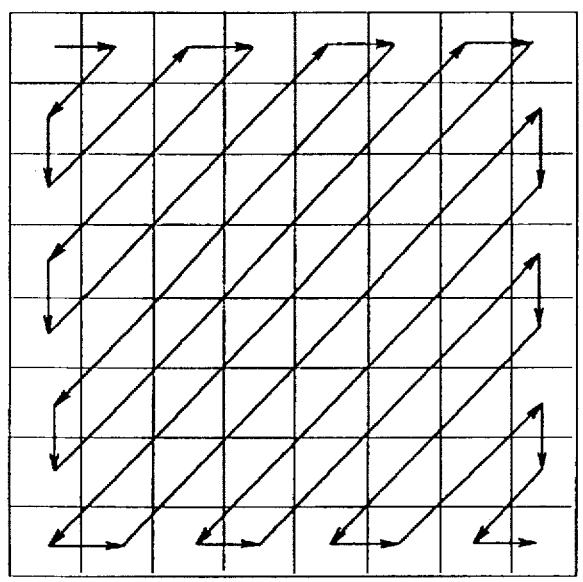
FIG. 6 is a diagram for explaining the zig-zag scanning.

The sequence data from the DCT circuit 18 are quantized at the adaptive quantizer 19 and then variable-length encoded at the variable length encoder 20, as described above. In this embodiment, two-dimensional Huffman encoding is used as the variable length encoding. In this system, each sequence data (DCT coefficients) within each DCT block having been discrete consine transformed at the DCT circuit 18 and quantized at the adaptive quantizer 19 are read out by a zigzag scanning system and rearranged. The zigzag scanning pattern is indicated in FIG. 6. The variable length encoder 20 applies two dimensional Huffman encoding to this zigzag scanned data.

In the two-dimensional Huffman encoding, the coefficients data of which the sequence has been altered by the zigzag scanning are divided into non-zero coefficient data, and zero run-length data (the data indicative of the length for which zero continues). Two-dimensional addresses are applied to the divided data according to the zero run-length and the values of the coefficients following the zero run. Encoding is then performed using the two-dimensional address data and with reference to a two-dimensional Huffman encoding table prepared beforehand. This encoding table is formed to allocate the code length (bit amount) depending on the probability of the occurrence of each of the coefficients or of each of the values of the zero run-length, with codes of short code lengths being assigned to events with higher frequencies of occurrence.

Following is a description of results of computer simulation to determine the relationship between DCT coefficient transfer amount and S/N with respect to a picture with bit rate reduced beforehand using the high-efficiency encoding system and transferred by the zigzag scanning system.

Figure 7:
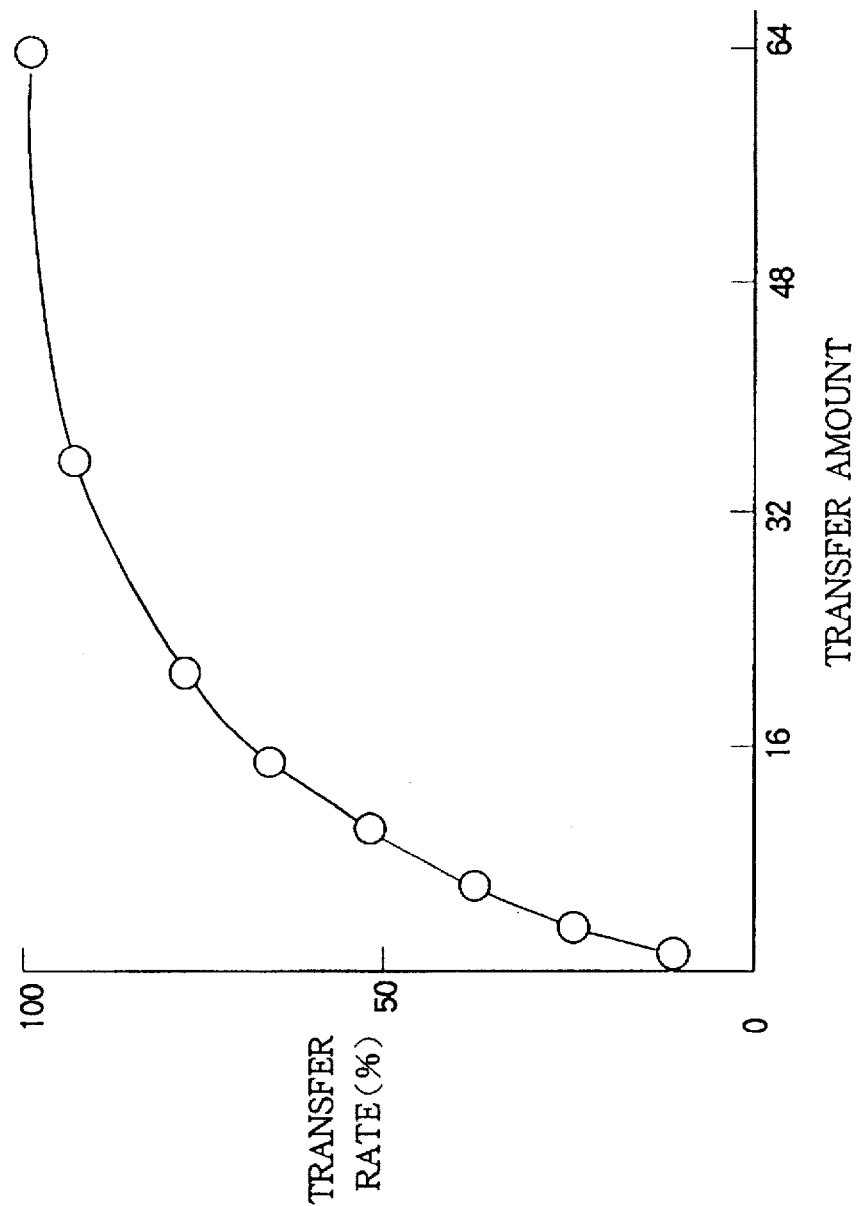
FIG. 7 is a graph showing the transfer rate against transfer amount obtained as a result of computer simulation, and used for explaining the operation of Embodiment 1.
Figure 8:
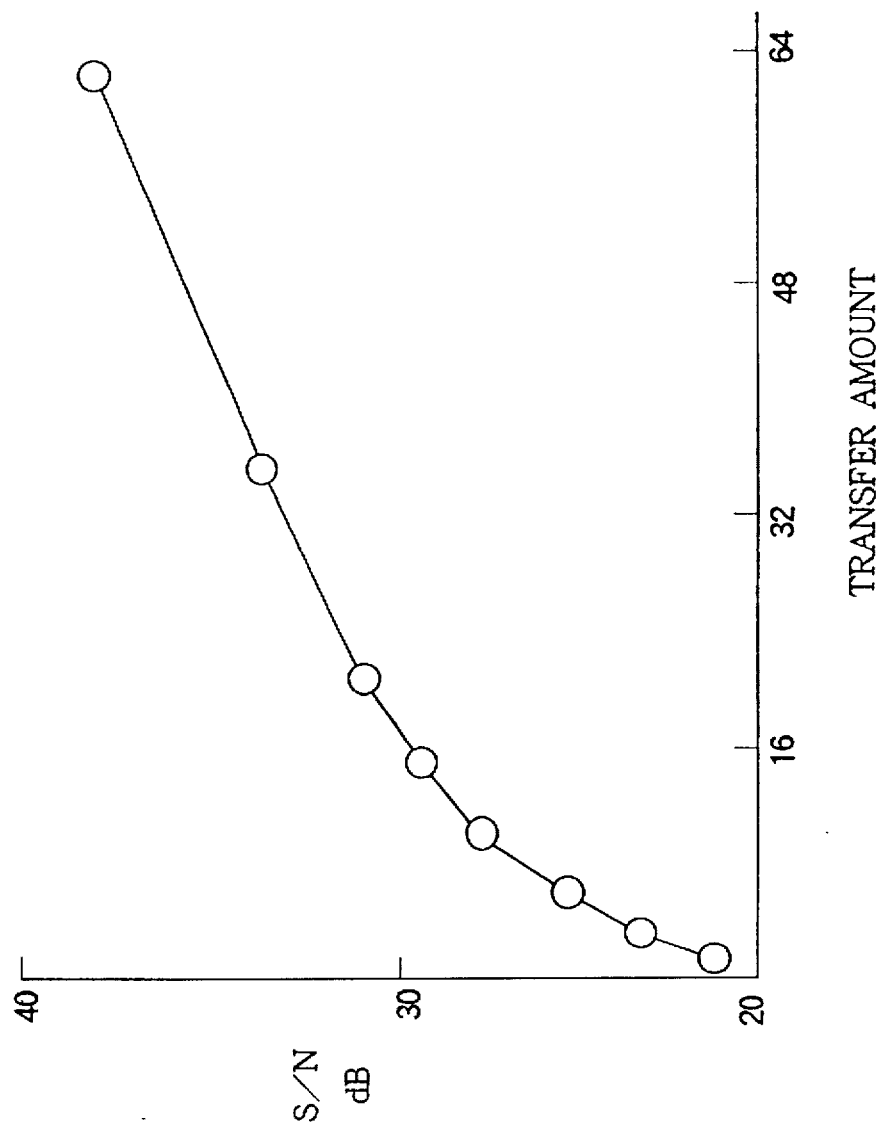
FIG. 8 is a graph plotting the S/N against transfer amount obtained as a result of computer simulation and used explaining the operation of Embodiment 1.

In this simulation, the transferred data amount and S/N with respect to the transferred DCT coefficient quantity were investigated. Results are shown in FIGS. 7 and 8. In order to simplify the simulation, coefficient data other than the transferred DCT coefficients were set to 0, and two-dimensional Huffman encoding was applied. The relationship between DCT transfer data quantity (the number of data on the horizontal axis) and transfer data amount (on the vertical axis) is shown in FIG. 7. In the simulation result, it can be noted that 50% of the overall transfer data is occupied in only the DCT coefficient transfer From about the DC component to the 10th DCT coefficients.

The relationship between the DCT coefficient data transfer quantity (the number of data on the horizontal axis) and S/N (on the vertical axis) is shown in FIG. 8. In this simulation, the results of subjective evaluation of the reproduced picture revealed that, according to the DCT coefficient data transfer amount, time visually tolerable limit was at about 50% data transfer. In this simulation, the transfer bit rate of the original picture was approximately 30 Mbps.

Following is a description of the operation of the recording format generator 100 with reference to the above results.

The recording format generator 100 controls the arrangement of data so that at a specific multiple speed adopted for high speed playback, the important picture data (DCT coefficients of relatively low frequencies) are recorded on the scanning traces of the rotary heads of the respective channels (positions where the rotary heads of the respective channels scan, and from which playback data is obtained). In the Following description of the embodiment, the recording formats are for double and six-time speeds. In these cases, by arranging the important picture data in three locations at the track center and near both ends, satisfactory double and six-time playback speeds are achieved, as will be later described in detail.

Prior to describing the recording format, a description of the concept of this embodiment is provided below.

Figure 9A:
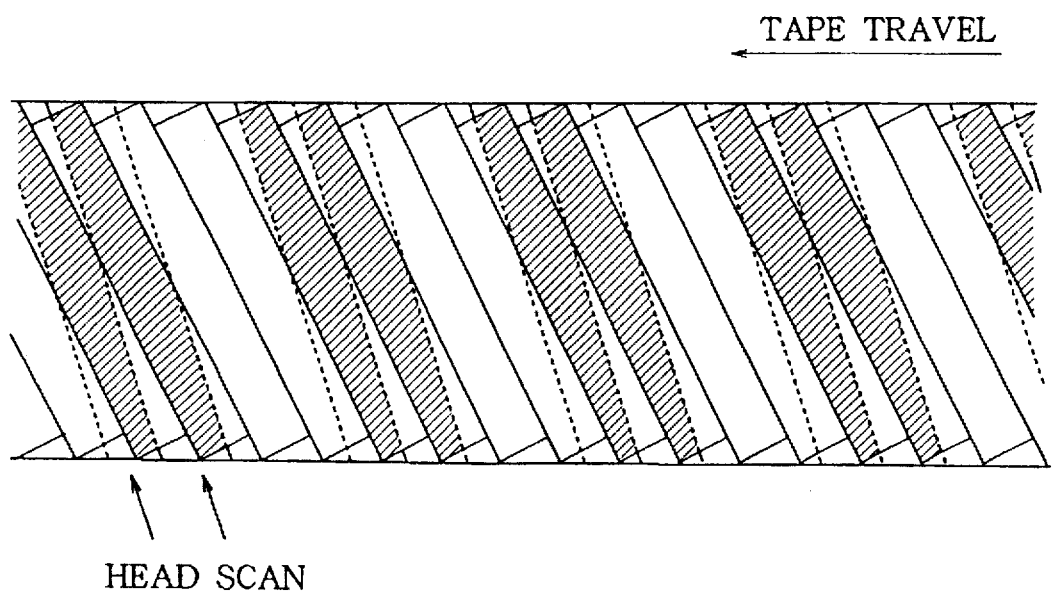
FIG. 9A is a schematic diagram showing the track pattern and the traces of the rotary heads during double speed playback in Embodiment 1.
Figure 9B:
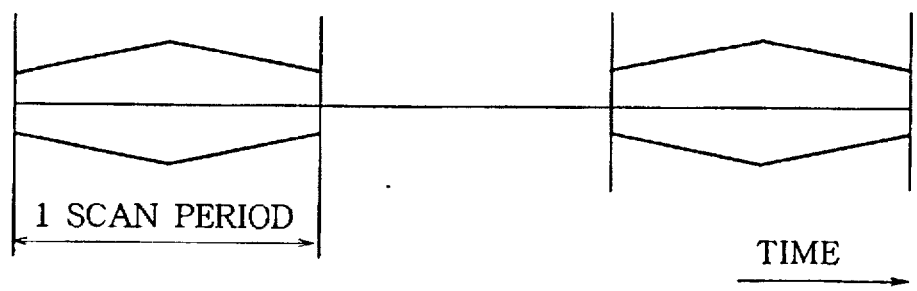
FIGS. 9B and 9C show the level of the playback signals obtained during double playback.
Figure 9C:
Figure 10A:
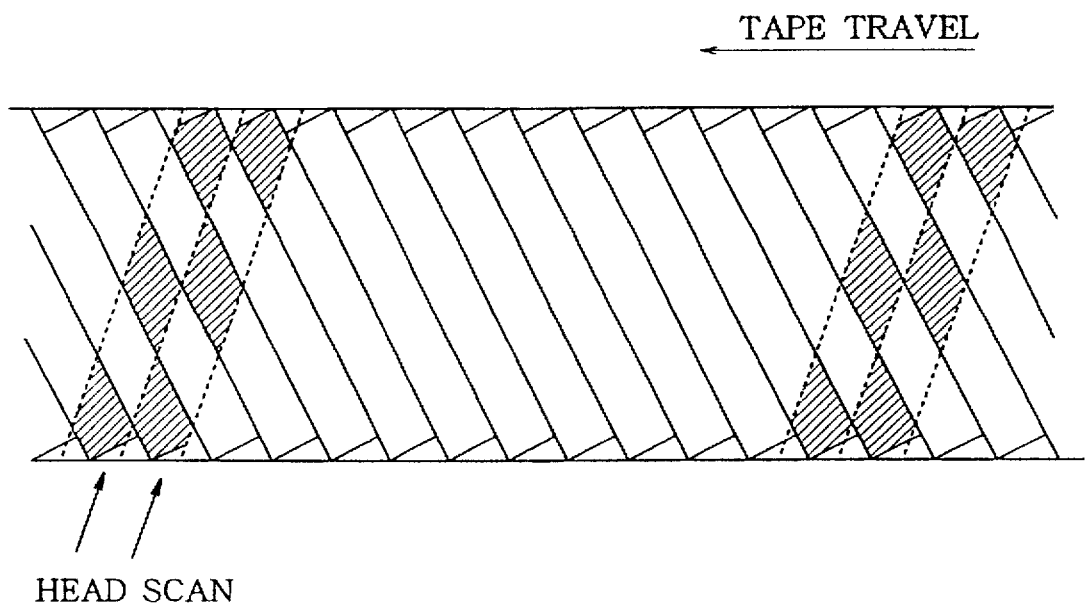
FIG. 10A is a schematic diagram showing the track pattern and the traces of the rotary heads during six-time speed playback in Embodiment 1.
Figure 10B:
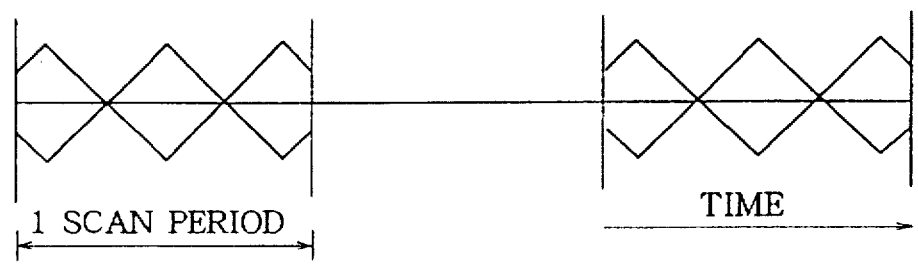
FIG. 10B is a diagram showing the level of the playback signals obtained during six-time speed playback.
Figure 46A:
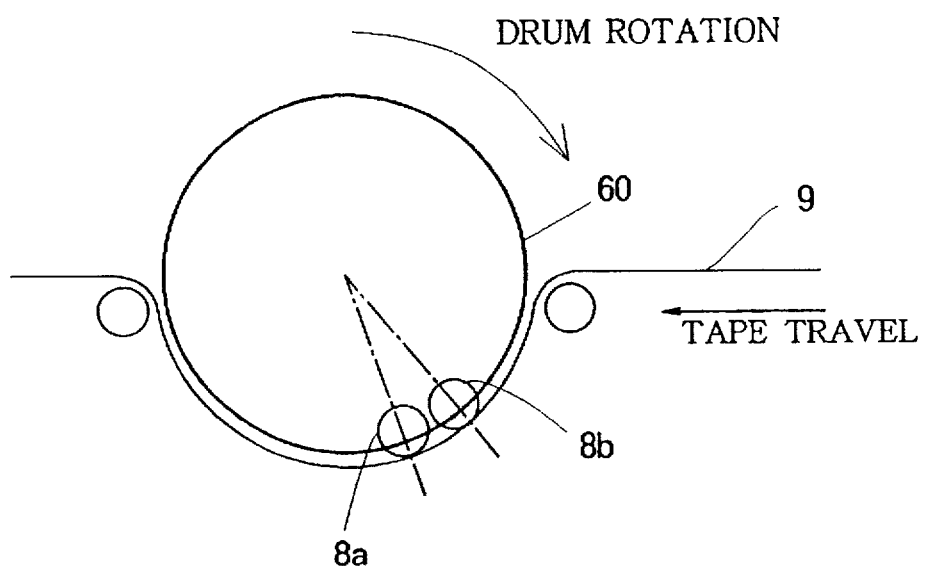
FIG. 46A is a schematic diagram showing the arrangement of two-channel combination heads on the rotary head drum.
Figure 46B:
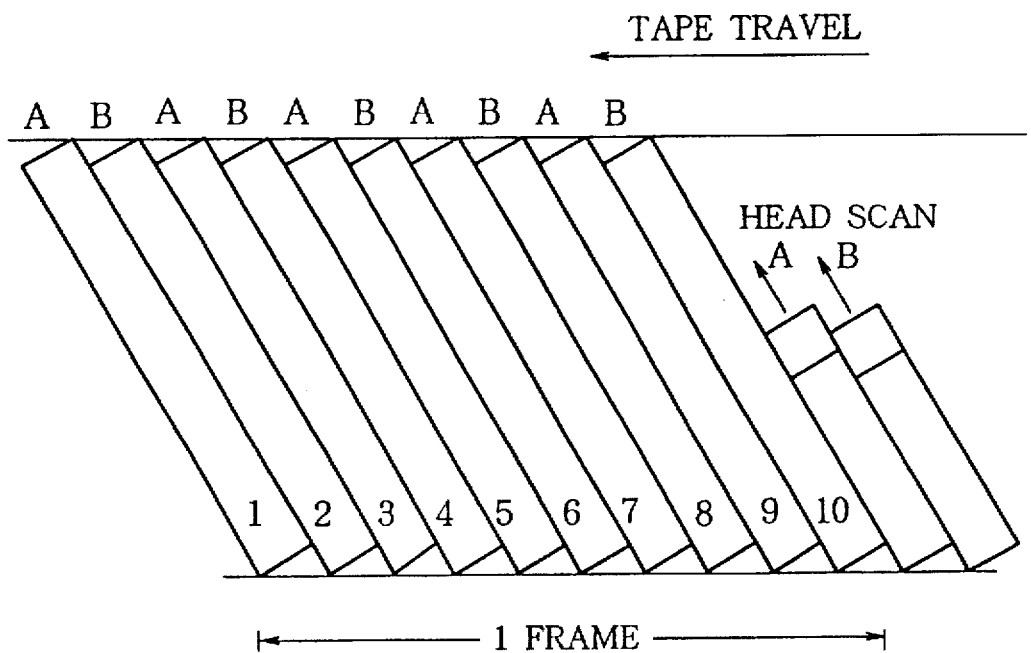
FIG. 46B is a diagram showing the tracks formed on the magnetic tape.

FIGS. 9A to 9C and 10A to 10C show the track pattern and scanning traces of the rotary heads 8 during double and six-time high speed playback with a digital VTR using the two-channel recording/playback system shown in FIGS. 46A and 46B. In this embodiment, ½ track pitch offset is applied to the rotary head tracking phase, and control is performed in order to obtain adequate playback output at the center portion of the recording track. The playback signals from the rotary heads 8a and 8b are shown in FIGS. 9B and 10B.

Figure 10C:
FIG. 10C is a diagram showing the playback signals which can be corrected through error correction.

As illustrated, when performing double and six-time high speed playback with ½ track offset added to the rotary head tracking phase, the playback video data from each channel rotary head per scanning period is about 100% at double speed and about 60% at six-time speed. Also, in this embodiment, in the same manner as the prior art example, it is presumed that correct playback is attained when the playback signal output amplitude From the rotary heads exceeds 50% of the signal obtained during normal playback. Also, on the basis of the actually measured data, it is presumed 90% of the data is played back at the double speed. In FIGS. 9C and 10C, the data areas from which it is possible to obtain playback signals of an amplitude having 50% or more of the amplitude of the playback signals during normal playback are shown.

Figure 11:
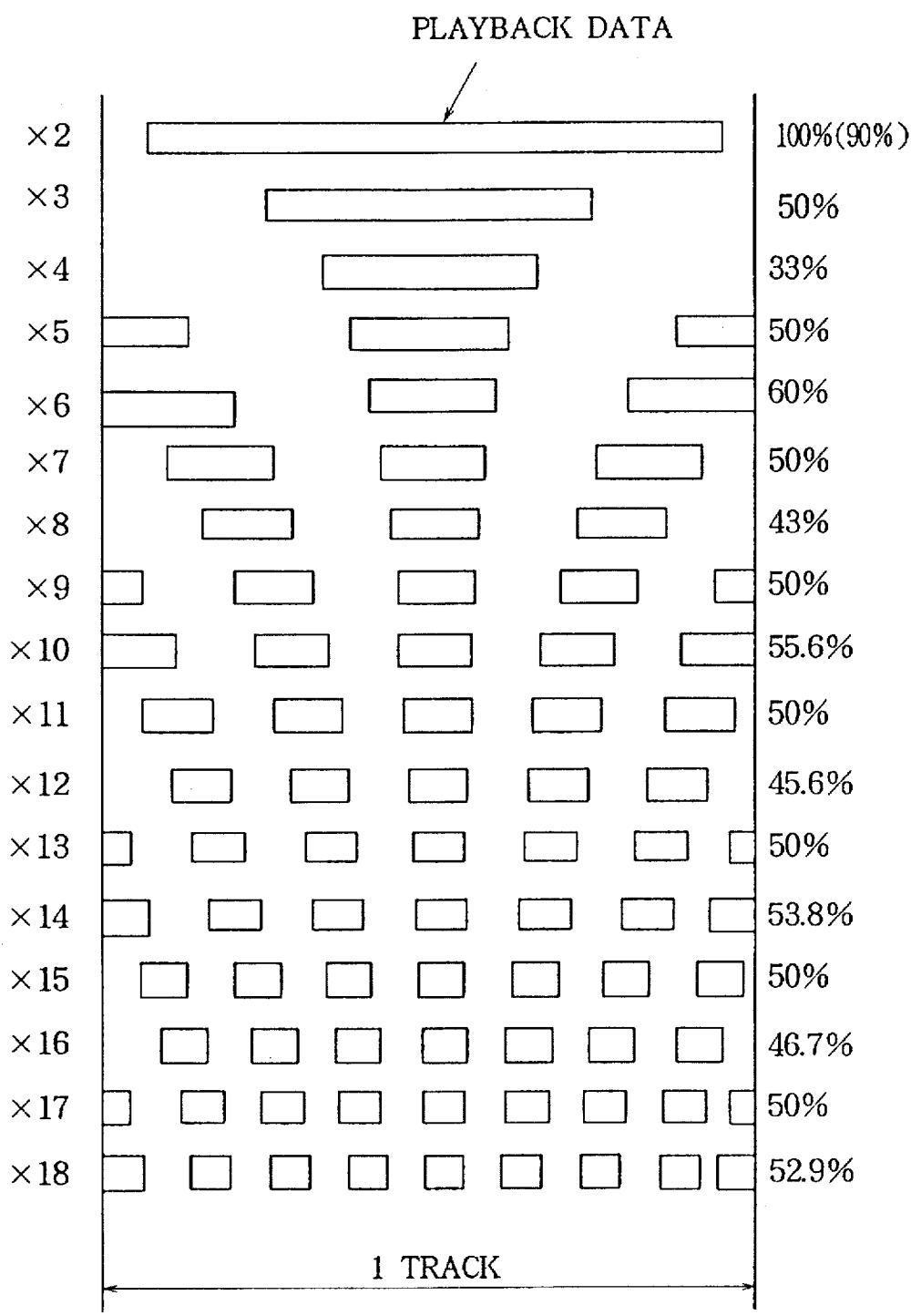
FIG. 11 is a diagram showing the positions on each track from which the playback signals are restored as correct data through error correction, at various playback speeds, using the magnetic recording/playback apparatus of Embodiment 1 and adjusting the tracking at the track center.

In FIG. 11, the positions and distribution of the portions within each track from which data are played back during one rotary head scanning period are shown for various speeds. In FIG. 11, "x 2", "x 3", "x 4", etc. on the left means a double speed, triple speed, four-time speed, and so on. The capstan controller 54 is controlled so that ½ track pitch offset is applied to the tracking phase of the rotary head to thereby obtain adequate playback signal at the track center portion. As illustrated, during high-speed playback, by setting the playback speed to twice the normal speed, six times, 10 times . . . , 4n+2 times, the playback signal data amount obtained during one rotary head scan of the magnetic tape is respectively 100% (90%), 60%, 55.6%, . . . This compares with the prior art example in which only 50% was obtainable.

In general, to obtain a good playback picture during high speed playback with the above mentioned digital VTR, it is important to efficiently play back obtain the digital video signals having been high-efficiency encoded. In particular, if the Playback efficiency of time playback efficiency of high-efficiency encoded data is poor, the impairment of the playback image is prominent and objectionable.

Viewed from the opposite perspective, by increasing the percentage of the data that can be played back within one rotary head scanning period, picture quality (S/N) is improved, as shown in FIGS. 7 and 8, and a good playback picture is obtainable. In the case of high speed playback of this embodiment, the tape transport speed is set to 4n+2 times, and by applying ½ track pitch offset to the rotary head tracking phase, improvement of the playback signal efficiency per rotary head scanning period is possible.

Figure 50A:
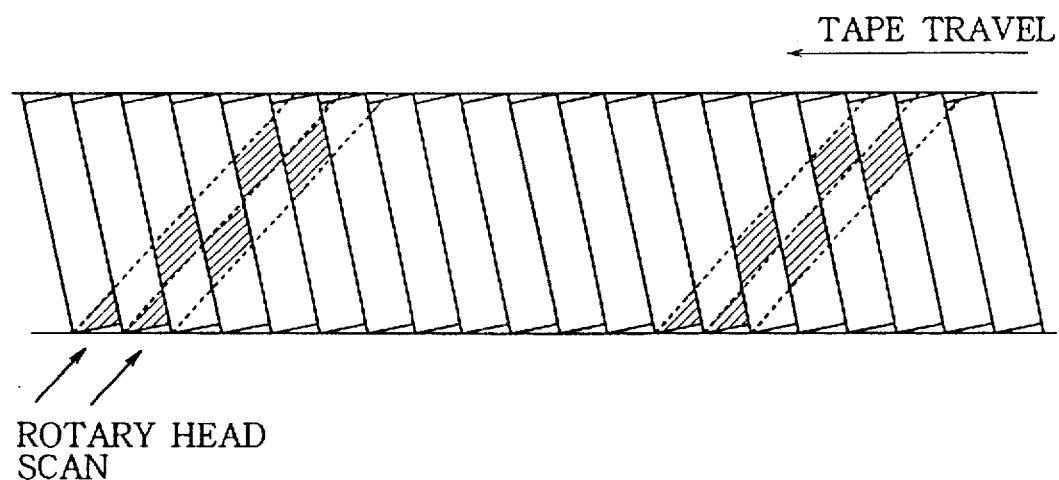
FIG. 50A is a diagram showing the track pattern and the scanning traces of the two-channel rotary heads.
Figure 50B:
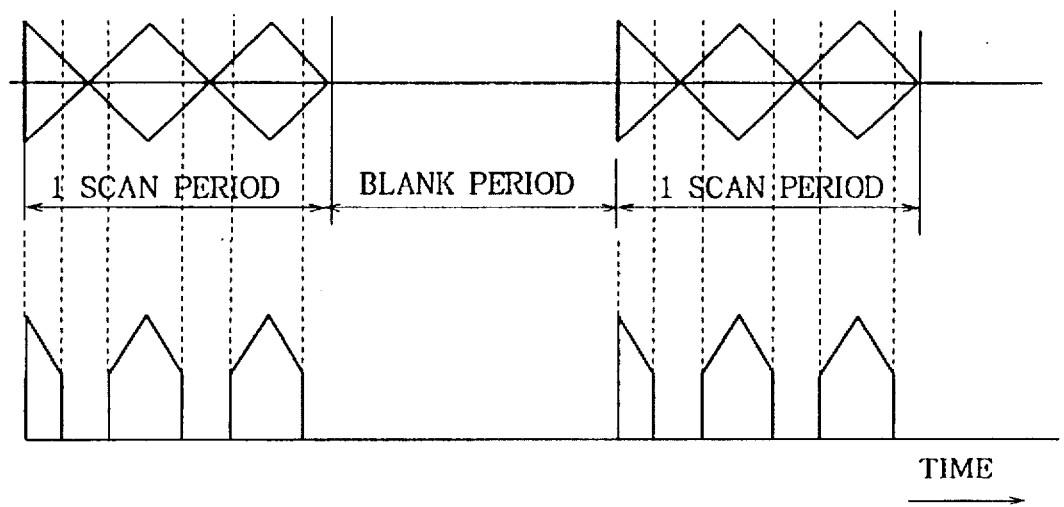
FIG. 50B is a diagram showing the level of the playback signals obtained during high speed playback with the conventional system.

For example, in the case of six-time high speed playback shown in FIGS. 50A and 50B, the play back data is about 50%. In contrast, in the case of this embodiment, as shown in FIGS. 10A to 10C, during six-time speed the playback efficiency per rotary head scanning period is about 60% and the playback data amount is increased about 10% compared to the prior art example.

In general, in the development of a consumer VTR (digital VTR), it must be taken into consideration that two or more high-speed playback speeds are required. Consequently, the recording format capable of producing a good playback picture at only one high-speed playback speed is not satisfactory.

Following is a description of the recording format of Embodiment 1.

In recent years, the high-speed playback speeds for consumer analog VTRs developed by various makers are different. However, each maker has adopted at least one model adopting the double speed. This has also been demanded from the user side. Consequently, in developing a consumer digital VTR, a double speed is definitely required and this needs to be considered when determining the recording format.

Figure 12:
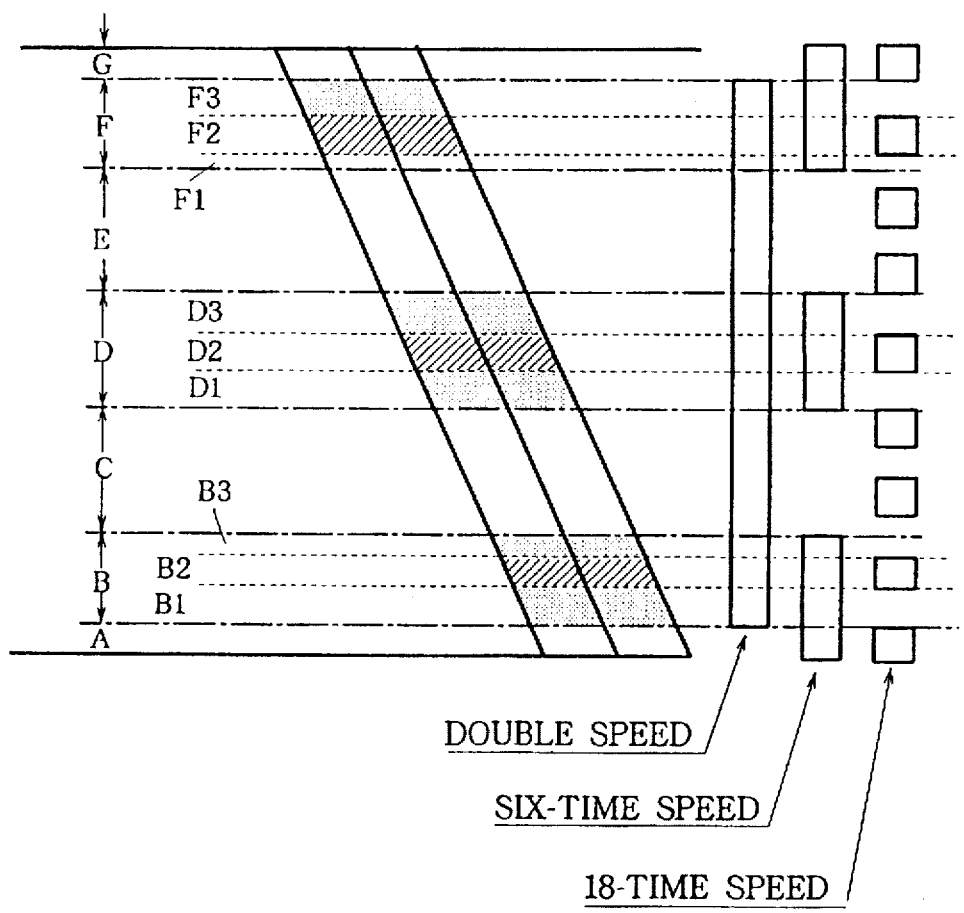
FIG. 12 is a diagram for explaining the recording format used in the magnetic recording/playback device of Embodiment 1.

FIG. 12 shows a recording format appropriate for double and six-time speed playback. The following description covers high-speed playback with 2, 6 and 18 times the normal speed with the recording format shown in FIG. 12.

In this recording format, as mentioned above, the important picture data are recorded among 3 locations at the center and near both ends of each track. For this purpose, each track is divided into 7 regions, as illustrated. The regions are designated in sequence From the bottom of the track as A, B, C, D, E, F and G. Among these, regions A and G are short areas adjacent to both ends of the track. Areas B and F, adjacent to regions A and G, are termed regions near the ends of the track. That is they are near both track ends, but are actually separated from the ends by intervening regions A and G.

The region D is positioned at the track center and is designated as the center region. The regions C and E are positioned between the regions D and B, and between the region D and F, respectively, and are termed intermediate regions.

The center region D is further subdivided into a center sub-region D2, and side sub-regions D1 and D3. Likewise, the region B near the bottom end is subdivided into a center sub-region B2 and end sub-regions B1 and B3, while the region F near the upper end is subdivided into a center sub-region F2 and end sub-regions F1 and F3.

As shown at the right of FIG. 12, at any of twice, six times and 18 times the normal speed, the playback signal can be obtained from the entire sub-regions B2, D2 and F2. Also, at twice and six times the normal speed, the playback signal can be obtained from the entire sub-regions B, D and F. Among regions B, D and F, the playback signal can be obtained from sub-regions B1, B3, D1, D3, F1 and F3 at twice and six times speeds, but not at 18 times speed.

The DCT block data are classified in three groups or categories. The first category consists of most important information, comprising the DC and low frequency AC components. The second category consists of important information, comprising the midrange AC component. The third category consists of least important information, comprising the high frequency AC, i.e., fine detail, component. Here the "importance" is evaluated from the viewpoint of picture quality during high playback. The most important data are recorded in the sub-regions B2, D2 and F2. The important data are recorded in the sub-regions B1, B3, D1, D3, F1 and F3. The least important data are recorded in the remaining regions A, C, E and G.

By the above type of data arrangement, at double speed, about 90% of the data per DCT block are prayed back, and at six-time speed, about 50% of the data per DCT block are played back. Consequently, according to FIGS. 7 and 8, the S/N per block is about 34 dB and 27 dB respectively. Also, at 18-time speed, about 17.6% of the important data in the DCT block are played back, the S/N per DCT block is about 22.5 dB. If the playback signal can be obtained from the tape edge portions, the respective S/N becomes approximately 38 dB, 28 dB and 24.5 dB (by arranging the important data also at the track end portions).

The operation of the recording format generator 100 using the above described recording format of this embodiment will next be described.

The recording data having been variable-length encoded at the high-efficiency encoder 3 is input to a shuffling memory 101, where the data are written while performing shuffling taking each DCT block as a unit, based on the control signal output from the recording format generating controller 104.

The shuffled digital video data of the DCT blocks of one field are divided into the three categories in accordance with the importance of the respective data. The coefficient data of the DCT blocks of the respective categories are read out from the shuffling memory 101 while being rearranged according to the frequency, in the order from the lowest frequency to higher frequency.

At the symbol generator 102, the shuffled data from the shuffling memory 101 (the bit length or one symbol being different as variable length encoding is applied) are temporarily converted into bit serial data, and are then separated into 8 bit segments to compose bytes of data. The 8 bit data produced at the symbol generator 102 are written in sequence in the recording format generating memory 103 at addresses determined beforehand, in accordance with the address output From the recording format generating control let 104.

More specifically, in the addresses in the recording format generating memory 103 corresponding to track sub-regions B2, D2 and F2 shown in FIG. 12, the most important data (of the first category) are successively stored. Next, the important data (midrange AC component data) are stored in the recording format generating memory 103 at addresses corresponding to track sub-regions B1, B3, D1, D3, F1 and F3. Finally, other data (least important data) are stored in the recording format generating memory 103 at addresses corresponding to track region A, C, E and G.

The step of dividing the data into three categories according to importance and the step of storing in the memory 103 are not necessarily separate, and may be performed simultaneously.

The data stored in the recording format generating memory 103 in the above manner are read out sequentially from the addresses corresponding to the bottom end of each track in accordance with the address supplied from the recording format generating controller 104. As mentioned above, the recording format generating controller 104 generates the signals For controlling the shuffling memory 101, the symbol generator 102 and the format generating memory 103.

The recording data output from the recording format generator 100 are sent to the error correction code circuit 4, where the error correction code is added, and are then digital-modulated at the digital modulators 5a and 5b. The recording data are then sent to the sync signal adders 6a and 6b, where sync signal and ID signals are added, and then amplified by the recording amplifiers 7a and 7b, and recorded on the magnetic tape 9.

The operation of the playback system of a digital VTR having the above recording format during normal playback will next be described with reference to FIG. 2.

The two-channel playback signals from the magnetic tape 9 via the rotary heads 8a and 8b are amplified by the head amplifiers 10a and 10b, and converted into digital data by the data detectors 11a and 11b, which also serve to absorb jitter (time base error).

The digital demodulators 12a and 12b digital-demodulate the data and convert the data into the playback digital signals, which are applied to the error correction decoder 13. At the error correction decoder 13, based on the error correction code applied beforehand at the time of recording, errors produced in the playback signal are corrected or detected.

The digital signal from the error correction decoder 13 is applied to the playback data synthesizer 110, where the data having been arranged, taking each DCT coefficient as a unit, at the recording format generator 100, are returned to the original sequence to reconstruct the DCT blocks. At the high-efficiency decoder 14, the playback digital data of one channel from the playback data synthesizer 110 undergoes such processing as variable length decoding, inverse adaptive quantization and inverse DCT to return to the original luminance signal Y and two chrominance signals CB and CR. These are converted to analog data by D/A converters 15a to 15c and output via the terminals 16a to 16c.

Following is a description of the playback data synthesizer 110 operation during normal playback.

The two-channel error-corrected playback digital data from the error correction decoder 14 are stored at predetermined addresses in the playback data generating memory 113 on the basis of the ID signal separated from the playback signal. In this embodiment, the ID signal is detected after digital demodulation by the digital demodulators 12a and 12b.

The playback digital data (divided into three categories at the time of recording) are read out sequentially from Huffman codes for the lowband component. At the code length converter 112, the 8 bit data from the playback data generating memory 113 are converted to bit serial data, and are then separated into Huffman codewords to thereby form variable length codewords.

The Huffman codewords from the code length converter 112 are deshuffled at the deshuffling memory 111 to reconstruct the DCT blocks. The playback data synthesizing controller 114 controls the playback data generating memory 113, the code length converter 112, and the deshuffling memory 111, as mentioned above.

The playback digital signals from the playback data synthesizer 110 are converted into fixed length data by the variable length decoder 28. The fixed length data is read out at a fixed rate from the buffer memory 24 and inverse-quantized at the inverse adaptive quantizer 25, and are the sent to the inverse DCT circuit 26.

At the inverse DCT circuit 26, inverse discrete cosine transform is applied to the input playback digital signal. The playback luminance signal Y and chrominance signals CR and CB are stored in the field memories 27a and 27b and delayed by predetermined amounts. The block formation applied at the time of recording is decoded and the output signals are supplied to the D/A converters 15a to 15c.

Next is a description of the drum and capstan motor control system operation during normal playback with reference to FIG. 5.

During playback, the drum motor controller 52 utilizes the reference signal from the central controller 49, and the drum PG and FG signals from the drum motor 50 For controlling the rotation of the drum motor 50, as well as generating the reference signal for controlling the capstan motor. On the basis of the control signal from the drum motor controller 52, the drum motor driver 51 produces the voltage For driving the drum motor 50.

The capstan controller 54 utilizes the CTL signal from the control bead 53 for controlling the tape transport speed. In addition, it utilizes the reference signal from the drum motor controller 52 and the CTL signal for controlling the phase of the rotary heads 8a and 8b.

During normal playback, the offset signal from the central controller 49 applied to the capstan controller 54 is in the OFF state, and ½ track pitch offset is not applied. On the basis of the control signal from the capstan controller 54, the capstan driver 55 produces the voltage for driving the capstan motor 56.

Next is a description of double and six-time speed playback operation using a digital VTR with the above mentioned recording format with reference to FIGS. 2, 4, 9A to 9C, and 10A to 10C.

FIG. 9A shows the track pattern and the rotary head scanning traces during double speed search. As the rotary heads of the two channels have a mutually different azimuth angles, due to the azimuth effect, the data of the hatched areas is played back.

During high speed playback, the offset signal from the central controller 49 applied to the capstan controller 54 is in ON state, and based on this, the capstan controller 54 performs ½ track pitch offset. In other words, compared to normal playback, the rotary head tracking phase is offset at a ½ track pitch, and tracking is adjusted at the track center.

In FIG. 9B, the pattern of the playback signal output from each rotary head is shown. The area of the figure where the playback signal is completely unobtained corresponds to the area where the rotary heads 8 are completely out of contact with the magnetic tape 9.

Similarly, FIG. 10A shows the track pattern and the rotary head scanning traces during six-time speed search, while FIG. 10B shows the pattern of the playback signal output from each rotary head.

Figure 47:
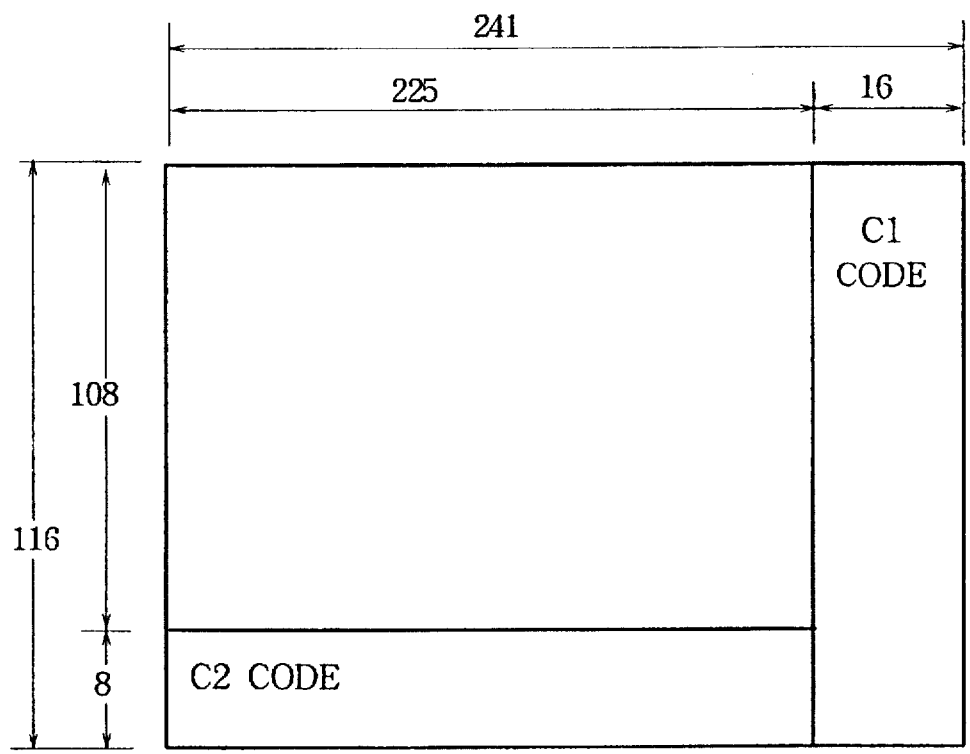
FIG. 47 is a diagram showing the configuration of the error correction codes of the digital VTR used in the investigations.
Figure 48:
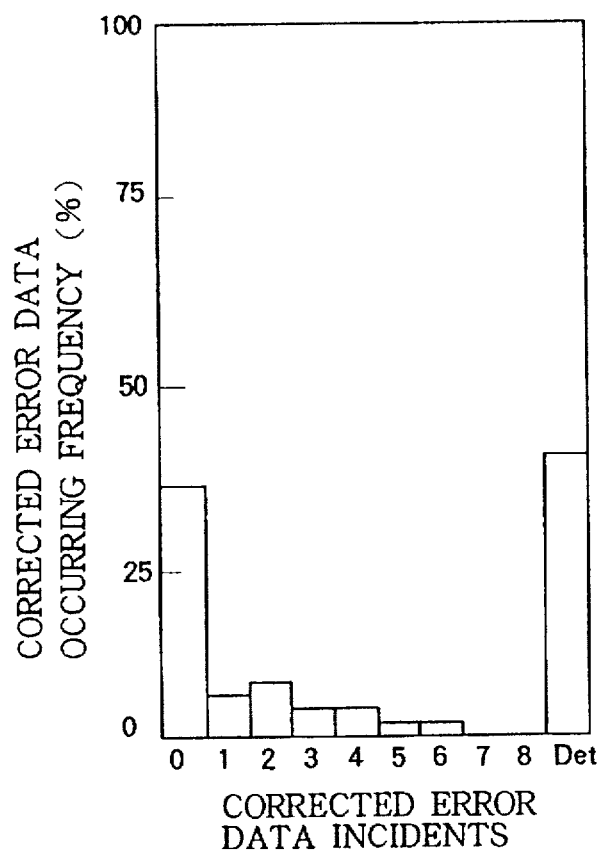
FIG. 48 is a graph showing the corrected error data occurring frequency obtained as a result of experiments using an actual VTR and a five-time playback speed.
Figure 49:
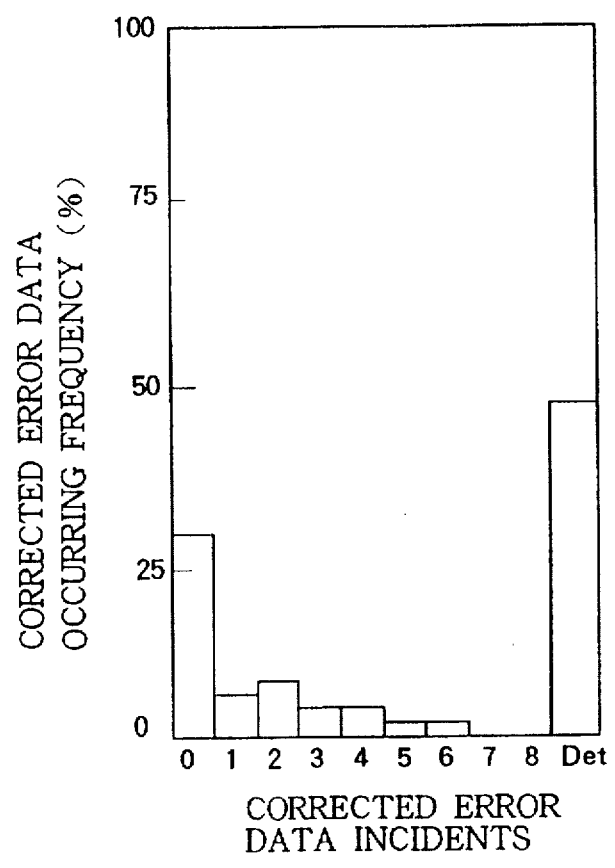
FIG. 49 is a graph showing the corrected error data occurring frequency obtained as a result of experiments using an actual VTR and a eight-time playback speed.

As shown in FIGS. 9A and 10A, the playback signal from each channel rotary head is obtained intermittently during high speed playback. In general, with a digital VTR such as shown in FIGS. 1 and 2, a Reed-Solomon code of a product code format shown in FIG. 47 is used as the error correction code system. However, as mentioned above, when the playback data is obtained intermittently, the product code block shown in FIG. 47 cannot be composed, error correction or detection is performed by only the error correction code in the recording direction, i.e., by C1 code only.

Following is a description off the playback system operation during high speed playback with reference to FIGS. 2, 9A to 9C and 10A to 10C.

The intermittent playback signals output from the rotary heads 8a and 8b are amplified by the head amplifiers 10a and 10b, and then converted into digital data by the data detectors 11a and 11b, which also serve to absorb jitter (time base error).

Digital demodulators 12a and 12b demodulate the data and convert the data into the playback digital signals, which are applied to the error correction decoder 13. In this embodiment, the ID signals applied during recording are detected at the digital demodulators after the digital demodulation.

Error correction is performed for the demodulated digital data at the error correction decoder 13. As mentioned above, since the playback data from the rotary heads 8a and 8b arrive intermittently, the error correction codes applied in the recording direction are used for error correction and detection.

The error detection flags detected at the error correction decoder 13 are applied to the playback data synthesizing controller 14. Based on the ID signals detected by the digital demodulator 12 and the error detection flags from the error correction decoder 13, the playback data synthesizing controller 114 produces addresses in the playback data synthesizing memory 113 where the playback data are to be written. The data written into the playback data synthesizing memory 113 are those in which absence of error has been detected or error has been corrected at the error correction circuit 13.

The playback digital data having been written into appropriate addresses of the playback data synthesizing memory 113 based on the playback ID data are read out sequentially from the lowband component on the basis of the read addresses from the playback data synthesizing controller 114 to thereby compose the playback digital data of one track. At the code length converter 112, the read out data are converted into bit serial data, and then separated into Huffman codewords to reconstruct variable length codewords, and are then applied to the deshuffling memory 111.

During high speed playback, the data are played back intermittently as shown in FIGS. 9A to 9C and 10A to 10C, all the DCT coefficients within the same DCT block are not necessarily played back. The playback DCT coefficients not appearing at the code length converter 112 are sent as 0 to the deshuffling memory 111. More specifically, in this embodiment, by intentionally adding EBO (data indicative of the position of the end of the DCT coefficient data within the DCT block), the non-played back coefficient data are replaced by 0. By this method, data control at the playback data synthesizer 110 is simplified, and high-speed playback can be achieved without performing high-speed playback control at the high-efficiency decoder 14.

At the deshuffling memory 111, based on the input DCT coefficients, the DCT blocks are reconstructed, and deshuffling is applied taking each DCT block as a unit, and the data of the respective DCT blocks are sent to the high-efficiency decoder 14.

The playback data in Huffman codewords input to the high-efficiency decoder 14 are decoded by the variable length decoder 23 to the original fixed length data, which are read out at a fixed rate at the buffer memory 24. These data are subjected to inverse quantizer at the inverse adaptive quantizer 25, and then to the inverse DCT circuit 26, where inverse discrete cosine transform is performed. As mentioned above, the DCT coefficient data that not played back are replaced by 0 prior to the inverse DCT. In this embodiment, in place of transferring 0 data, since EBO is intentionally written into the deshuffling memory 111, the arrangement of the DCT data is equivalent to the arrangement of data that would be obtained if 0 were inserted automatically at that time point.

Also, during the high speed playback, following inverse DCT, the luminance signal Y and two chrominance signals CR and CB are written into the field memories 27a and 27b based on the ID data detected by the digital decoder 12. At the field memories 27a and 27b, the intermittent playback data from the rotary heads 8a and 8b are synthesized into the high speed playback picture. More specifically, the high speed playback picture is synthesized by controlling the field memories 27a and 27b so as to rewrite the field memories 27a and 27b only on the basis of the playback DCT blocks via the rotary heads 8a and 8b. The synthesized high speed playback picture output is sent to the D/A converters 15a to 15c.

Next is a description of the operation of the drum and capstan motor control system during high speed playback with reference to FIG. 5.

The drum motor controller 52 utilizes the reference signal from the central controller 49, and the drum PG and FG signals from the drum motor 50 For controlling the rotation of the drum motor 50, and generating the reference signal for playback control of the capstan motor. In this embodiment, it is presumed to simplify the description that the operation does not involve compensation for relative speed changes of the rotary heads which are employed conventional analog VTRs.

On the basis of the control signal from the drum motor controller 52, the drum motor driver 51 produces the voltage for driving the drum motor 50.

At the capstan controller 54, the CTL signal from the control head 53 is used for controlling the tape transport speed. In addition, the phase of the rotary heads 8a and 8b are controlled in accordance with the above-mentioned reference signal, the CTL signal, and the offset signal from the central controller 49.

During high speed playback, the offset signal supplied from the central controller 49 to the capstan controller 54 is ON, and accordingly, the capstan controller 54 performs ½ track pitch offset. In other words, compared to normal playback, the rotary head tracking phase is offset at a ½ track pitch. The tracking is adjusted at the track center. On the basis of the control signal from the capstan controller 54, the capstan driver 55 produces the voltage for driving the capstan motor 56.

Thus, in accordance with this embodiment, during high speed playback, the tape transport speed is set to an even multiple and the phase of the rotary heads 8 is offset at a ½ track pitch. As a result, the proportion (percentage) of the digital data that are played back within one scanning period of the rotary heads is increased, as shown in FIG. 11, and more efficient high speed playback can be achieved.

For example, at six-time speed, in the prior art example, about 50% of the digital data were played back per rotary head scanning period. In contrast, in this embodiment, by offsetting the tracking by a ½ track pitch, the playback efficiency per rotary head scanning period is improved from the previous 50% to about 60%. During double speed, actual measurements demonstrated playback efficiency of about 90% was possible.

Also, by collectively recording important data within the DCT block in the regions at the track center and near the track ends, good speed search can be realized at double speed, six-time speed, and 18-time speed with the same recording format. Especially, at the double speed, good playback picture quality with S/N (for each DCT block) was about 34 dB. At six-time speed, S/N for each DCT block was about 28 dB, which is the limit of tolerance. Thus it was possible to obtain playback picture of a good quality at relatively low high-speed playback speeds.

In the above description of the embodiment, the high-speed playback is at double and six-time speeds. However this embodiment is not limited to these speeds. As can be seen From FIG. 11, by setting the tape speed to 10 times, 14 times, . . . , or (4n+2) times in general, and offsetting the rotary head tracking phase by ½ track pitch with respect to normal playback, the digital data playback efficiency per rotary head scanning period can be improved, and particularly at the low speed side of high speed playback, good high speed playback pictures can be obtained.

The recording format generator 100 and the recording format generating controller 104 may have configurations other than those shown in FIGS. 3 and 4. For example, it is possible to attain similar results by using a common memory For the shuffling memory 101 as well as for the buffer memory 21, or by using a common memory for the deshuffling memory 111 and the buffer memory 24.

Also in this embodiment, two-dimensional Huffman coding is applied to the DCT coefficient data after the DCT. But this should not be taken as imposing a limitation in the manner of processing the data. For example, similar effects can be attained by transferring only the DC component directly (directly as a digital value). In computer simulation, by transferring the DC component directly, better results were obtained from the viewpoint of compression efficiency. In this case, since the most important DC component in the picture data is transferred directly, which lines record DC components of which DCT blocks (which are the most important video data) is known, so that the recording format is conducive to high speed playback.

In the above embodiment, the video data of one field are divided into three categories and recorded by two-channel rotary heads. But this should not be taken as imposing a limitation. For example, if the important data are collectively recorded at the central region and the regions near the track ends, in a recording format in which the video data of one field are recorded over a plurality of tracks, good high-speed playback pictures can be obtained at high speed playback speeds that consumer digital VTRs are often required to operate. Also, satisfactory high speed playback can also be achieved with this format by using odd number multiple speeds, although there is some loss of playback efficiency.

Figure 13:
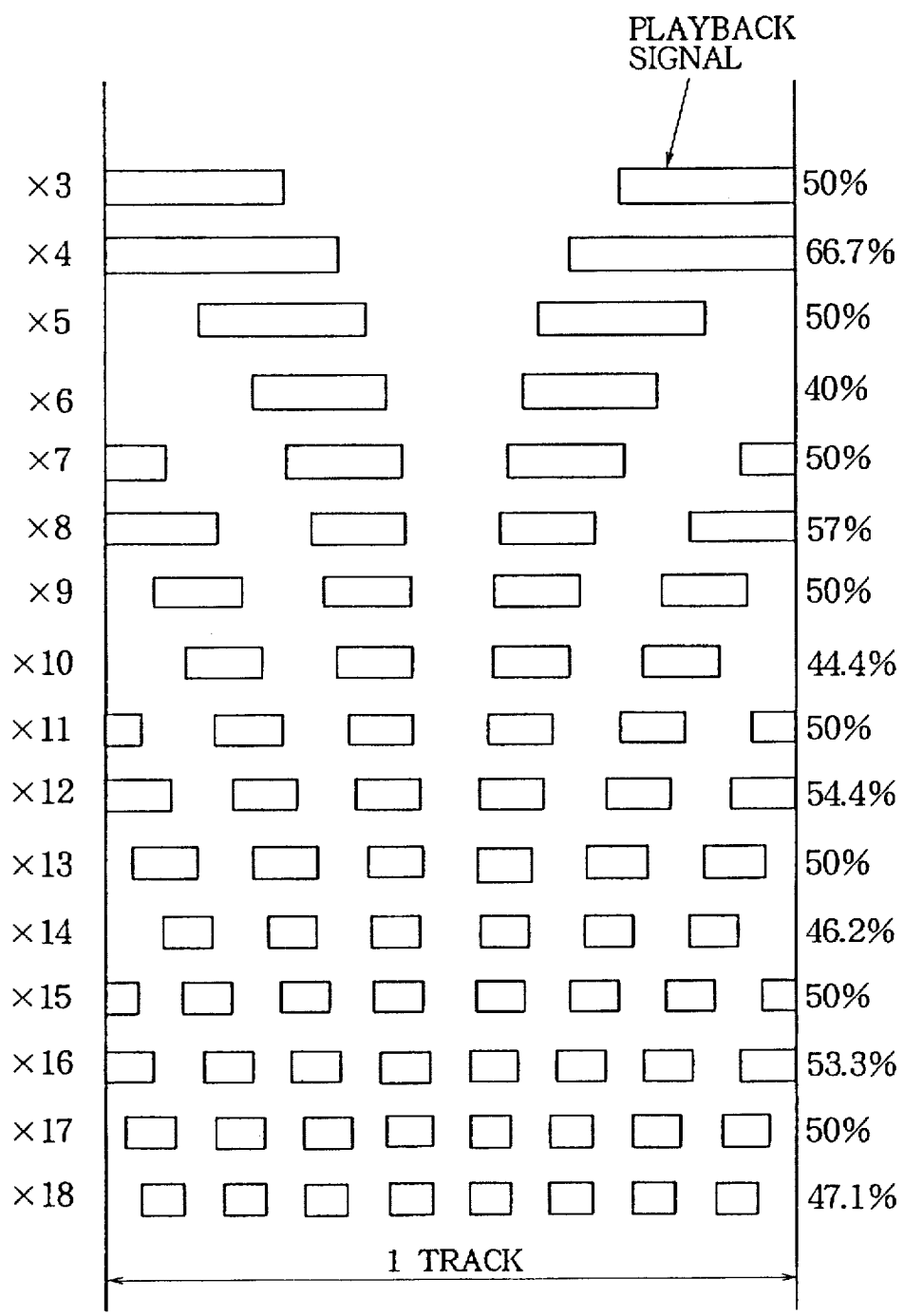
FIG. 13 is a diagram showing the positions on each track from which the playback signals are restored as correct data through error correction, at various playback speeds, using the magnetic recording/playback apparatus of Embodiment 1 and adjusting the tracking at one end of the track.

FIG. 13 also shows, for various speeds, positions and distributions of the areas from which the playback data are obtained during one rotary head scanning period. In the same manner as FIG. 11, ½ track pitch offset is applied to the rotary head tracking phase. A differing point from FIG. 11 is that the tracking phase is controlled by the capstan controller 54 so that the playback output is minimum (or zero) at the track center. As illustrated, by setting the speeds to 4 times, 8 times, 12 times, . . . ,or 4n times in general, the percentage of the playback signal data obtained per scanning of the rotary head 8 becomes respectively 67%, 57%, 54.4%, and so on.

Thus, in the case of FIG. 13, by using a system whereby the tape transport speed is set to 4n times, ½ track pitch offset is applied to the rotary head tracking phase, and the rotary head rotational phase is controlled by the capstan controller 54 so as not to obtain the playback output at the track center, the obtainable playback signal amount within one rotary head scanning period is increased and favorable high speed playback pictures can be obtained.

Figure 14:
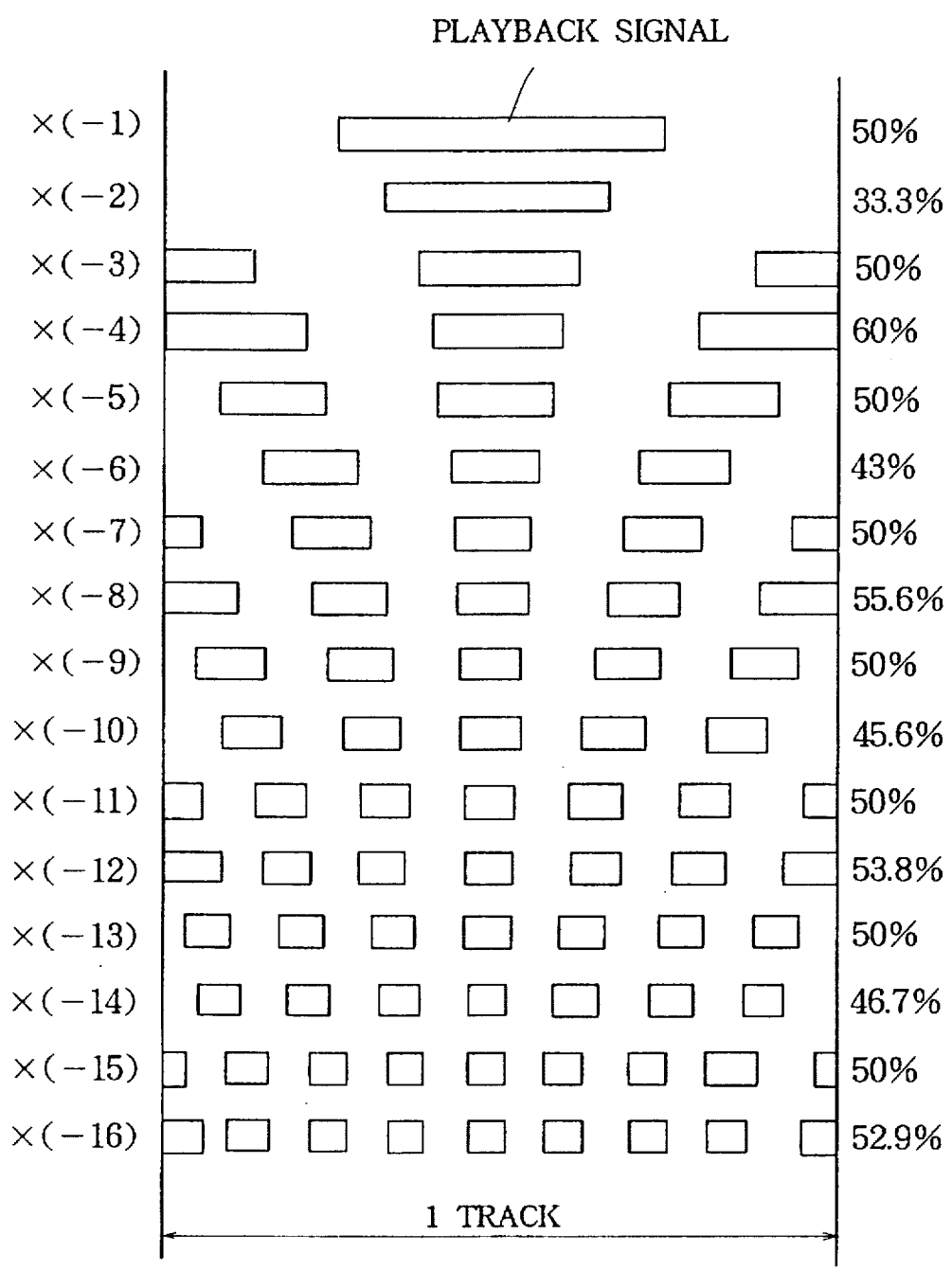
FIG. 14 is a diagram showing the positions on each track from which the playback signals are restored as correct data through error correction, at various reverse playback speeds, using the magnetic recording/playback apparatus of Embodiment 1 and adjusting the tracking at the track center.

FIG. 14 shows, For various speeds in the reverse direction, the positions and distributions of the areas from which the playback data are obtained during one rotary head scanning period. In the same manner as FIG. 11, ½ track pitch offset is added to the rotary tracking phase and the capstan controller 54 performs control in order to obtain an adequate playback signal from the track center area. As shown in the figure, by setting the speeds to −4 times the normal speed, −8 times, −12 times, . . . , or −4n times in general, the obtainable playback signal data per rotary head scan becomes respectively 60%, 55.6%, 53.8%, and so on.

Thus, in the case of FIG. 14, by using a system whereby the tape transport speed is set to −4n times, and ½ track pitch offset is applied to the rotary head tracking phase, and by controlling the capstan controller 54 so as to adjust the tracking at the track center, the obtainable playback signal data amount within one rotary head scanning period is increased and favorable high speed playback pictures can be obtained.

Figure 15:
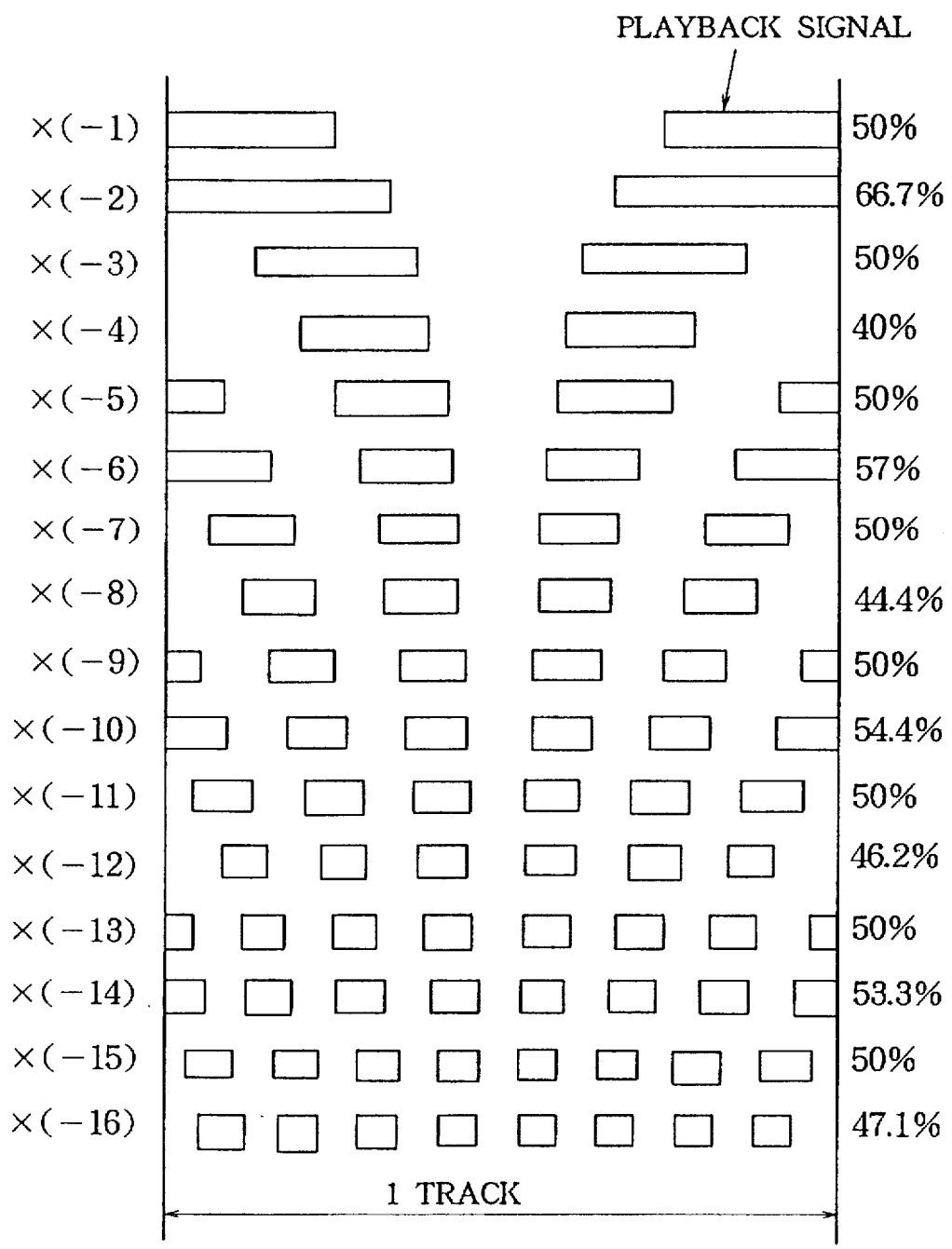
FIG. 15 is a diagram showing the positions on each track from which the playback signals are restored as correct data through error correction, at various reverse playback speeds, using the magnetic recording/playback apparatus of Embodiment 1 and adjusting the tracking at one end of the track.

FIG. 15 shows, for various speeds in reverse direction, the positions and distributions of the areas from which the playback data are obtained per rotary head scanning period. Like the example of FIG. 14, ½ track pitch offset is applied to the rotary head tracking phase. But, the capstan controller 54 is controlled so as not to obtain a playback output at the track center. As shown in the figure, by setting the speeds to −2 times the normal speed, −6 times, −10 times, . . . , or −(4n+2) times in general, the obtainable playback signal data per rotary head scan becomes respectively 67%, 57%, 54.4%, and so on.

Thus, in the FIG. 15 ease, by setting the tape transport speed to −(4n+2) times, applying ½ track pitch offset to the rotary head tracking phase, and controlling the capstan controller 54 so as not to obtain a playback output from the track center, the obtainable playback signal data amount within one rotary head scanning period is increased and favorable high speed playback pictures can be obtained.

Embodiment 2

Following is a description of a second embodiment, Embodiment 2, of this invention.

Embodiment 2 utilizes the same magnetic recording/playback apparatus as that described in Embodiment 1 and shown in FIGS. 1 and 2. Embodiment 2 utilizes the same recording format as that shown in FIG. 12.

Figure 44:
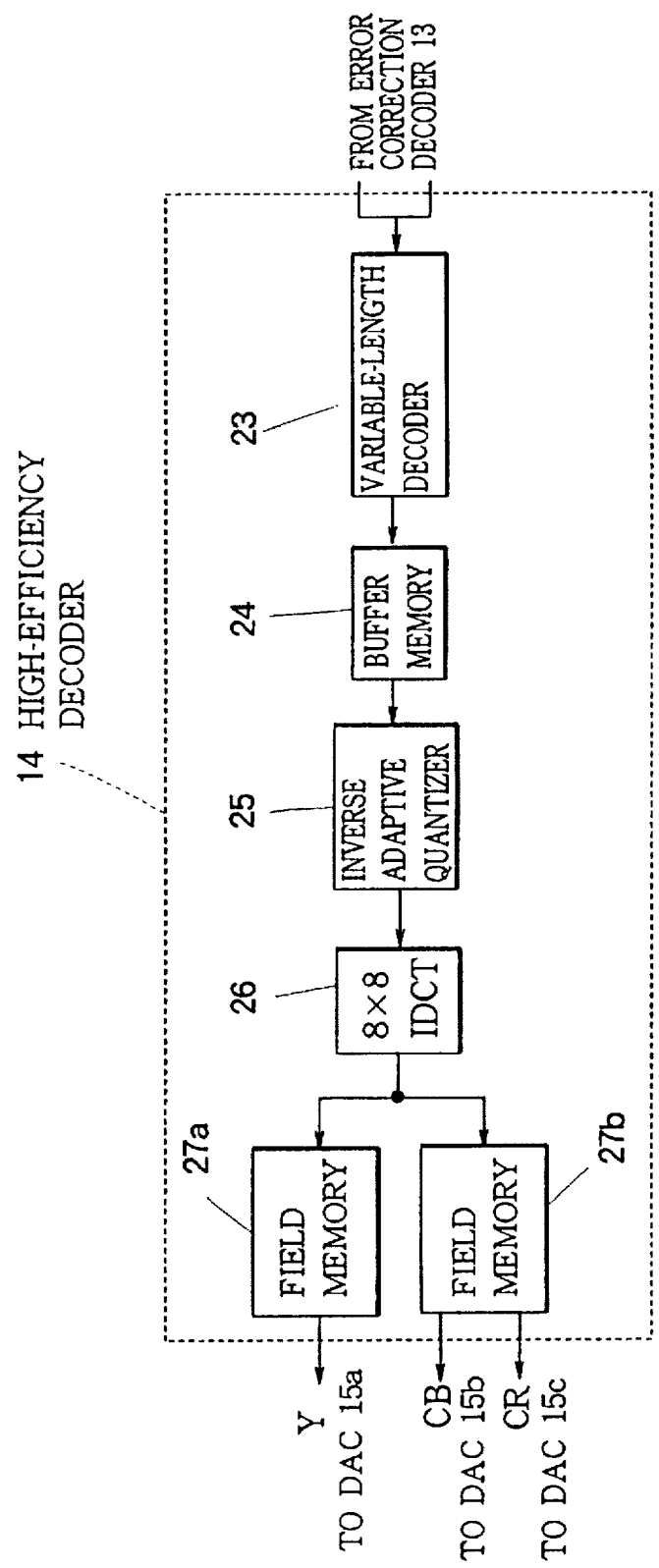
FIG. 44 is a block diagram showing a high-efficiency decoder provided in the conventional, digital VTR.

Block diagram representations of the high-efficiency encoder 3 and the high-efficiency decoder 14 are identical to those shown in FIGS. 43 and 44.

Figure 16:
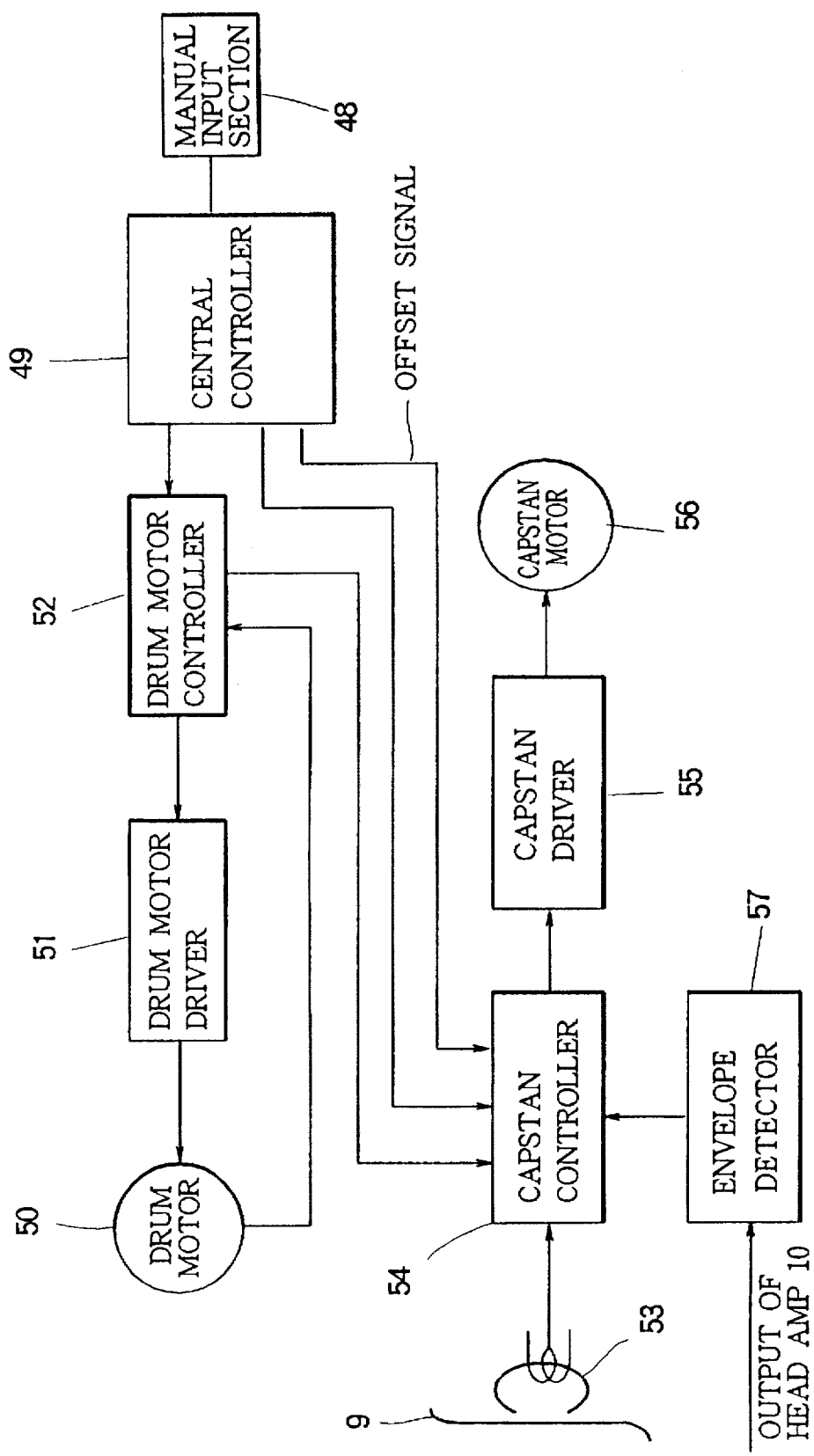
FIG. 16 is a block diagram of a drum and capstan motor control system performing control over the rotary drum and the capstan motor Used in the magnetic recording/playback device of Embodiment 2.

FIG. 16 shows the drum rotation and capstan transport control system used in this embodiment. Although the illustrated configuration is essentially identical to that of FIG. 5, it differs by the provision of an envelope detector 57.

Generally, when video data is recorded on a magnetic tape, due to the characteristics of the mechanism system in a VTR, a track curvature is produced. During high speed playback with a VTR possessing this type of track curvature, even though the capstan and motor phase are controlled so as to apply ½ track pitch offset to the tracking phase as described in connection with Embodiment 1, it can happen that the rotary heads do not play back from areas of the track from which playback of data is most desired (the areas where the most important and important data are recorded). This problem easily occurs when a tape recorded by another (interchangeable) VTR is played back. This embodiment (Embodiment 2) relates to tracking control in order to obtain satisfactory high speed playback pictures in such cases.

Following is a description of the operation of the drum rotation and capstan transport control system of a magnetic recording/playback apparatus in accordance with Embodiment 2 with reference to FIG. 16.

The playback signals from the rotary heads 8a and 8b are amplified by the head amplifiers 10a and 10b. The envelope detector 57 detects the envelope of the playback signal from the head amplifier 10a or 10b, which then goes to the capstan controller 54.

During playback, the drum motor controller 52 uses an externally input reference signal and the drum PG and FG signals from the drum motor 50 to control the rotation of the drum motor 50 and also generates time reference signal for controlling the capstan during playback. Like Embodiment 1, it is presumed for simplicity of description, that compensation for rotary head relative speed variation, which is often performed in a conventional analog VTR, is not performed. On the basis of the control signal From the drum motor controller 52, the drum motor driver 51 produces the voltage for driving time drum motor 50.

At the capstan controller 54, the CTL signal from the control head 53 is used for controlling the tape transport speed. At the same time, on the basis of the offset signal from the central controller 49 and upon confirming that ½ track pitch offset is required, the position of the track of the rotary head 8 is computed on the basis of the rotational phase data of the drum motor 50 and the output of the envelope detector 57, and the rotary head tracking phase is controlled so as to obtain adequate playback output from the central portion of the track. On the basis of the control signal from the capstan controller 54, the capstan driver 55 produces the voltage for driving the capstan motor 56. Thus, the tracking phase is so controlled that the output of the envelope detector 57 is maximum at the track center.

By controlling the rotational phase of the rotary heads 8 in the above manner, even in cases when all the data of the most important and important areas B, D and F shown in FIG. 12 are not played back dime to such effects as VTR track curvature, it is ensured that the data of track center areas D2 alone or D1 to D3 is always played back, and the system is less vulnerable to effects of track curvature, especially at low speeds such as double speed, and satisfactory high-speed playback pictures can be obtained.

When the phase control of the capstan motor 56 is performed in the above manner, playback of data arranged at the track center position is obtained without fail, satisfactory high speed playback pictures can be obtained. Also, when track curvature is nearly absent, the results are similar to those of Embodiment 1, and the obtainable playback data efficiency per rotary head scanning period is increased and satisfactory high speed playback pictures can be synthesized.

In this embodiment, since a playback output from the track center portion is always assured, the arrangement may be such that only the most important data is recorded in this area.

In this embodiment, the tracking is so controlled that the playback output is maximum at the central portion of the track. However, the tracking may be controlled so that the playback output is maximum at some other specified position (where the most important information is recorded), and yet similar results are obtained.

In this embodiment, the description has been in reference to a recording format shown in FIG. 12. But this should not be taken as imposing a limitation. For example, the DCT blocks may be recorded as the minimum recording units for recording on the tape, after shuffling for each DCT block.

With such an arrangement, the tracking phase may be controlled as described above (including Embodiment 1), then the signal playback efficiency per rotary head scanning period is increased, and satisfactory high-speed playback pictures can be obtained.

Embodiment 3

In the above embodiment, the playback speeds for reverse direction high speed playback were not described. But as is clear from FIGS. 11, 13, 14 and 15, when the reverse direction high playback speeds are selected so as to obtain the same playback output pattern as the forward direction playback, good efficiency playback signals and satisfactory reverse direction high speed playback pictures can be obtained. For example, the output pattern of (-4)-time speed is the same as the output pattern of six-time speed; and the output pattern of (-16)-time speed is the same as the output pattern of 18-time speed.

Embodiment 4

The above embodiment referred to even multiple high speed playback, but satisfactory high speed playback pictures can be obtained in (-1)-time speed playback as well, since about 50% of the recorded data at the central. portion (or at the track end portions), as shown in FIGS. 12, 14 and 15, by applying ½ track pitch offset to the tracking phase. However, consideration must be given to the recorded data arrangement. Particularly where the ½ track pitch offset is given so as to play back the data from the portions shown in FIG. 14 and the playback speed is at the (-1)-time speed, only the data at the track center portion is played back. The video data recorded in areas B and F is not played back at all. Consequently, prior to recording, the data to be recorded in areas B, D and F, i.e., important data, requires processing such as altering the recording position over 3 field periods. For instance, a block recorded in the track center portion at the 1st field is recorded in the second field at the track upper end portion and in the 3rd field at the track lower end portion.

Embodiment 5

In the above embodiment, although the double and six-time playback speeds were mentioned, other speeds may also be used. Also in the reverse high-speed, such as reverse double speed (-2 times), reverse six-time speed (-6 times), visually satisfactory playback composed pictures can be obtained, since the playback efficiency of the digital data per rotary head scanning period is increased and, particularly at the lower speed side of high speed playback. This is achieved by setting the tape transport to an even multiple speed, and by applying ½ track offset compared to normal playback to the rotary head tracking phase.

Embodiment 6

Also, in the above embodiment, discrete cosine transform (DCT) was used as the band compression system (high-efficiency encoding system). But this should not be taken as imposing a limitation. In place of DCT, if data compression is performed by orthogonal transform (one-dimensional or three-dimensional orthogonal transform, of which DCT is a representative example), or predictive encoding, motion compensation, KL transform coefficients, or by combinations of these, similar results can be obtained.

Embodiment 7

Also, the recording format is not limited to that described in connection with Embodiment 1. For example, instead of the shuffling taking each DCT coefficient as a unit, shuffling taking each DCT block as a unit may be performed. Even in such a case, if the playback efficiency is increased, the number of DCT blocks played back is increased. Further, the percentage of the DCT block data that are renewed is increased. Thus, the playback synthetic image is satisfactory.

Embodiment 8

In the above embodiments, the description referred to use of a VTR with a two-channel recording system as shown in FIG. 46A. But this should not be taken as imposing a limitation. For example, with a recording system such as three channels as well, by controlling the tracking so that adequate playback output is obtained from the track center portion, the data playback efficiency per rotary head scanning period is increased and satisfactory high speed playback can be achieved.

Embodiment 9

Also, the rotary head arrangement is not limited to that shown in FIG. 46A. If the rotary head tracking phase is controlled so that adequate playback output is obtained from the track center portion, similar results can be obtained with other arrangements such as two-channel 180 degree opposing heads.

Embodiment 10

Also, in the above embodiment, the recording track quantity per field was not described in detail. But the embodiment can be applied irrespective of the segment quantity. For instance, the video signal of one field may be recorded on 5 tracks, or on 2.5 tracks. In general terms, similar results can also be obtained with a recording format whereby the input video data is completed over M fields and recorded on N tracks.

Embodiment 11

The above embodiment employs a recording format in which the high-efficiency encoded important data are recorded in three regions, at the track center, and near the upper and lower track ends. But this should not be taken as imposing a limitation. Satisfactory high speed playback pictures can be obtained by by recording the high-efficiency encoded important data at least at the track center area, and controlling the tracking so that adequate playback output is obtained from at least the track center area during high speed playback.

Embodiment 12

In the above embodiment, the tracking is performed by the drum rotation control means. But this should not be taken as imposing a limitation. In an alternative construction, the drum rotation occurs at a fixed speed, while the tracking is controlled by varying the tape transport speed. With such an arrangement, similar effects are obtained.

Embodiment 13

In the above embodiment, for the sake of simplicity, the description is made on a drum rotation phase control in which the drum rotation speed is not varied (the drum rotation speed is fixed) with the variation of the relative speed, as in a conventional analog VTR. However, the drum rotation speed may be varied with the variation of the relative speed during high-speed playback, as in an analog VTR. In such a case, similar results can be obtained.

When the drum rotation speed is controlled according to the high-speed playback speed, it is necessary to vary the tape transport speed, deviating from an even multiple (integer multiple) in accordance with that speed. In this case, for example, during double or six-time speed playback, the tape transport speed is controlled in order to obtain the head scanning trace as shown in FIG. 9 or 10. The speed of the high-speed playback as expressed in terms of the number of times the normal playback speed related to the drum rotation speed. That is, when the drum rotation speed is varied, the tape transport speed is accordingly varied.

Embodiment 14

Following description of another embodiment, Embodiment 14, of this invention. The magnetic recording/playback apparatus of this embodiment is the same as that of Embodiment 1 shown in FIGS. 1 and 2. However, this embodiment as well as Embodiments 15 to 28, later described, have a recording format different from those of Embodiments 1 to 13.

Figure 17:
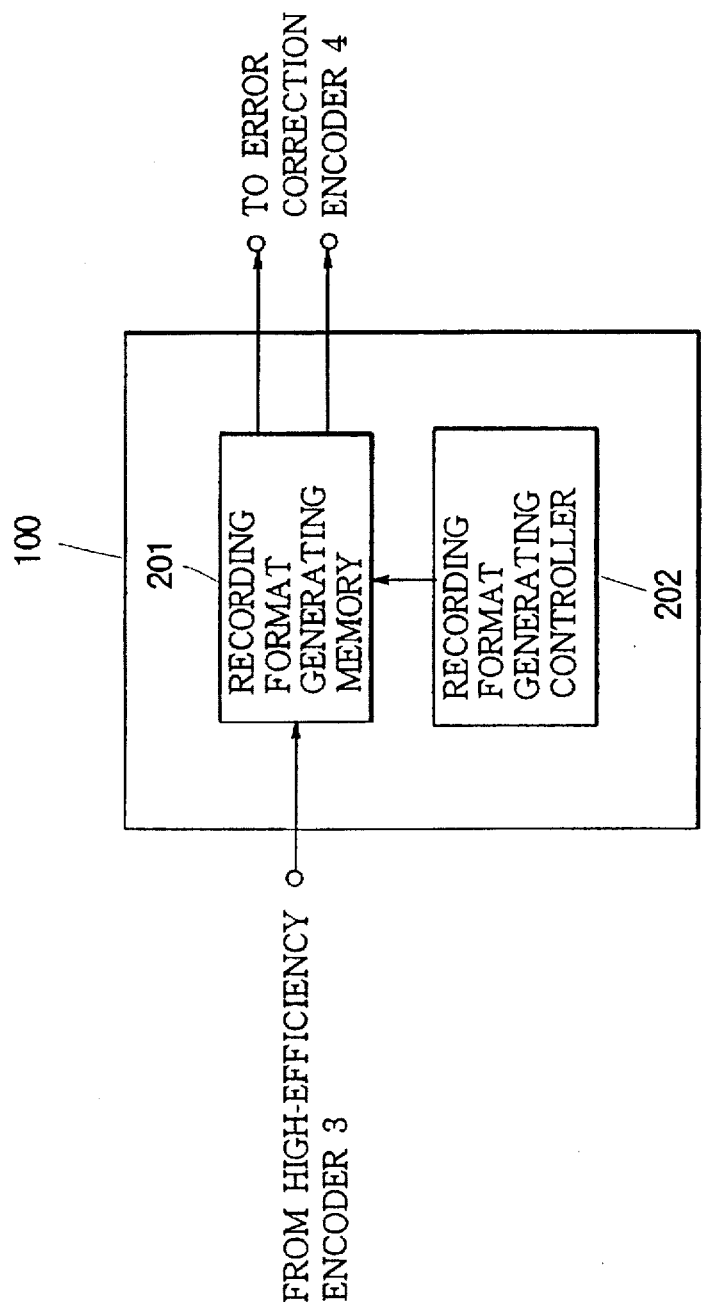
FIG. 17 is a block diagram of a recording format generator used in the magnetic recording/playback device of Embodiment 14.

FIG. 17 shows a recording format generator 100 used in Embodiment 14 of this invention. As illustrated, this recording format generator 100 comprises a recording format generating memory 201 for generating the recording format and a recording format generating controller 202 for controlling the recording format generating memory 201.

Figure 18:
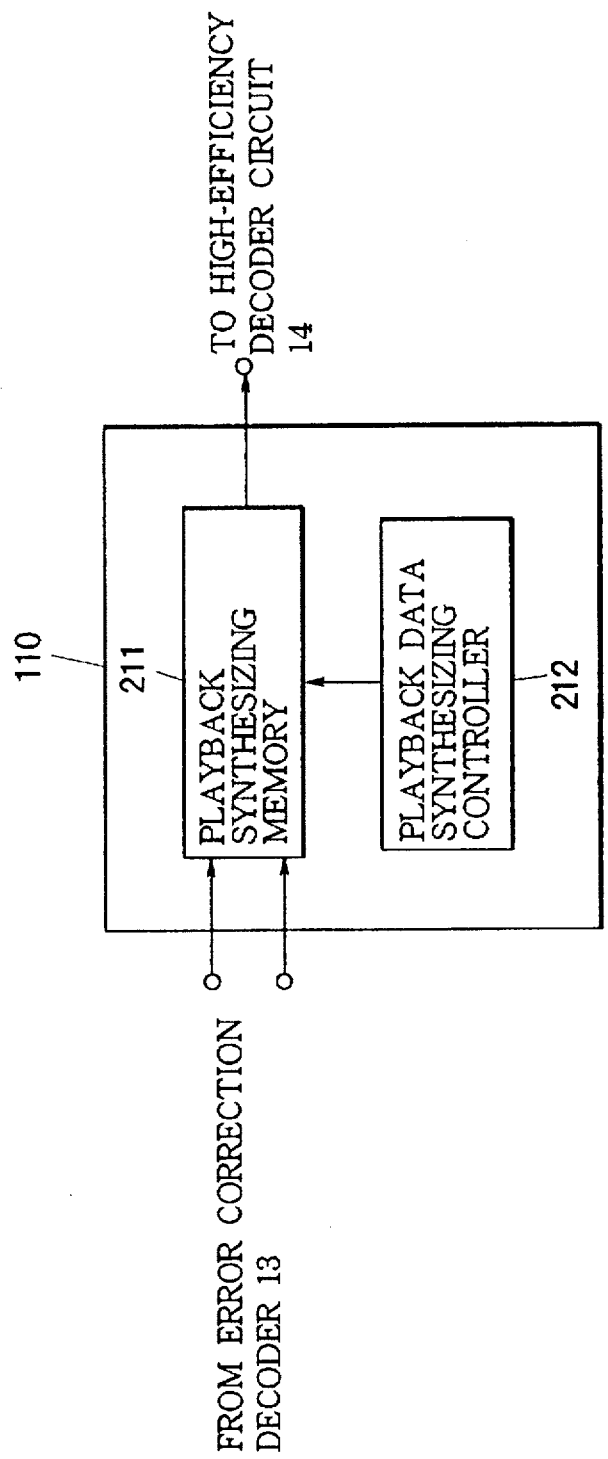
FIG. 18 is a block diagram of a playback data synthesizer used in the magnetic recording/playback device of Embodiment 14.

FIG. 18 shows a playback data synthesizer 110 used in this embodiment. As illustrated, this playback data synthesizer 110 comprises a playback data generating memory 211 and a playback data synthesizing controller 212. The playback data generating memory 211 returns the data having been rearranged by the recording format generator 100 to its original sequence. The playback data synthesizing controller 212 controls the playback data generating memory 211.

The operation of the recording system is essentially the same as described for Embodiment 1. However, the operation of the recording format generator 100 differs from Embodiment 1. In this embodiment, the recording format generating circuit 100 is so controlled as to dispose the video information on the magnetic tape 9 in such a manner that the video information of all the positions are obtained through synthesis of playback image on the basis of the playback signals from the rotary heads 8 of the respective channels, during high-speed playback.

Before describing the recording format in detail, the concept of this embodiment is described. In this description, the VTR is presumed to be provided with two channel combination heads and each frame of data is recorded over 10 tracks.

To obtain satisfactory playback pictures during high speed playback with the above mentioned digital. VTR, what is essential is to efficiently synthesize, at the field memory (or the field memories 27a and 27b), the playback digital signals which has been encoded for each DCT block. Particularly, as described in connection with the prior art example, when the picture data of specific positions on the picture are not played back at all during high-speed playback, the image at those portions remain unchanged, and the resultant picture is visually disturbing.

In the development of a consumer digital VTR, it is presumed that ordinarily two or three high playback speeds are required. Consequently, in terms of the recording format, one capable of obtaining a favorable playback picture at only one high playback speed cannot be deemed a satisfactory recording format.

Figure 19:
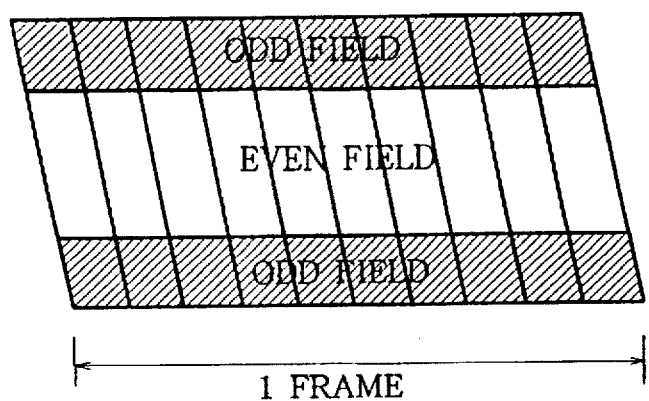
FIG. 19 is a schematic diagram showing the arrangement of the data of the odd and even fields on the magnetic tape and used for explaining the concept of the recording format of Embodiment 14.

Following is a description of the recording format concept of this embodiment with reference to FIG. 19.

Figure 51A:
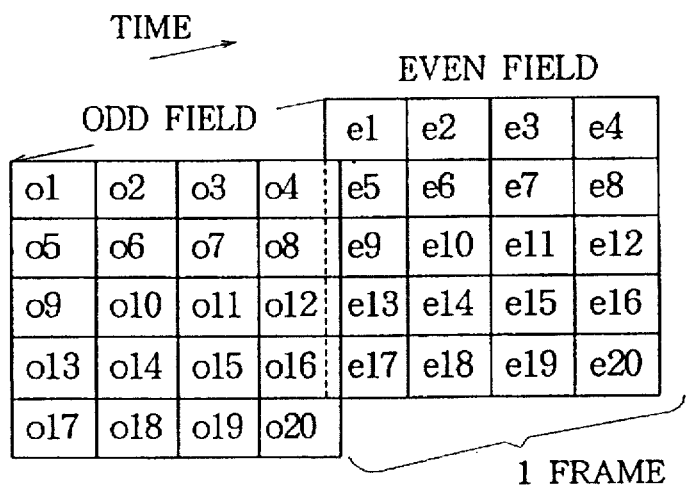
FIG. 51A is a diagram showing the arrangement of the recording format generating blocks of odd and even fields on the screen.
Figure 51B:
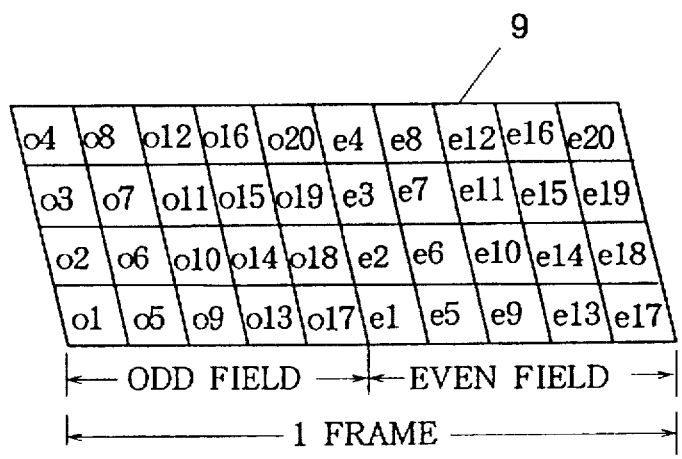
FIG. 51B is a diagram showing the arrangement of recording format generating blocks on the magnetic tape.
Figure 52A:
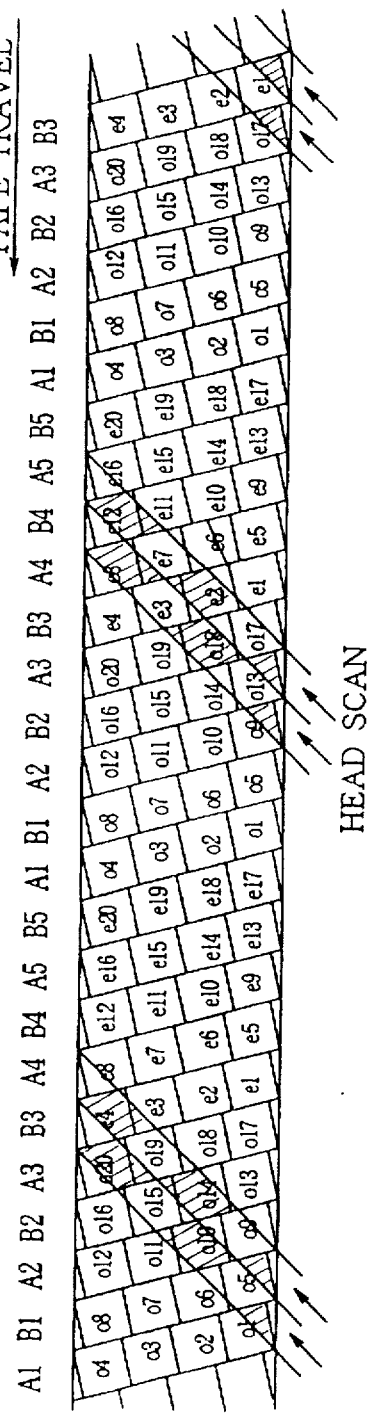
FIG. 52A is a diagram showing the track pattern and the scanning traces of the two-channel combination heads at the time of six-time speed search.
Figure 52B:
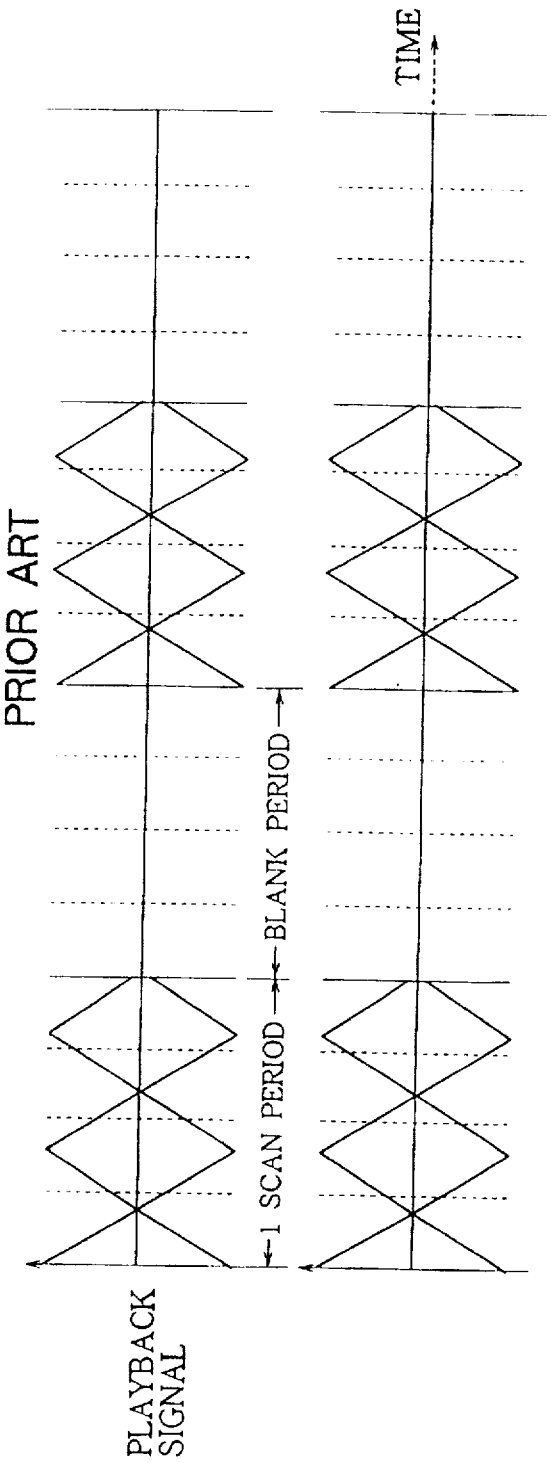
FIG. 52B is a diagram showing the level of playback signals obtained when the six-time speed playback is performed in the situation described in connection with FIG. 52A.
Figure 53A:
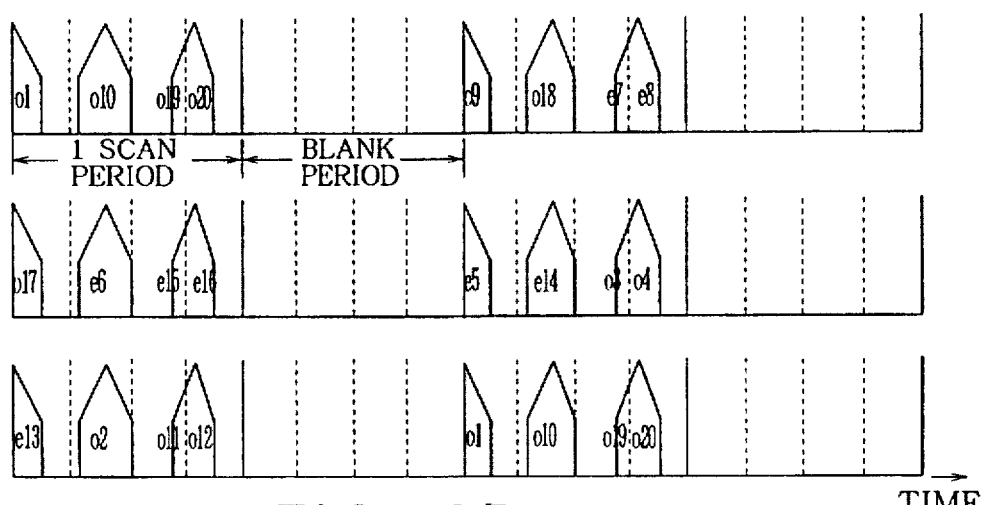
FIG. 53A is a diagram showing the playback signals which are obtained during the six-time speed playback and which can be restored as correct data through error correction during the six-time speed playback, in the situation described in connection with FIG. 52A.
Figure 53B:
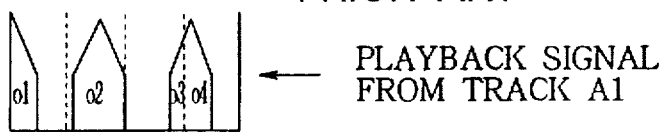
FIG. 53B shows the playback signals of blocks which are recorded on one of the tracks and which can be restored as correct data through error correction in the situation described in connection with FIG. 52A.
Figure 53C:
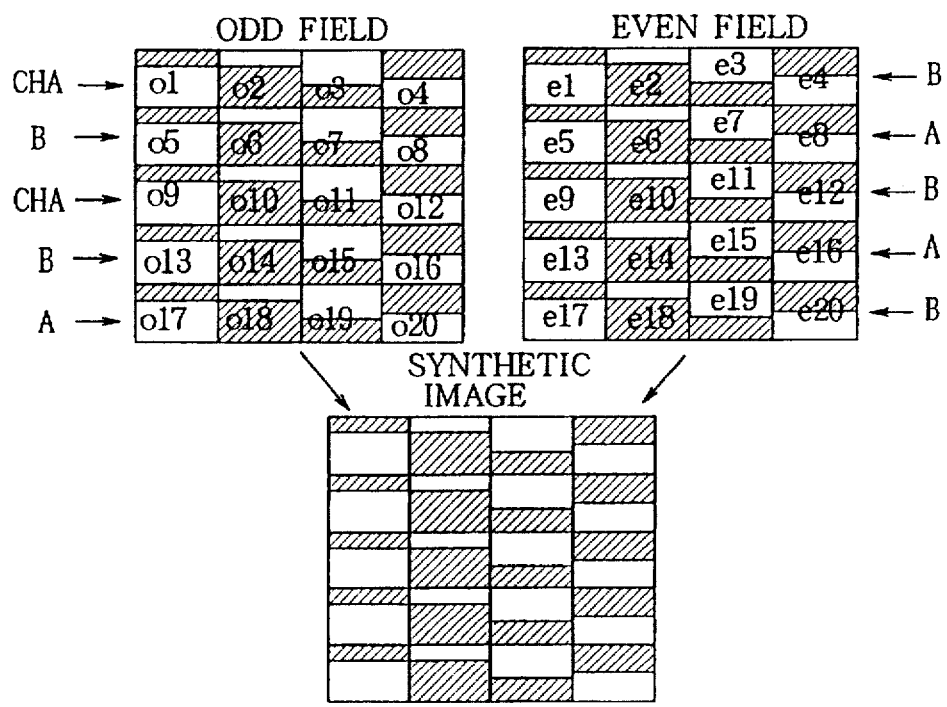
FIG. 53C shows the positions on the screen of the playback signals which can be restored through error correction in the situation described in connection with FIG. 52A.

In this embodiment, in the same manner as the prior art example, one field is divided into 20 recording format generating blocks, as shown in FIG. 51A. In the conventional recording format, each track records the video data of either one of the odd and even fields. In the recording format of this embodiment, each of the tracks on the magnetic tape 9 is divided into three parts in the rotary head scanning direction, as shown in FIG. 19. The video data of the odd fields are recorded at both edge portions of the tape, while the video data of the even fields are recorded at the central portion of the tape.

Figure 20A:
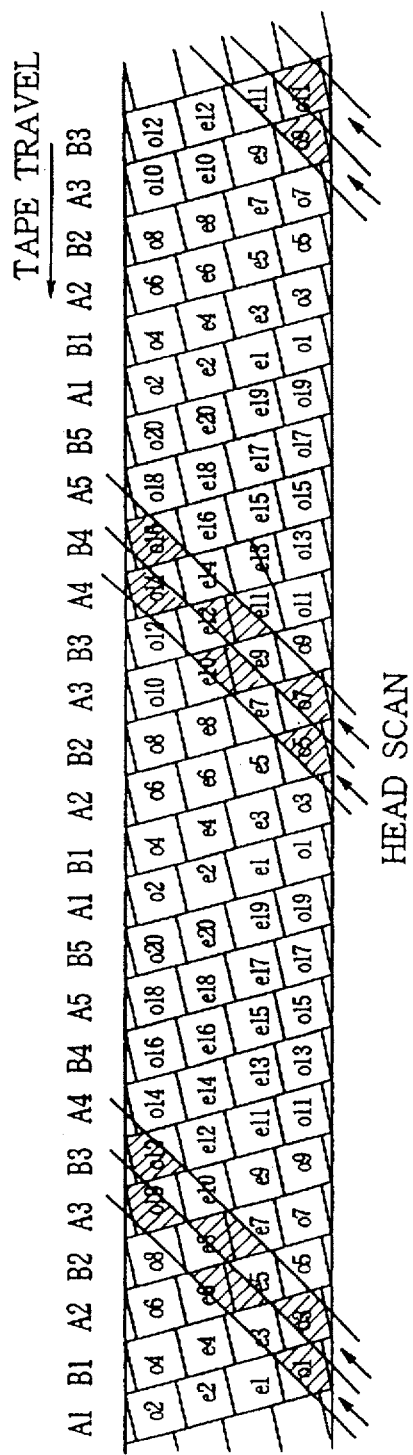
FIG. 20A is a diagram showing the track pattern of Embodiment 14 and the scanning traces of the rotary heads at the time of six-time speed playback using two-channel combination heads.

Next is a detailed description of the arrangement of the recording format generating blocks of the odd and even fields within one frame. The tracks off the magnetic tape 9 are divided into 4 regions in the rotary head scanning direction. As shown in FIG. 20A, the video data of the odd field video are recorded in two regions at both ends of each track, while the video data of the even field are recorded in the two regions in the center of the track. In the Figure, o1, o2, . . . , o20 and e1, e2, . . . , e20 respectively indicate the positions of the recording format generating blocks within the screen of each field shown in FIG. 51A.

Consequently, as shown in FIG. 20A, the video data of one frame are recorded in 10 tracks in recording format in the sequence from the bottom end of the first of the ten tracks to the upper end of the tenth track, i.e., in the order of o1, e1, e2, o2, from the bottom end of the first track, and then in the order of o3, e3, e4, o4 from the bottom end of the second track. Other recording format generating blocks are recorded in other tracks, in the same manner. Thus, the video data of the odd field are recorded at both ends of the recording tracks and the video data of the even field video are recorded at the center of the tracks.

Following is a description of the operation of the recording format generator 100 of this embodiment on the basis of the above mentioned recording format.

The recording data having been variable length encoded and supplied from the high-efficiency encoder 3 are applied to the recording format generating memory 201. At the recording format generating memory 201, the input data of the respective DCT blocks are divided into 20 recording format generating blocks according to the positions on the screen. In the description of this embodiment, it is assumed for simplicity of explanation, shuffling taking each DCT block as a unit is not applied.

The data of the respective DCT blocks which have been written into the recording format generating memory 201 are delayed by a predetermined amount (in this embodiment, by 1 frame) and output one recording format generating block at a time. The CH-A data are output in the sequence o1, e1, e2, o2, o5, e5, e6, o6, and so on, while the CH-B data are output in the sequence o3, e3, e4, o4, o7, e7, e8, o8, and so on. It is assumed that the sequence in which the data within the recording format generating block are read out is assumed to be in the picture scanning sequence, and one DCT block at a time. In this way, the recording format shown in FIG. 20A is generated. The recording format generating controller 202 provides control signals for the reading in and the writing from the recording format generating memory 201.

The data output from the recording format generator 100 are processed and recorded on the magnetic tape 9 in the same manner as described for Embodiment 1.

The operation of the playback system is also similar to the Embodiment 1. However, the operation of the playback data synthesizer differs from Embodiment 1. That is, the two channel playback digital data having been error corrected at the error correction decoder 13 are stored in predetermined addresses of the playback data generating memory 211, on the basis of the ID signal separated from the playback signal.

The stored data are then delayed by a fixed amount, and then the recording format generating blocks formed at the time of recording are decoded at the playback data synthesizing controller 212 and the data are then read out from the playback data synthesizing memory 211, on the basis of the addresses output from the playback data synthesizing controller 212.

Following is a description of six-time high speed playback operation with a digital VTR using the recording format with reference to FIGS. 2, 18 and 20A and 20B.

Figure 21A:
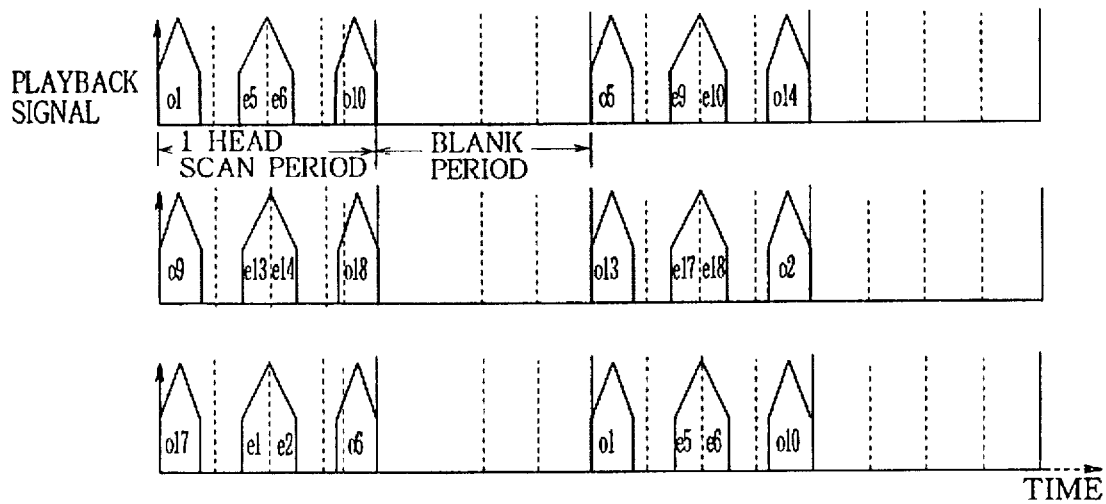
FIG. 21A shows the playback signals that can be restored as correct data through error correction in the embodiment of FIG. 20A.

FIG. 20A shows the track pattern and the scanning traces of the rotary heads 8 when performing six-time speed search. Since each channel rotary heads 8a and 8b possess mutually different azimuth angles, the data shown by the hatched areas in the figure is played back due to the azimuth effect. FIG. 21A shows the playback signals obtained by the rotary head 8a and restored as correct data through error correction at six-time speed playback.

Also shown in the figure, o1, o2, . . . , o20 and e1, e2, . . . , e20 refer to the numbers of the recording format generating blocks played back by the rotary head 8a. In this embodiment, during high speed playback, the offset signal from the central controller 49 applied to the capstan controller 54 is ON, and based on this the capstan controller 54 performs tracking control so as to adjust the tracking phase at the tape center.

In the recording format of this embodiment, by adjusting the tracking at the tape center in the above manner when recording and playing back by two channel combination heads, playback data efficiency is increased and satisfactory playback pictures can be obtained. A detailed description is given in Embodiment 21.

Figure 21B:
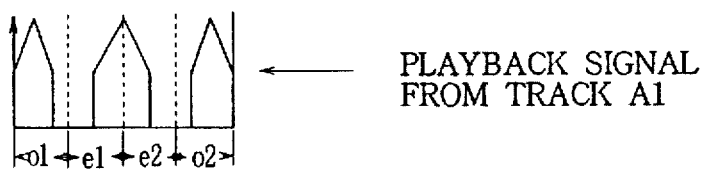
FIG. 21B shows the playback signals of blocks which are recorded on one of the tracks and which can be restored as correct data through error correction in the embodiment of FIG. 20A.

FIG. 21A shows the output pattern of the playback signals from the CH-A rotary head 8a at six-time speed search, as mentioned above. FIG. 21B shows the playback signals of the blocks 1 and 2, i.e., (o1, e1) and (o2, e2), of the respective fields, recorded on the first and second ones of the 10 tracks forming one frame, that are synthesized using a memory. FIG. 21B can be formed from FIG. 21A, by collecting the blocks recorded on the first and second tracks.

Figure 21C:
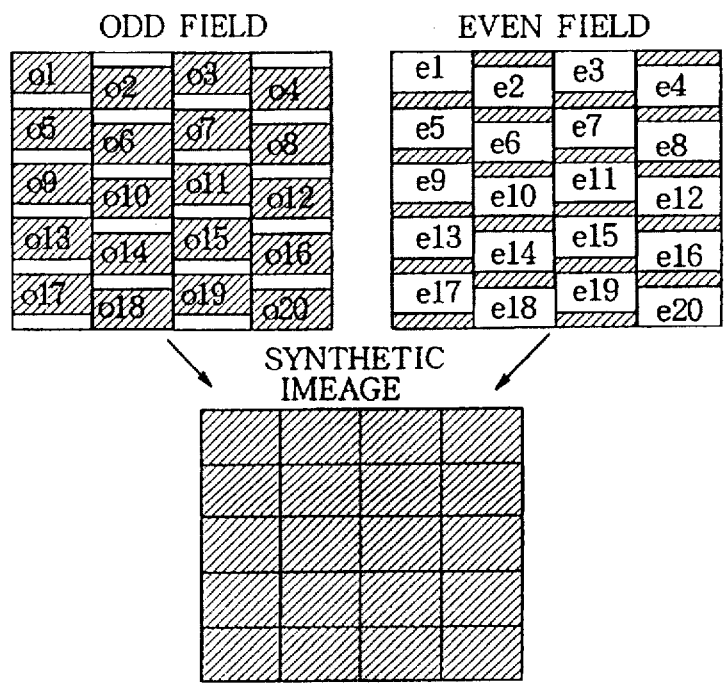
FIG. 21C shows the positions on the screen of the playback signals which can be restored through error correction in the embodiment of FIG. 20A.

FIG. 21C shows the playback synthetic image of the respective fields obtained when the recording format of the present embodiment is used, and six-time speed playback is performed. The hatched portions correspond to the positions of the picture elements where the playback data are obtained during six-time speed playback. The positions where the playback data of the odd field are obtained and the positions where the playback data of the even field are obtained are complementary to each other, so by synthesizing the data of the odd field and the data of the even field, all the video data throughout the screen is obtained. Consequently, the contents of the synthetic image in the field memory is periodically renewed at a fixed interval (one frame period in the present embodiment), and the resultant high-speed playback picture does not contain a fixed or unchanging part.

Figure 20B:
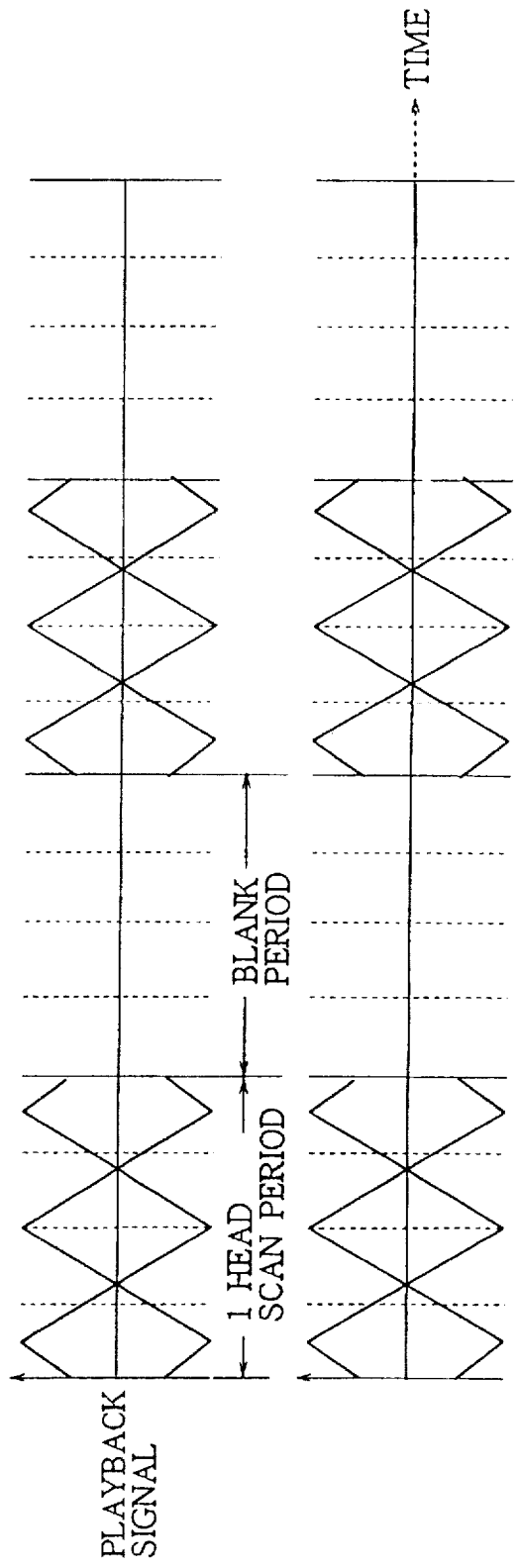
FIG. 20B shows the level of the playback signals obtained during high-speed playback in the embodiment of FIG. 20A.

As shown in FIG. 20B, the playback signals from the rotary head of each channel are intermittent. In general, Reed-Solomon coding of product coding system is used as error correction coding system. However, where the playback data are obtained only intermittently, blocks of the product coding system are not formed, and the error correction is performed only with the error correction coding in the direction of recording.

As mentioned above, FIG. 21A shows the numbers of the recording format generating blocks of which the playback data are restored as correct data through error correction. It is assumed, as in the prior art example, that the portions of the playback signals from rotary head 8a whose amplitude is 50% or more of the amplitude of the playback signals of the normal playback can be correctly restored through error correction, as in the prior art example.

Following is a description of the playback system operation during high speed playback with reference to FIGS. 2, 20A, 20B, 21A and 21B.

The intermittent playback signals from the rotary heads 8a and 8b of the respective channels are amplified by the head amplifiers 10a and 10b, and converted into digital data by data detectors 11a and 11b. At the same time, jitter (time base error) in the playback signal is absorbed. The digital demodulators 12a and 12b digital-modulate the digital data and convert them into the playback digital signals, which are applied to the error correction decoder 13. In this embodiment, detection of the ID signal applied during recording is performed after digital demodulation by digital demodulators 12a and 12b.

The error correction decoder 13 applies the error correction to the demodulated playback digital data. As mentioned above, since the data are played back intermittently by the rotary heads 8a and 8b, the error correction and detection are performed using the error correction code in the recording direction. The error correction flags from the error correction decoder 13 are applied to the playback data synthesizing controller 212. On the basis of the ID signal detected by the digital demodulator 12 and the error detection flags from the error correction decoder 13, the playback data synthesizing controller 212 generates the addresses for writing the playback digital data into the playback data generating memory 211. The data written into the playback data generating memory 211 are those determined to be free of error or those error corrected by the error correction decoder 13.

The playback digital data written into predetermined addresses of the playback data generating memory 211 on the basis of the playback ID data are sequentially read out on the basis of read addresses supplied from the playback data synthesizing controller 212. The digital data played back from the same track and passed through the playback data generating memory 211 are sent to the high-efficiency decoder 14.

At the high-efficiency decoder 14, the input playback data are converted into the original fixed length data by the variable length decoder 23. The fixed length data are then read out at a fixed rate at the buffer memory 24. The data read out of the buffer memory 24 are inverse-quantized at the inverse adaptive quantizer 25, and then supplied to the inverse DCT circuit 26, where inverse DCT is applied to the input playback digital signals.

During high speed playback, following the inverse DCT, the playback luminance signal Y and two chrominance signals CB and CR are written into the field memories 27a and 27b on the basis of the ID signals detected by the digital demodulator 12. At the field memories 27a and 27b, the intermittent playback data from the rotary heads 8 are synthesized to form the high speed playback picture. Specifically, the high speed playback picture is formed by controlling the field memories 27a and 27b so as to rewrite only the DCT blocks of the synthetic image played back from the rotary heads 8. Afterwards, the block coding applied during recording is decoded and the signals are sent to the D/A converters 15a to 15c.

When six-time speed playback is performed in the above manner, using the recording format of this embodiment, the odd and even fields of the playback signal output from the rotary heads are mutually complementary, so that the entire contents of the picture composed in the field memory are rewritten periodically. Thus, satisfactory high speed playback pictures free of fixed or unchanging parts can be obtained.

In the above description of this embodiment, it is assumed that shuffling is not applied for each DCT block. But it is also possible to apply shuffling to each DCT blocks. In such a case, the video data of DCT blocks having been shuffled are divided into the recording format generating blocks to form the recording format.

In addition, in the DCT block shuffling, it is more effective to use different shuffling patterns between even and odd fields.

In the above embodiment, the data of the even field are arranged at the track center and the data of the odd field are arranged at both ends of the track. However, it is possible to adopt the opposite arrangement, in which the data of the odd field are arranged at the track center and the data of the even field are arranged at both ends of the track.

In the above description of the embodiment, the recording format is generated for each field, i.e., taking each field as a unit. However, the recording format may be generated for each frame.

In the above description of the embodiment, the playback speed was six times the normal speed. However, it may be any other multiple of the normal speed.

In the above description of the embodiment, two-channel combination heads are used. However even when two-channel opposing heads are used, similar results are obtained, particularly at relatively low high-playback speed.

Embodiment 15

Following is a description of another embodiment, Embodiment 14, of this invention. The block diagram representations of the recording signal processing system and the playback signal processing system of the magnetic recording/playback apparatus of this embodiment are identical to those of FIGS. 1 and 2.

The block diagram representations of the recording format generator 100 and the playback data synthesizer 110 are identical to those of FIGS. 17 and 18.

Following is a description of the recording format of this embodiment.

This embodiment is similar to Embodiment 14 in that the the recording format generating circuit is controlled to produce a recording format that is suitable for high speed playback and is such that the video information of all the positions of the screen are obtained, during high-speed playback, by synthesis from the playback images using a field memory. This is done on the basis of the playback signals from the rotary heads of the respective channels.

Figure 54A:
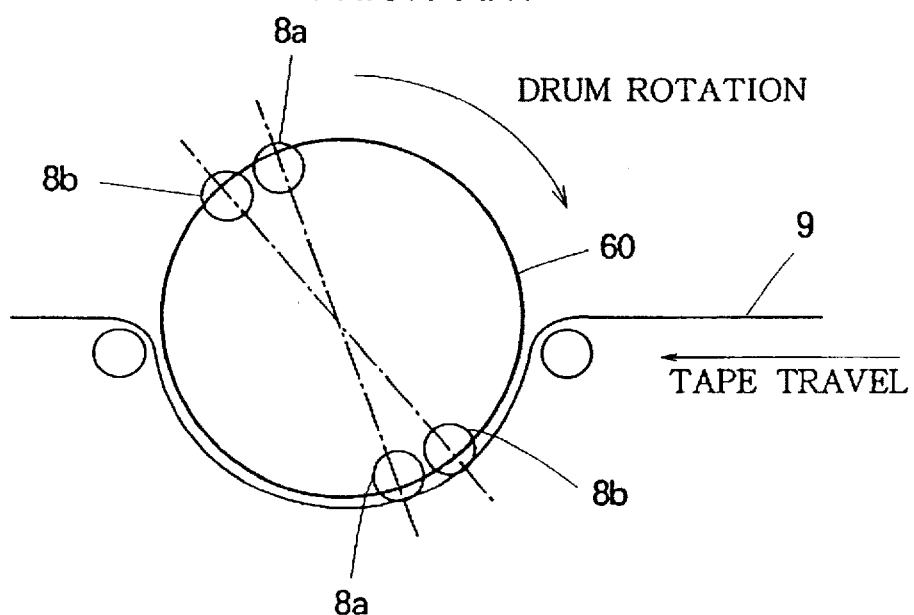
FIG. 54A is a schematic diagram showing the arrangement of two-channel opposing heads.
Figure 54B:
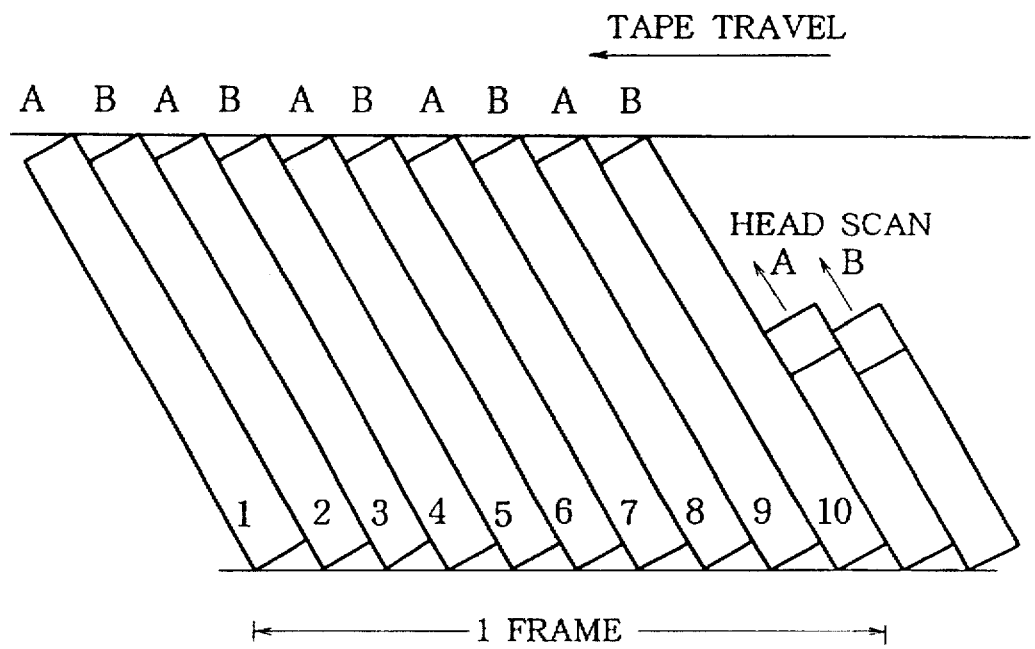
FIG. 54B is a diagram showing the tracks formed when the arrangement of FIG. 54A is used.
Figure 55A:
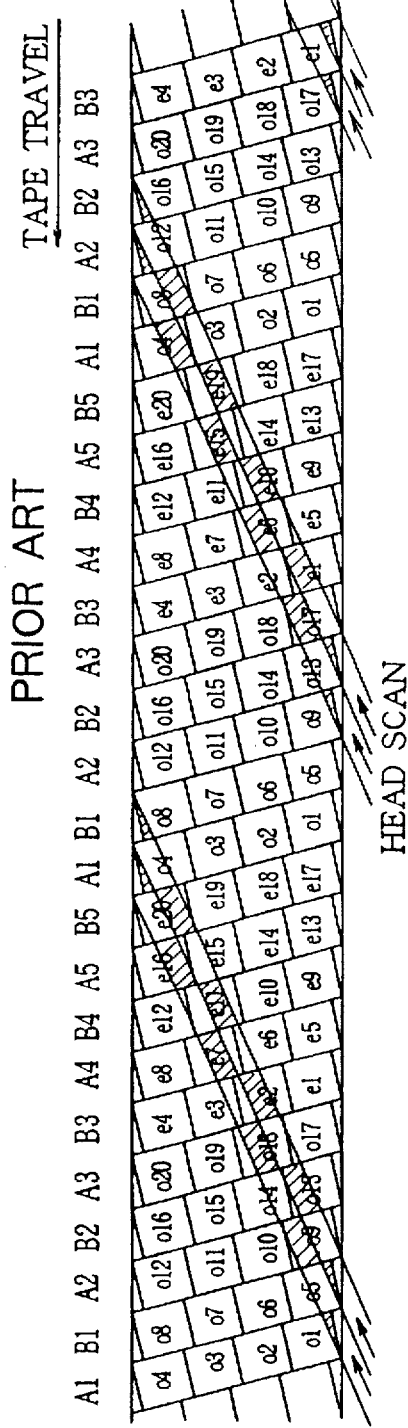
FIG. 55A is a diagram showing the track pattern and the scanning traces of the rotary heads during six-time speed playback and used for explaining the problem encountered when the two-channel opposing heads and the conventional recording format are used.
Figure 55B:
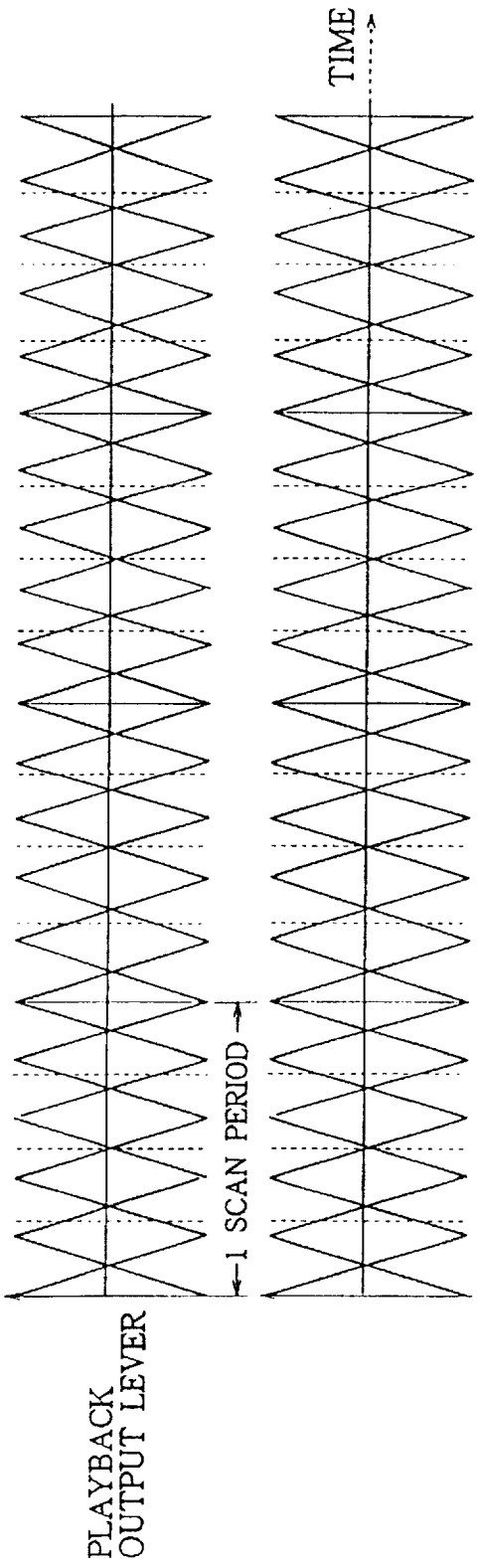
FIG. 55B shows the level of the playback signals during the six-time playback.

In the description of Embodiment 14, it was assumed that two-channel combination heads are used as in the case of the prior art example shown in FIG. 46A. In the following description of this embodiment, it is assumed that two-channel opposing heads as shown in FIG. 54A are used.

In this embodiment, the tracks on the magnetic tape are divided into three areas in the rotary head scanning direction, and the odd field video data are recorded at both tape edge areas and the even field video data are recorded in the center area, like Embodiment 14 and as shown in FIG. 19. Also, the recording format generating blocks shown in FIG. 51A are used as the units of recording format generation, like Embodiment 14.

Next is a detailed description of the arrangement on the tracks of the recording format generating blocks of the odd and even fields within 1 frame.

Figure 22A:
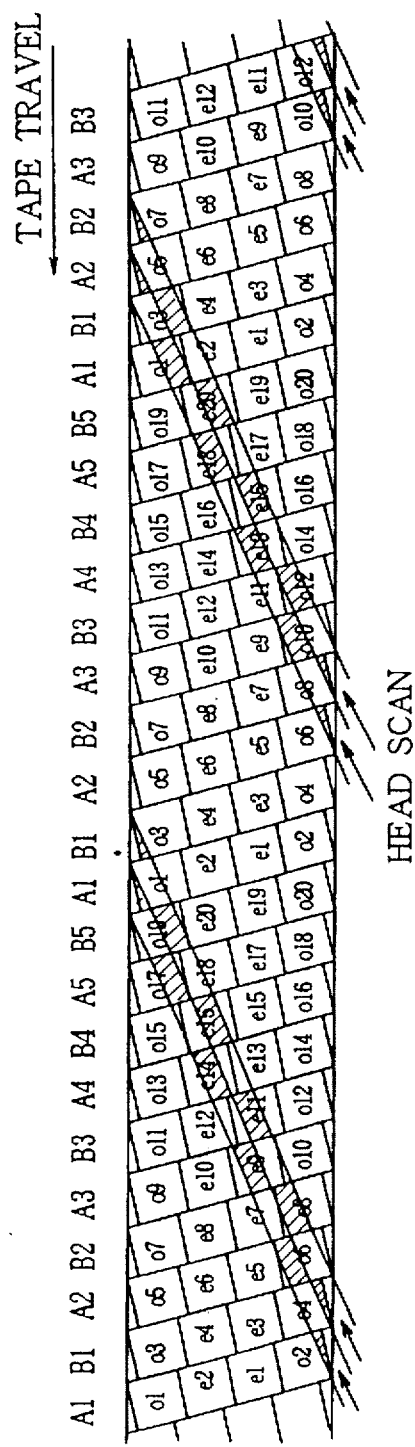
FIG. 22A is a diagram showing the track pattern and the scanning traces of the rotary heads at the time of six-time speed playback using two-channel opposing heads in Embodiment 15.

The tracks of the magnetic tape are divided into 4 regions in the rotary head scanning direction. As shown in FIG. 22A, the video data of the odd field are recorded in two regions at both ends of each track, while the video data of the even field are recorded at the two central regions.

In this embodiment, when arranging the recording data, control is performed so that the recording format blocks of the identical positions (of identical block numbers) in the odd and even fields which are consecutive to each other are not arranged at adjacent positions on the tape. That is, the regions in which the recording format generating blocks of the identical number and of different fields are separated by at least one other region. In other words, the recording area of a recording format generating block with the same number as a different field is mutually separated by a minimum of one other intervening area. Consequently, the region where the video data of a certain position or area in the screen of one of the two consecutive fields and the region where the video data of the same position or area in the screen of the other of the two consecutive fields are separated by at least one other region (one other region, in the example shown in FIG. 22A).

As shown in FIG. 22A, the recording format generating blocks of one frame are recorded in 10 tracks. The first one of the ten tracks is used for recording recording format generating blocks o2, e1, e2 and o1, in the stated order, from the bottom end of the track. The second one of the ten tracks is used to record the recording format generating blocks o4, e3, e4 and o8, in the stated order, from the bottom end of the track. The other tracks are used for recording other recording format generating blocks in a similar manner.

Like Embodiment 14, the video data of the odd field are recorded at both end regions of the tracks, while the video data of the even field are recorded in the regions at the center of the track. But the regions in which the video data of the recording format generating blocks are respectively recorded are reversed: the lower end region recording the recording format generating block with a number larger than the number of the recording format generating block recorded in the upper end region. In other words, the recording format generating blocks (e.g., o1 and o2) of the odd field are arranged, in the sequence of their numbers, in the order from the upper to the lower ends of each track. In contrast, the recording format generating blocks (e.g., e1 and e2) of the even field is opposite. They are arranged, in the sequence of their numbers, in the order from the lower to the upper ends of each track.

Following is a description of the operation of the recording format generator 100 of this embodiment, on the basis of the above mentioned recording format.

The recording data having been variable length encoded and output from the high-efficiency encoder 3 are applied to the recording format generating memory 201, where the input data of the respective DCT blocks are divided into 20 recording format generating blocks according to their positions in the screen.

The data of the DCT blocks written into the recording format generating memory 201 are delayed by a predetermined amount (one frame, in this embodiment) and output, one recording format generating block as a unit. The CH-A data are output in the sequence o2, e1, e2, o1, o6, e5, e6, o5, and so on, and the CH-B data are output in the sequence o4, e3, e4, o3, o8, e7, e8, o7, and so on.

Like Embodiment 14, the data of the recording format generating block are read out one OCT block as a unit, and in the sequence of the picture scanning. Consequently, the recording format shown in FIG. 22A is generated. The recording format generating controller 202 generates control signals for the reading from and the writing in the recording data generating memory 201.

The data output from the recording format generating circuit 100 are supplied to the error correction encoder 4, where the error correction code is applied. They are then digital-modulated by digital modulators 5a and 5b. Next, they are then sent to the sync signal adders 6a and 6b, where sync and ID signals are applied. The recording digital signals are then amplified by the recording amplifiers 7a and 7b, and recorded on the magnetic tape 9.

The operation during normal playback of the digital VTR provided with this recording format is identical to that described with reference to Embodiment 14.

Following is a description of six-time speed playback operation of the digital VTR using the above recording format, with reference to FIGS. 2, 22A, 22B, 23A and 23B.

Figure 22B:
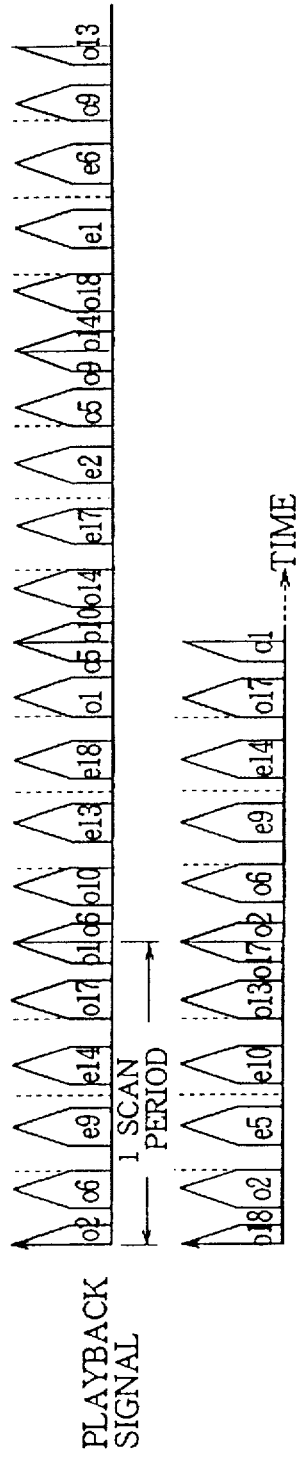
FIG. 22B shows the playback signals that can be restored as correct data through error correction in the embodiment of FIG. 22A.

FIG. 22A shows the track pattern and the scanning traces of the rotary heads 8 when performing six-time speed search. Since the rotary heads 8a and 8b of the respective channels possess mutually different azimuth angles, due to the azimuth effect, the data shown by the hatched areas in the figure are played back. FIG. 22B shows the portions of the playback signals which are obtained from the rotary head 8a and restored as correct data through error correction at six-time speed playback.

The reference marks o1, o2, ..., o20 and e1, e2, ..., e20 in the figure refer to the numbers of the recording format generating blocks played back by the rotary head 8a. Unlike Embodiment 14, the tracking is adjusted at the bottom edge of the tape. Consequently, it is not necessary to apply the offset signal to the capstan controller 54.

Figure 23A:
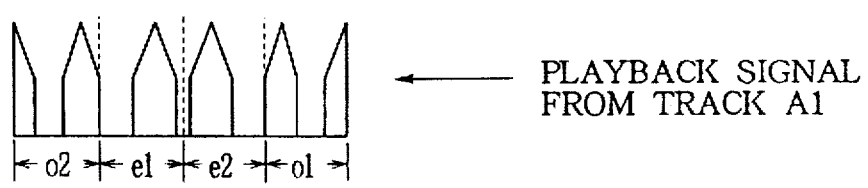
FIG. 23A shows the playback signals of blocks which are recorded on one of the tracks and which can be restored as correct data through error correction in the embodiment of FIG. 22A.

FIG. 22B shows the output pattern of playback signals from the CH-A rotary head 8a when performing six-time speed search. FIG. 23A shows the playback signals of the blocks 1 and 2, i.e., (o1, e1) and (o2, e2), of the respective fields recorded on the first one of the ten tracks forming one frame, and obtained by synthesis using a memory. FIG. 23A is formed from FIG. 22B, by collecting the playback signals of the blocks in the first track, played back during different scanning periods.

Figure 23B:
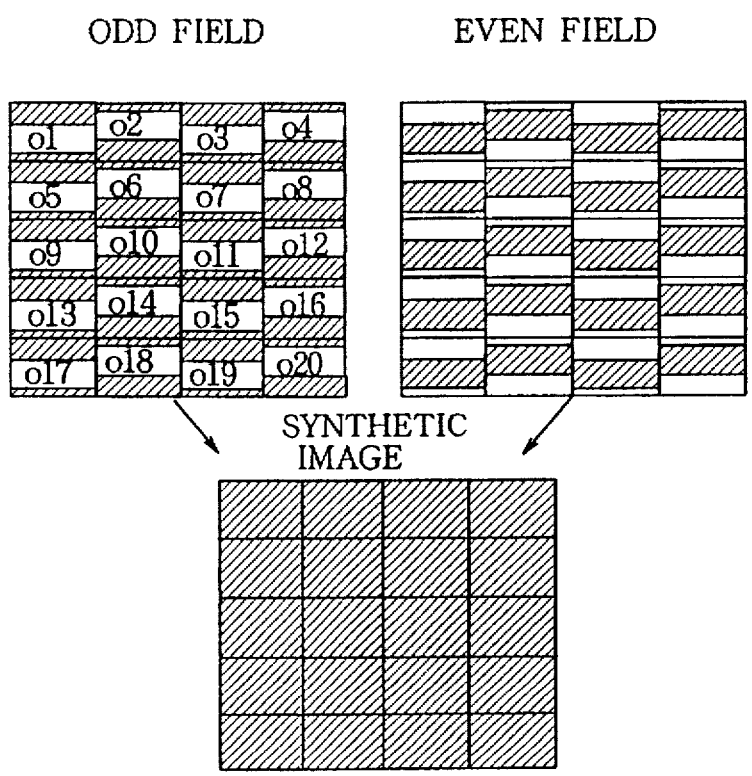
FIG. 23B shows the positions on the screen of the playback signals which can be restored through error correction in the embodiment of FIG. 22A.

FIG. 23B shows the playback synthetic images of the respective fields obtained when six-time speed playback is performed and the recording format of the present embodiment is used. The hatched areas correspond to the positions where the playback information is obtained. FIG. 23B is formed from FIG. 23A.

The positions where the video information of the odd field are obtained and the positions where the video information of the even field are obtained are complementary to each other, so the synthetic image obtained by synthesizing the images of the odd and even fields is complete. That is, the contents of the synthetic image in the field memory are entirely renewed periodically (at a two-frame period), so the resultant picture is free from fixed or unchanging parts.

The rest of the operation of the playback system at the time of six-time speed playback is identical to that of Embodiment 14.

In the above description off the embodiment, shuffling to each DCT block is not applied. However, it is also possible to shuffle the video data of the DCT blocks, taking each DCT block as a unit, and to divide these into the recording format generating blocks to form the recording data.

In addition, when shuffling the DCT block units, it is more effective to use different shuffling patterns between the even and odd fields.

Also, in this embodiment, the video data of the even field is arranged at the track center and the odd field at both ends of the track, but it is also possible to reverse the arrangement. That is, the even field may be arranged at the track ends, and odd fields in the track center.

In the above description of the embodiment, the recording format is generated for each field, i.e., taking each field as a unit. However, the same effect can be obtained by generating a recording format for each frame. In this case, when arranging the recording data, control is performed so that the same recording format blocks (of the same block number and of the different frames) are not arranged at adjacent positions. In other words, the regions in which the recording format generating blocks of the same block number of different frames are separated by at least one other region. As a result, the region in which the video data of a certain position in the screen of one of the two consecutive frames are recorded, and the region in which the video data off said certain position in the screen of the other of the two consecutive frames are recorded are separated by at least one other region.

Also, in this embodiment, the six-time speed playback was described. However, similar results can also be obtained with other multiple speeds.

In the embodiment, the recording format of this embodiment was described as being suitable for use with two-channel opposing heads. But similar results can be obtained when two-channel combination heads are used, depending on the playback speed (particularly lower side high speed playback) and suitable tracking. In other words, in this case, ½ track pitch offset is applied and the tracking is adjusted at the track center. For this purpose, the offset signal from the central controller 49 is applied to the capstan controller 54.

Embodiment 16

Following is a description of another embodiment, Embodiment 16, of this invention.

With the recording Formats of Embodiments 14 and 15, the output pattern of the playback signals of the odd field and the output pattern of the playback signal of the even field are complementary to each other at six-time high speed playback. Let us now consider a case where the playback speed is seven times normal speed, seven times being an odd multiple unlike six-time speed which is an even multiple.

Figure 24A:
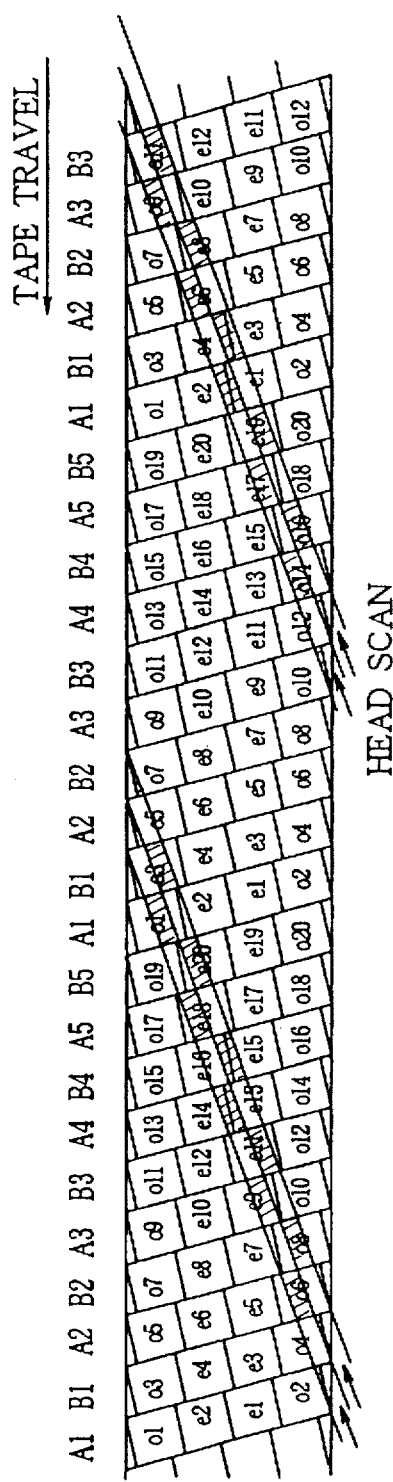
FIG. 24A is a diagram showing the track pattern of Embodiment 14 and the scanning traces of the rotary heads at the time of seven-time speed playback and used for explaining the problem encountered when seven-time speed playback is performed using the recording format of Embodiment 14.
Figure 24B:
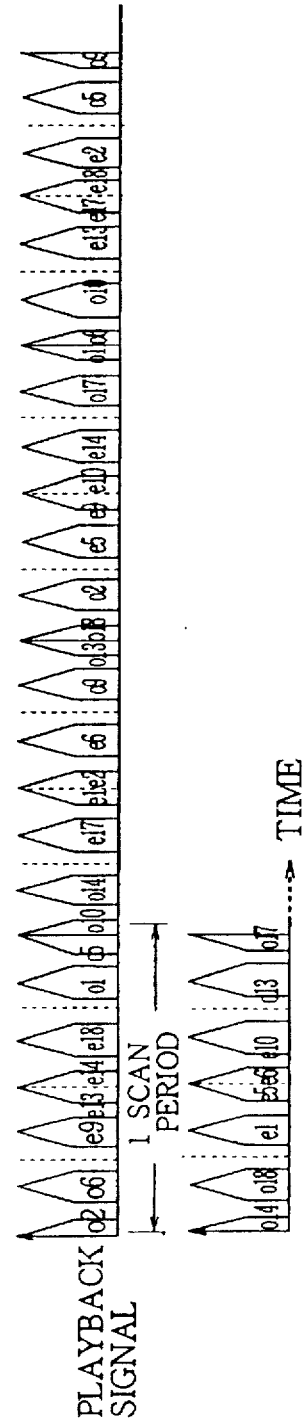
FIG. 24B shows the playback signals that can be restored as correct data through error correction in the situation described in connection with FIG. 24A.
Figure 25A:
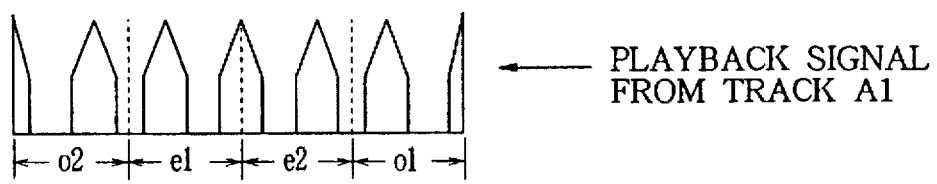
FIG. 25A shows the playback signals of blocks which are recorded on one of the tracks and which can be restored as correct data through error correction in the situation described in connection with FIG. 24A.

FIG. 24A shows the track pattern and the traces of the rotary heads during seven-time speed playback. FIG. 24B shows portions of the playback signals that are obtained from the rotary head 8a and are restored as correct data through error correction. In the figure, reference marks o1, o2, . . . , o20 and e1, e2, . . . , e20 indicate the numbers of the corresponding recording format generating blocks played back from the rotary head 8a. FIG. 25A shows the blocks 1 and 2, i.e., (o1, e1) and (o2, e2) recorded in the first one (A1) of the ten tracks forming a frame, and obtained by synthesis, using a memory, of the data of the respective fields. FIG. 25A is Formed from FIG. 24B, by collecting the blocks in the first track (A1), played back during different scanning periods.

Figure 25B:
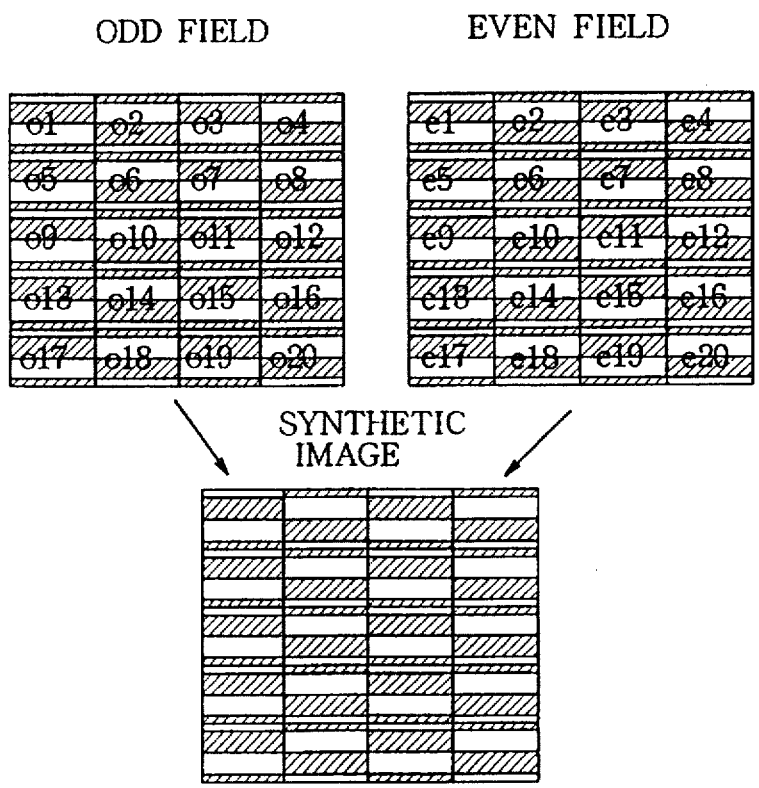
FIG. 25B shows the positions on the screen of the playback signals which can be restored through error correction in the situation described in connection with FIG. 24A.

FIG. 25B shows, at corresponding positions on the screen, the video data of the respective recording format generating blocks that are obtained through synthesis, when the recording format of this embodiment is used and seven-time speed playback is performed. The hatched areas correspond to the video data that are played back. FIG. 25B is formed From FIG. 24B. As is observed from FIG. 25B, time video data of the odd field that are played back and the video data of the even field that are played back appear at the same positions, and there are areas where no video data are obtained at all. As a result, only half the total video data in one field is obtained, and half the video data is not played back, and time corresponding video data in the field memory are not renewed or rewritten. The resultant picture therefore includes portions which remain unchanged, which of course is unsatisfactory.

Following is a description of the triple speed, taken as another additional example of an odd multiple speed, used with the recording format of this embodiment.

Figure 26A:
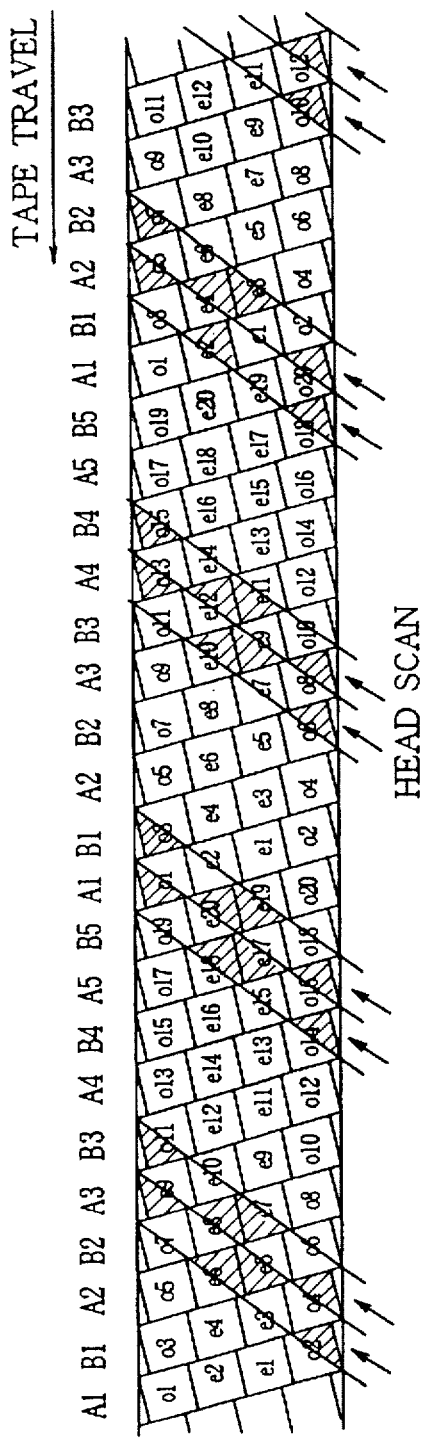
FIG. 26A is a diagram showing the track pattern of the recording format of Embodiment 16 and the scanning traces of the rotary heads at the time of triple speed playback and used for explaining the problem encounter when the recording format of Embodiment 16 is used and the the playback is performed at a triple speed.
Figure 26B:
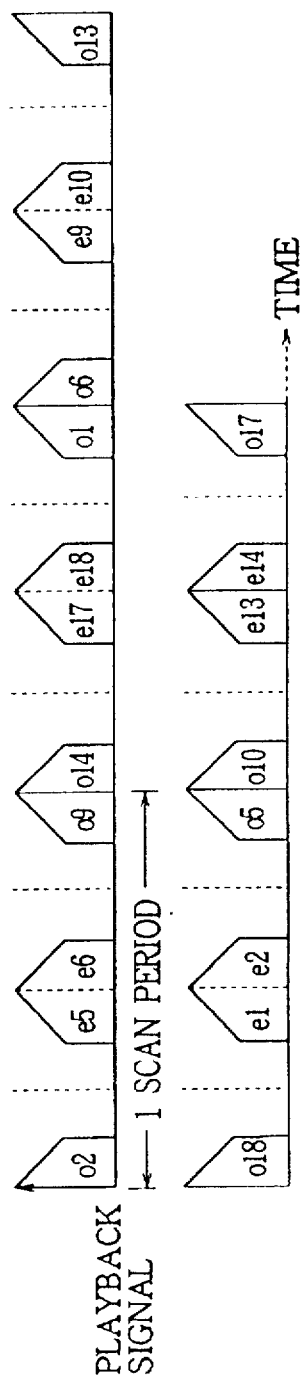
FIG. 26B shows the playback signals that can be restored as correct data through error correction in the situation described in connection with FIG. 26A.
Figure 27A:
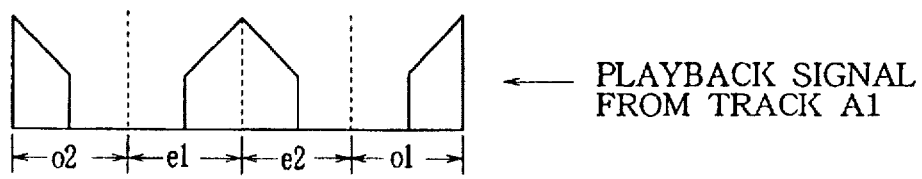
FIG. 27A shows the playback signals of blocks which are recorded on one of the tracks and which can be restored as correct data through error correction in the situation described in connection with FIG. 26A.

FIG. 26A shows the track pattern and the traces of the rotary heads during triple speed playback. FIG. 26B shows portions of the play back signals that are obtained by the rotary head 8a and restored as correct data through error correction. In the figure, the reference marks o1, o2, . . . , o20 and e1, e2, . . . , e20 indicate the numbers of the corresponding recording format generating blocks back from the rotary head 8a. FIG. 27A shows the based on FIG. 26B. FIG. 27A indicates the playback state of blocks 1 and 2, i.e., (o1, e1) and (o2, e2) recorded in the first track (A1) and obtained by synthesis, using a memory, of the video data played back during different scanning periods. FIG. 27A is formed from FIG. 26B, by collecting the video data of the first track (A1) played back during different scanning periods.

Figure 27B:
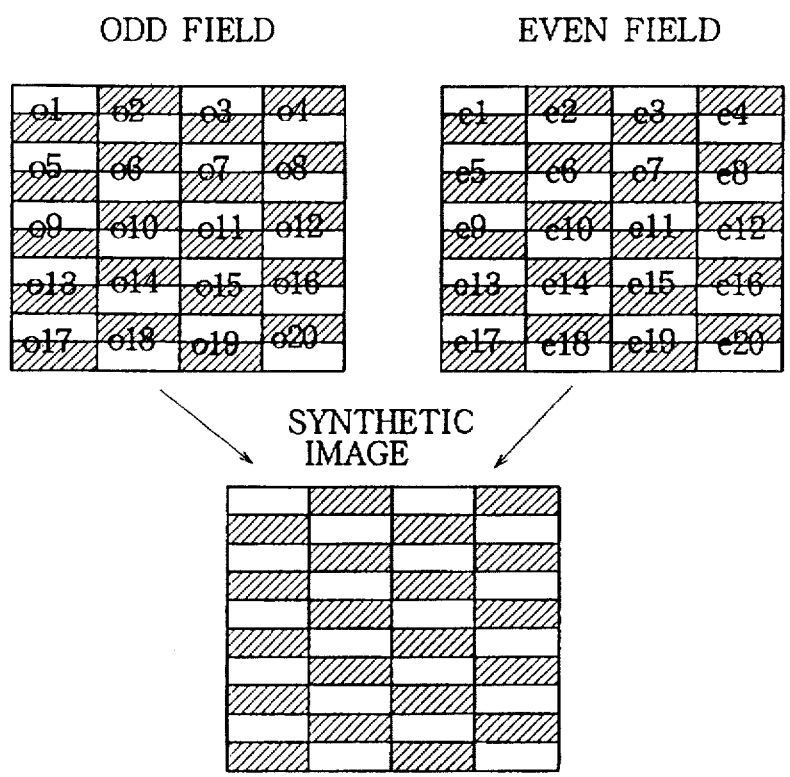
FIG. 27B shows the positions on the screen of the playback signals which can be restored through error correction in the situation described in connection with FIG. 26A.

FIG. 27B shows, at the corresponding positions on the screen, the video data played back when three-time high speed playback is performed. In the figure, the hatched areas correspond to the positions of the video data of the picture elements where playback data are obtained during triple speed playback. It is seen from FIG. 27B, that the positions of the picture elements of which the video data are played back and the positions of the picture elements of which the video data are obtained are identical. As a result, in the picture obtained by synthesis of the video data of the odd and even fields, only half the total video data is obtained, and half the video data is not played back, and the corresponding contents in the field memory are not renewed or rewritten at all. The resultant picture therefore contains parts which remain unchanged.

Thus, satisfactory playback picture is not necessarily obtained when an odd-multiple speed playback performed using the recording format of Embodiment 15. This does not mean that all the odd multiples produce unsatisfactory results. When the playback speed is at (4n+3), satisfactory picture can be obtained by appropriately selecting the arrangement of the recording format generating blocks of the odd an even fields on the tape. Detailed description on such arrangement is however is omitted.

Following is a description of another example, where the speed for high speed playback is four times the normal speed, which is an even multiple, as opposed to seven-time and three-time which ace odd multiple. The recording format is assumed to be that of Embodiment 15.

Figure 28A:
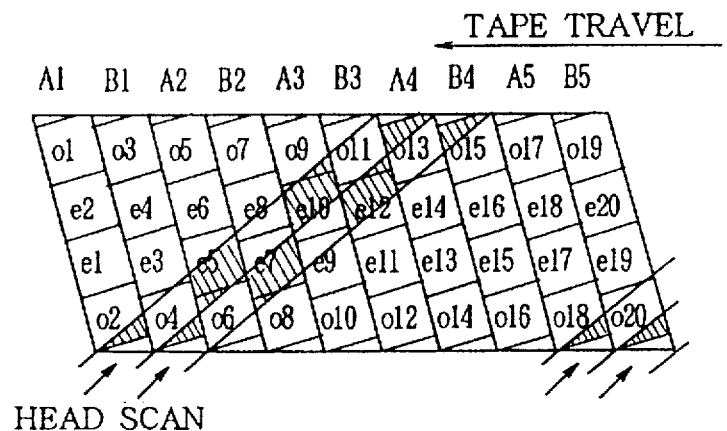
FIG. 28A is a diagram showing the track pattern of Embodiment 16, and the scanning traces of the rotary heads at the time of four-time speed playback.
Figure 28B:
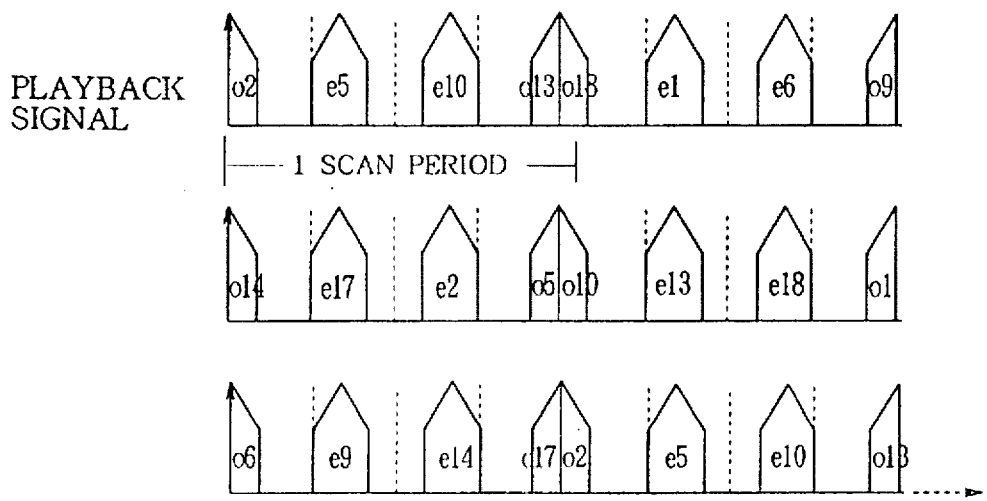
FIG. 28B shows the playback signals that can be restored as correct data through error correction in the situation described in connection with FIG. 28A.
Figure 28C:
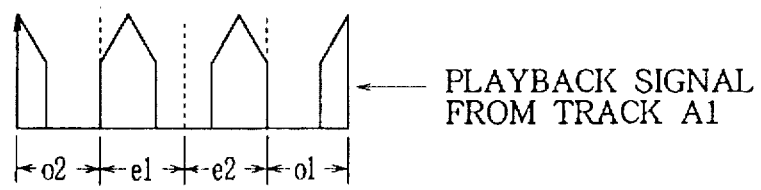
FIG. 28C shows the playback signals of blocks which are recorded on one of the tracks and which can be restored as correct data through error correction in the situation described in connection with FIG. 28A.

FIG. 28A shows the track pattern and the traces of the rotary head during four-time speed playback. FIG. 28B shows portions of the playback signals that are obtained by the rotary head 8a and restored as correct data through error correction. In the figure, reference marks o1, o2, . . . , o20 and e1, e2, . . . , e20 indicate the numbers of the corresponding recording format generating blocks played back from the rotary head 8a. FIG. 28C shows the video data of blocks 1 and 2, i.e., (o1, e1) and (o2, e2) of the respective fields which are recorded in the first track (A1) and obtained by synthesis, using a memory, of the playback signals obtained during different scanning periods.

Figure 28D:
FIG. 28D shows how the data of odd and even fields complement each other in the situation described in connection with FIG. 28A.

FIG. 28D shows, on a horizontal axis which correspond to the position on the screen, the recording format generating blocks, o1 and e1, of the odd and even fields, that are played back. It is seen from FIG. 28D, that during four-time speed playback, the positions where the video data of the odd field are obtained and the positions where the video data of the even field are obtained are complementary to each other. This is similar to the case in which the high-speed playback is performed at six times normal playback speed. All the contents of the synthetic image stored in the field memory are rewritten or renewed periodically. The resultant picture therefore does not contain parts which remain unchanged.

It is thus to be understood that using the recording format of Embodiment 15 and by setting the playback speed at an even multiple, data efficiency is increased. Further all the contents of the synthetic image in the field memory are renewed periodically. Thus, the resultant picture does not contain fixed or unchanging parts.

Embodiment 17

Following is a description of another embodiment, Embodiment 17, of this invention.

In this embodiment, the high-speed playback is assumed to be performed at twice the normal playback speed.

In the following description of this embodiment, it is assumed that two-channel opposing heads are used. The tracking phase is offset by a 1 track pitch (delayed so as to align with the previous track). This is achieved by applying a signal commanding a 1 track pitch offset from the central controller 49 to the capstan controller 54.

Figure 29A:
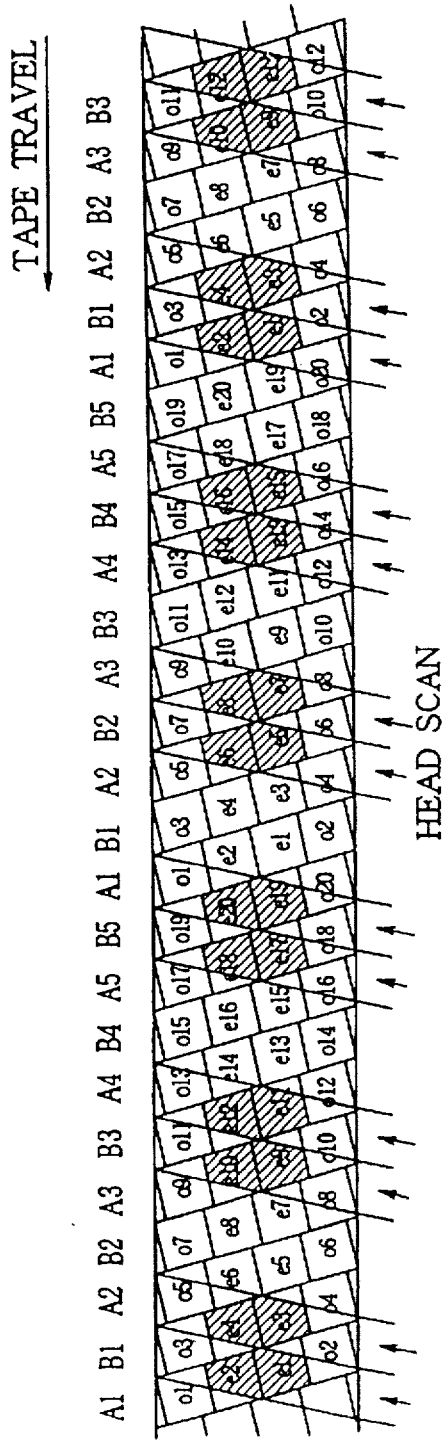
FIG. 29A is a diagram showing the track pattern of the recording format of Embodiment 17 and the scanning traces of the rotary heads at the time of double speed playback.
Figure 29B:
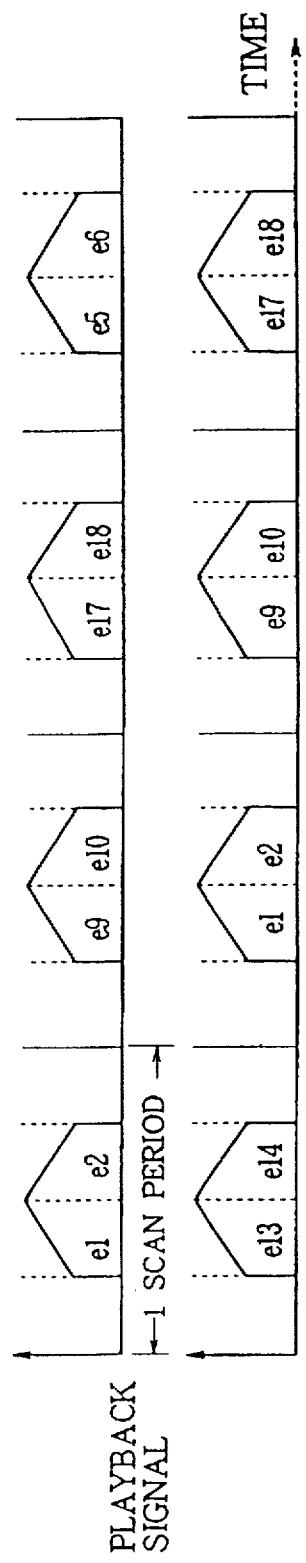
FIG. 29B shows the playback signals that can be restored as correct data through error correction in the situation described in connection with FIG. 29A.

FIG. 29A shows track pattern and the traces of the rotary heads during double speed playback. FIG. 29B shows portions of the playback signals which are obtained from the rotary head 8a and restored as correct data through error correction. The reference marks correspond to the numbers of the recording format generating blocks played back by the rotary head 8a.

Figures 30A, 30B:
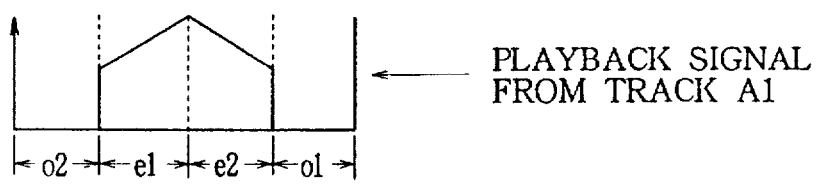
FIG. 30A shows the playback signals of blocks which are recorded on one of the tracks and which can be restored as correct data through error correction in the situation described with connection with FIG. 29A.
FIG. 30B shows the positions on the screen of the playback signals which can be restored through error correction in the situation described in connection with FIG. 29A.

FIG. 30A shows the video data recorded in the first track (A1) and obtained by synthesis, using a memory, of the playback signals obtained. FIG. 30A is formed from FIG. 29B.

FIG. 30B shows, at the corresponding positions on the screen, the video data that are played back during double speed playback. In the figure, the hatched areas correspond to picture elements of which the video data are played back. It is seen that from the figure, only the video data of the even field are played back, and all the video data of the even field can be obtained, while none of the video data of the odd field is obtained.

The resultant picture is satisfactory, since the contents of the entire image is renewed periodically (at one frame period). In other words, the data efficiency is high, and the high-speed playback picture is obtained, which is free from the unchanging part. Moreover, since the image is formed only of the video data the same field, the quality of the picture is improved. This is because the picture is not formed by mixing the video data of different fields.

In the above description of this embodiment, the recording format of Embodiment 15 is used. But this should not be taken as imposing a limitation. The same results can also be obtained by reversing the positions of the video data of odd and even fields.

In the above description of this embodiment, shuffling is not applied. However, it is also possible shuffle the video data, and divide the shuffled video data into the recording format generating blocks to form the recording data.

The recording form used in the above embodiment was described as being suitable for use with two-channel opposing heads. However, similar results can be obtained with two-channel combination heads, provided that appropriate tracking control is performed (with ½ track pitch offset being applied).

Embodiment 18

Another embodiment, Embodiment 18, of the invention will now be described. The block diagram representation of the recording signal processing circuit and the playback signal processing circuit of the magnetic recording/playback apparatus of Embodiment 18 is identical to that of Embodiment 14 of FIGS. 1 and 2, and the operation thereof is identical to that of Embodiment 14.

The block diagram representations of the recording format generator 100 and the playback data synthesizer 110 incorporated in the magnetic recording/playback apparatus of the present embodiment are also identical to those of FIGS. 17 and 18.

Before describing the details of the recording format of the present embodiment, the concept of the present embodiment is described. Like other embodiments described so far, playback images are synthesized using the field memories 27a and 27b, and in accordance with the playback signals from the rotary heads 8a and 8b of the respective channels. Disposition of the video data on the magnetic tape is so determined and the recording format so generated that, at the time of high-speed playback, the video data at all the positions over the screen are obtained.

In the present embodiment, two-channel combination heads shown in FIG. 46A are used.

In the magnetic recording/playback apparatus of the embodiments described above, it sometimes occurs that one of the heads clogs, anti video data of the corresponding channel is completely lost. According to the recording format of the present embodiment, data is interleaved in such a manner that the video data that is lost due to clogging is restored by interpolation on the basis of the video data obtained by the other rotary head.

Figure 31A:
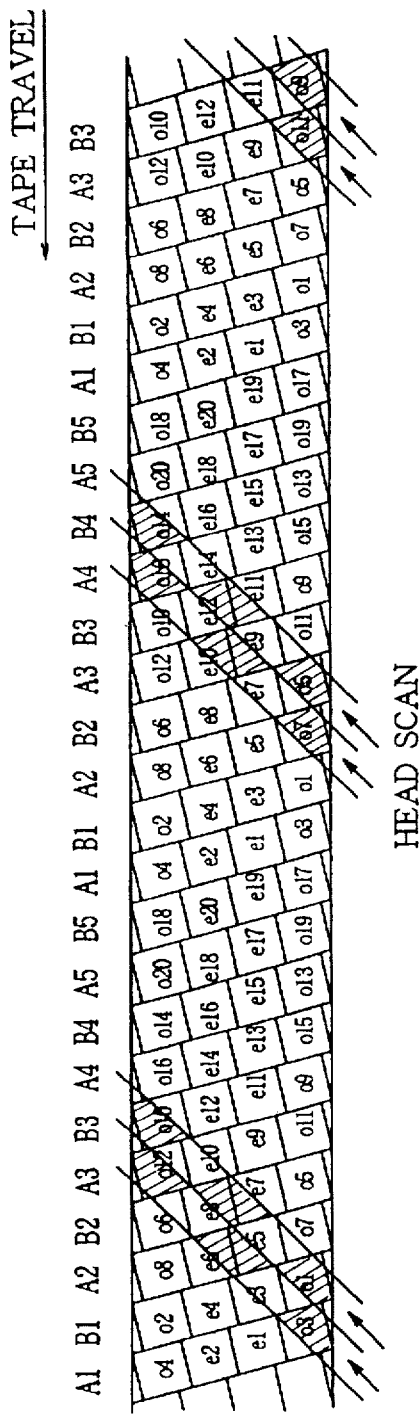
FIG. 31A is a diagram showing the track pattern of Embodiment 18 and the scanning traces of the rotary heads at the time of six-time speed playback.
Figure 31B:
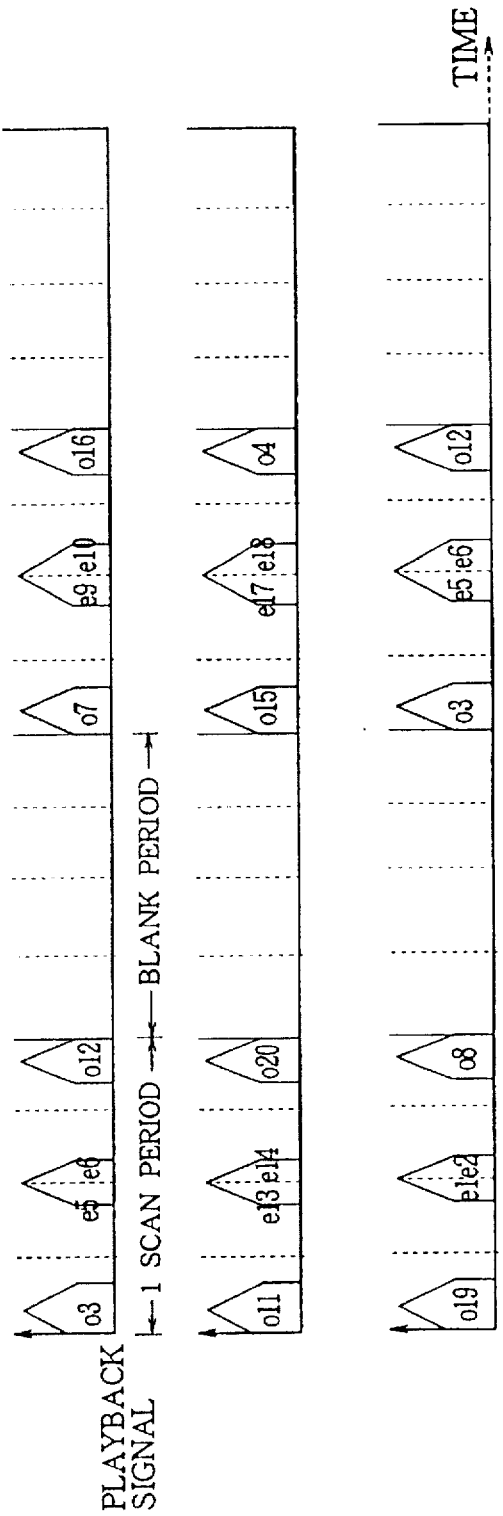
FIG. 31B shows the playback signals that can be restored as correct data through error correction in the embodiment of FIG. 31A.

Referring to FIGS. 31A and 31B, the recording format of Embodiment 18 will next be described. Like the previously described embodiments, each of the tracks on the magnetic tape is divided into four regions along the direction of scanning as shown in FIG. 19, and video data of odd fields are recorded in the regions near the edges of the tape, while the video data of the even fields are recorded in the regions in the middle of the tape. The recording format is generated treating the recording format generating block shown in FIG. 51A as a unit, like the embodiments previously described.

Referring next to FIG. 31A, the recording format of the present embodiment is described in detail. First, each of the tracks on the magnetic tape is divided into four regions along the direction of scanning by the rotary head.

The video data is disposed in the respective tracks in such a manner that the video data of odd fields is recorded in the regions near the edges of the tape, while the video data of even fields are recorded in the regions in middle of the tape, like Embodiment 14.

The manner of disposition of the recording format generating blocks in the present embodiment will next be described in detail. The recording format is generated by taking four blocks in the order of scanning of the screen of each of an odd field and an even field, and interleaving is made over eight 8 blocks thus obtained, and the data of the eight blocks are recorded in two tracks.

Further explanation is made with reference to FIG. 31A. Recording format generating blocks are taken from four positions of each field. Let us take, for example, blocks 1, 2, 3 and 4, i.e., (o1, e1), (o2, e2), (o3, e3) and (o4, e4). Video data of one frame is recorded over 10 tracks. The video data is recorded in the order of o3, e1, e2 and o4, in the first track (A1) of the ten tracks, and in the order of o1, e3, e4 and o2, in the second track (A2). The recording in other tracks is made in a similar manner.

In recording the data of odd fields near edges of the tape and recording the data of even fields in the middle the tape, the blocks at the same position (within the screen) of the odd and even fields are not disposed in the same track. That is, the video data of the same position within the screen of the adjacent fields are recorded in different tracks (adjacent tracks, in the illustrated example).

Assume that blocks 1, 2, 3 and 4 are interleaved and disposed in two tracks. When the rotary head of channel CHA clogs in a system using the recording format of FIG. 31A, that is when the video data o3, e1, e2 and o4 is not played back, it is possible to interpolate the lost data using the video data o1, e3, e4 and o2 obtained by the other rotary head of the channel CH-B. According to the recording format of the present embodiment, the recording format generating blocks at the same position on the screen of odd and even fields consecutive to each other are recorded in different tracks, so that when one of the rotary heads clogs and the video data of one of the channels is lost, the video data of all the blocks of the screen are reproduced by interpolation using the video data of the blocks of the other channel.

The operation of the recording generator 100 of the present embodiment will next be described with reference to the recording format described above. The recording data having been variable-length coded from the high-efficiency encoder 3 is input to the recording format generating memory 201. The recording format generating memory 201 divides the data of each DCT block into 20 recording format generating blocks according to the positions of the respective data.

The data of the respective DCT blocks having been written in the recording format generating memory 201 are delayed by a predetermined amount (by one frame, in the embodiment under consideration), and output in sequence. The data of CH-A is output in the order of o3, e1, e2, o4, o7, e5, e6, o8, and so on. The data of CH-B is output in the order of o1, e3, e4, o2, o5, e7, e8, o6, and so on.

The data of the respective recording format generating blocks is read in the order in which the DCT blocks are scanned, like the embodiments described above. In this way, the recording format shown in FIG. 31A is generated. The recording format generator 202 generates control signals for control over reading from and writing in the recording format generating memory 219.

The data output from the recording format generator 100 is input to the error correction encoder 4, where error correction codes are added, and are subjected to digital-modulation at the digital modulation circuits 5a and 5b, and are then supplied to the sync signal adding circuits 6a and 6b, where the synchronous signal and ID signal are added. The recording digital signals to which the synchronous signal is added are amplified at the recording amplifiers 7a and 7b, and recorded on the magnetic tape 9.

The operation of normal playback performed by a digital VTR having the above-described recording format is identical to that of Embodiment 14.

The operation of six-time speed playback performed by a digital VTR having the above-described recording format will next be described with reference to FIGS. 31A and 31B. FIG. 31A shows the track patterns and the traces of the rotary heads 8a and 8b when the six-time speed search is conducted. Since the rotary heads of the different channels have different azimuth angles, information of the hatched part only is played back due to azimuth effects. FIG. 31B shows the data which are obtained through error correction from the playback signals via the rotary head 8a. Like Embodiment 14, the reference marks in FIG. 31B correspond to the numbers of the recording format generating blocks reproduced by the rotary head 8a. The tracking is adjusted at the center of the tracks, like Embodiment 14.

Figure 32A:
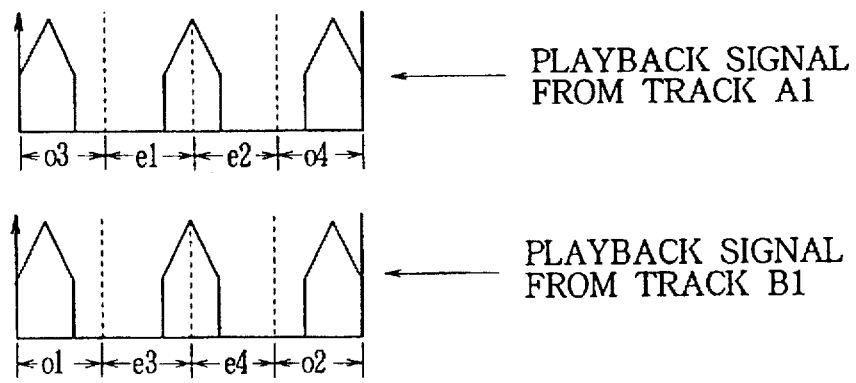
FIG. 32A shows the playback signals off blocks which are recorded on one off the tracks and which can be restored as correct data through error correction in the embodiment of FIG. 31A.

FIG. 31A shows the output patterns of the playback signals obtained from the rotary heads of the respective channels when six-time speed search is conducted. FIG. 32A shows signals of the blocks 1, 2, 3 and 4 (i.e., (o1, e1), (o2, e2), (o3, e3) and (o4, e4)) of the respective fields which are recorded in the first and second tracks and which are reproduced, as shown in FIG. 31B, and synthesized using the memory.

Figure 32B:
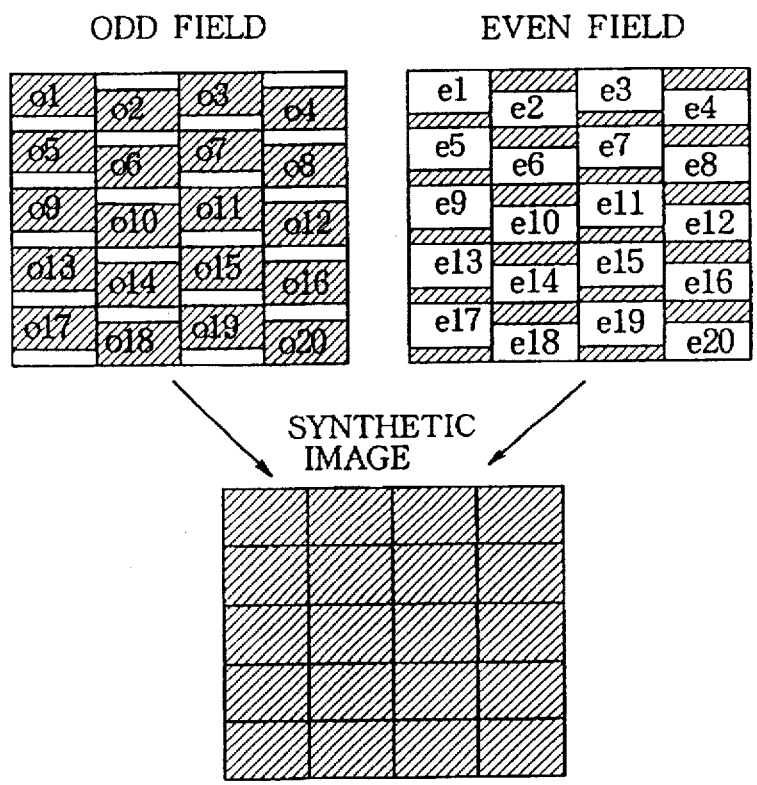
FIG. 32B shows the positions on the screen of the playback signals which can be restored through error correction in the embodiment of FIG. 31A.

In FIG. 32B, the video data reproduced when six-time speed playback is performed are arranged at the corresponding positions on the screen. The hatched portions indicate the positions where the playback information is obtained during six-time speed playback. The positions where information is obtained from odd fields and from even fields are complementary to each other, so that a complete picture is formed by synthesizing the data of the odd fields and the data of the even fields. Further, the contents of the field memory are periodically rewritten (renewed), and the resultant picture does not contain any fixed or unchanging parts.

The operation of the playback system performed when six-time speed playback is performed with the digital VTR having the above recording format is identical to that of Embodiment 14.

In the present embodiment, the recording format generated is such that odd fields are disposed in the end parts of the tracks and the even fields are disposed in the central part of the tracks, and the data are interleaved such that the information of a certain position on the screen of one of the consecutive fields are not recorded in the same track as the information of the same position of the other of the consecutive fields. Thus, when one of the head clogs during playback and the video data is lost, the lost data are interpolated from the data of the same position reproduced through the other channel. As a result, a playback picture of a satisfactory quality is obtained.

Like Embodiment 14, the playback outputs from the rotary head during high-speed playback are complementary between odd fields and even fields, so that the contents of the field memory are renewed periodically, and the resultant picture does not contain fixed or unchaining parts.

It has been assumed the shuffling is not made. But the video data having been subjected to shuffling may be divided into recording format generating blocks to produce the recording data. The shuffling pattern may be changed between the odd fields and the even fields.

The positions at which the odd and even fields are respectively recorded may be reverse to those described above.

The high-speed playback may be at a speed other than six-time speed, and yet the similar effects are obtained.

The embodiment described above employs two-channel combination heads, but the invention is also applicable where two-channel opposing heads are employed.

Embodiment 19

Another embodiment, Embodiment 19, will next be described. The recording format of Embodiment 18 is obtained by applying data interleaving to the recording format of Embodiment 14 so that the contents of the synthetic image stored in the field memory are periodically renewed. Embodiment 18 is effective during high-speed playback particularly when two-channel combination heads are used, or when the speed of the high-speed playback is relative high and two-channel opposing heads are used. The data interleaving is also applied as is in Embodiment 18.

The recording format of Embodiment 19 will next be described in detail with reference to FIG. 33A. The tracks are each divided into four regions along the direction of scanning by the rotary head. The video data are disposed in the same manner as in Embodiments 14 to 18. That is, video data of odd fields are recorded in the two end regions and the video data of even fields are recorded in the two central regions.

More specifically, like Embodiment 18, the recording format generating blocks are taken in the order of the scanning over the screen, from each of the odd and even fields. Eight blocks, four from each of the odd and even fields, are taken to form an assembly, and data interleaving is applied to the assembly of the eight blocks and are disposed in two tracks.

For instance, data interleaving is applied to the assembly of blocks 1, 2, 3 and 4 from each of the fields, i.e., (o1, e1), (o2, e2), (o3, e3) and (o4, e4). The blocks are recorded in a first track (A1) in the order of o3, e2, e1 and o4 from the lower end of the track. The blocks are recorded in a second track (B1) in the order of o1, e4, e3 and o2 from the lower end. The other blocks are recorded in other tracks in the same manner.

In recording the blocks in two tracks of different channels, blocks (e.g., o1 and e1) of the same position in the screen of the odd and even fields which are consecutive to each other are not recorded on the same track, and at regions of the different heights which are neither identical to each other nor next to each other. The "height" as used herein means the position with each track in the longitudinal direction or scanning direction of the track, or the number of each region, the number being assigned to the respective blocks in the order of their disposition as counted from one end, e.g., from the lower end, of the track. The regions which are at the same height are the regions with identical region numbers. The regions at heights which are next to each other are regions whose region numbers differ from each other by one.

Thus, in other words, the blocks of the same position with the screen of the odd and even fields which are consecutive to each other are separated in the scanning direction of the track by at least one other region (one region, in the example illustrated).

The data of the blocks 1, 2, 3 and 4 referred to above are subjected to interleaving, and are disposed in two tracks. By using the recording format shown in FIG. 33A, it is possible, like Embodiment 18, to interpolate the lost data from one rotary head, by the use of the data of the other rotary head. That is, if the rotary head 8a of CH-A clogs, and the data o3, e2, e1 and o4 are not reproduced, they are interpolated from the data o1, e4, e3 and o2 reproduced from the rotary head of CH-B. Thus, according to this embodiment, the blocks at the same position in the screen of odd and even fields which are consecutive to each other are so disposed as not to be in the same tracks. Accordingly, even if the rotary head of one of the channels clogs and no data is reproduced from that rotary head, the lost data is restored by interpolation from the data obtained by the rotary head of the other channel. As a result, visually satisfactory pictures are obtained.

The operation of the recording format generator 100 for generating the recording format of this embodiment will next be described. The recording data having been variable-length coded from the high-efficiency encoder 3 are input to the recording format generating memory 201. In the recording format generating memory 201, the data for each DCT block are divided into 20 recording format generating blocks according the position within the screen.

The data of each DCT block written in the recording format generating memory 201 are delayed by a predetermined length of time (1 frame period, in the present embodiment), and the data of the recording format generating blocks of CH-A are output in the order o3, e2, e1, o4,o7, e6, e5, o8, and so on, and the data of the recording format generating blocks of CH-B are output in the order of o1, e4, e3, o2, o5, e8, e7, o6, and so on. The data within each recording format generating block are read in the order of scanning over the screen. Thus, the recording format shown in FIG. 33A is generated. The recording format generating controller 202 provides reading and writing control signals for controlling the recording format generating memory 201.

The data from the recording format generator 100 are sent to the error correction encoder 4, where error correction codes are appended, and are subjected to digital modulation at the digital modulating circuits 5a and 5b, and are sent to the sync signal appending circuits 6a and 6b, where sync signals and ID signals are appended. The data are then amplified by the recording amplifiers 7a and 7b and recorded on the magnetic tape 9.

The normal playback operation of the playback system of the digital VTR having the recording format described above is identical to that of Embodiment 14.

The operation during six-time speed playback will next be described with reference to FIGS. 33A and 33B. FIG. 33A shows the track pattern and the traces of the rotary head during six-time speed playback. The rotary heads 8a and 8b of the respective channels have different azimuth angels, so that due to the azimuth effect, information of the hatched areas only are produced. FIG. 33B shows the playback signals that can be corrected by error correction. The reference marks indicate the numbers of the recording format generating blocks. The tracking is adjusted at the lower edge of the tape.

Figure 33A:
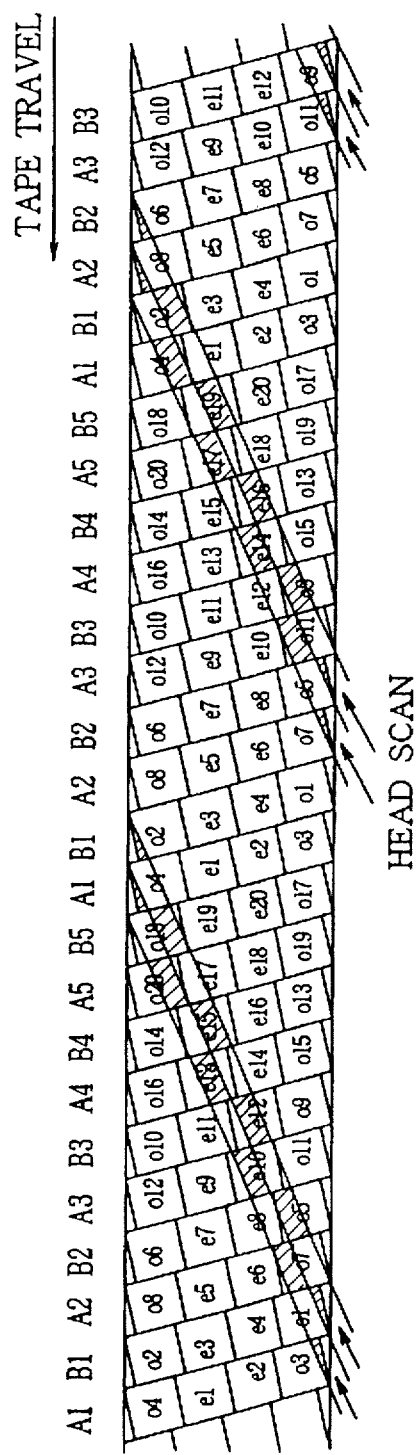
FIG. 33A is a diagram showing the track pattern of Embodiment 19 and the scanning traces of the rotary heads at the time of six-time speed playback.
Figure 33B:
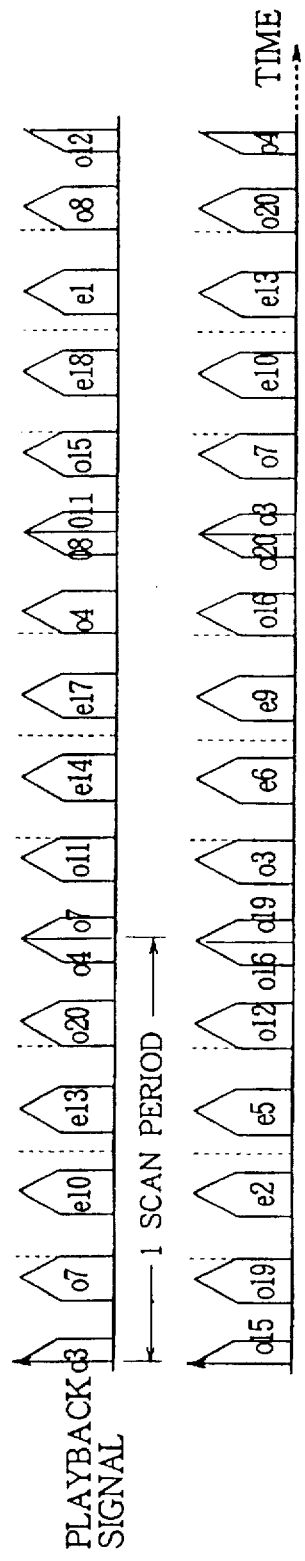
FIG. 33B shows the playback signals that can be restored as correct data through error correction in the embodiment of FIG. 33A.
Figure 34A:
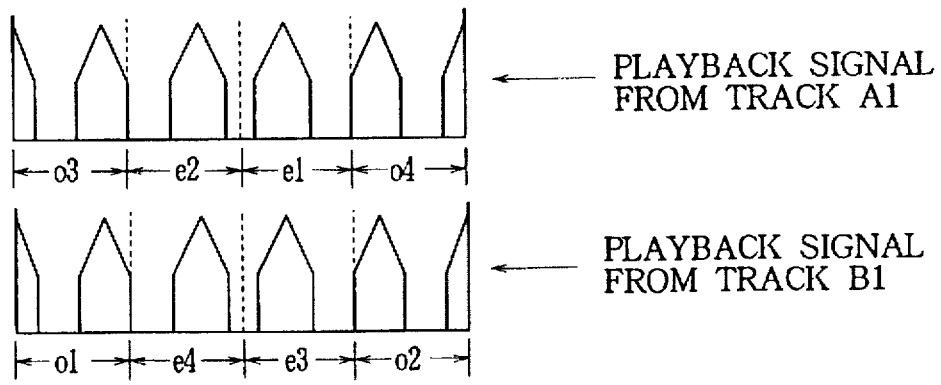
FIG. 34A shows the playback signals of blocks which are recorded on one of the tracks and which can be restored as correct data through error correction in the embodiment of FIG. 33A.

FIG. 34A shows the reproduced signals of the blocks 1, 2, 3 and 4 (i.e., (o1, e1), (o2, e2), (o3, e3) and (o4, e4)) recorded in the first and second tracks A1 and B1 in FIG. 33A.

Figure 34B:
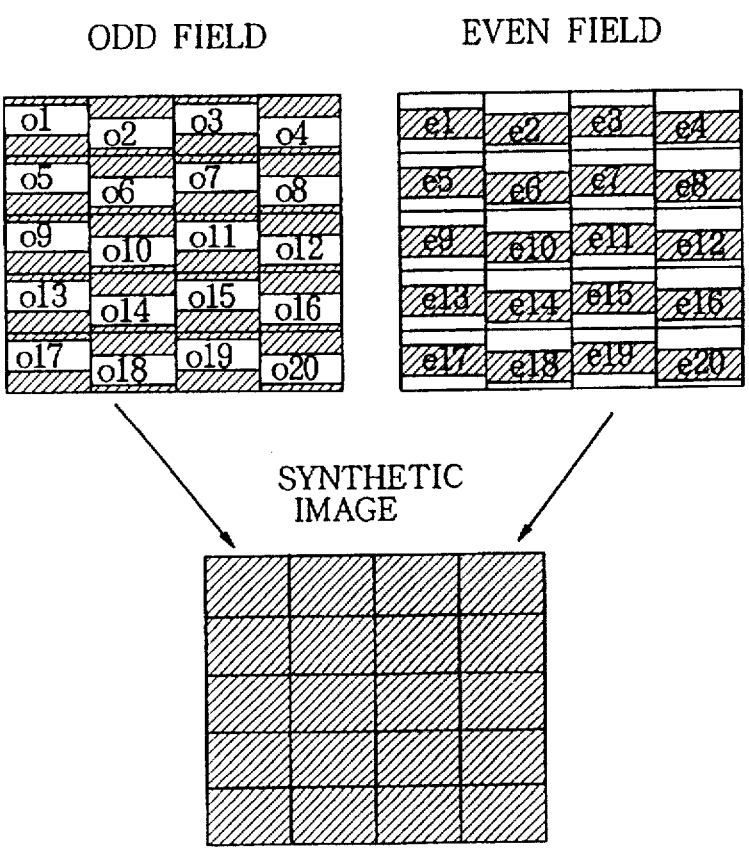
FIG. 34B shows the positions on the screen of the playback signals which can be restored through error correction in the embodiment of FIG. 33A.

FIG. 34B shows the data reproduced during a six-time speed playback, on the respective positions within the screen. The data of the odd and even fields are for positions complementary to each other, so that when the data of odd and even fields are synthesized, the complete picture is formed, and the contents of the entire field memory is renewed periodically. Accordingly, the picture does not contain fixed or unchanging parts.

The operation of the playback system during six-time speed playback with the recording format described above is identical to that of Embodiment 14.

As has been described, according to this embodiment, the data of the odd fields are recorded at the end parts of the tracks and the data of the even fields are recorded at the central parts of the tracks. The and the data interleaving is applied, and the recording format generating blocks of the same position of the odd and even fields are disposed of different tracks. Moreover, the tracks are recorded into four regions, and the recording format generating blocks of the same position of the odd and even fields are disposed at the regions which are not at the same height or at heights next to each other. Accordingly, when the rotary head of one of the channels clogs, and the data is thereby lost, the lost data can be restored by interpolation from the data obtained via the rotary head of the other channel. The reproduced data of the odd and even fields are at positions complementary to each other, and the contents of the field memory are renewed periodically, so that the resultant high-speed playback picture does not have fixed or unchanging parts.

The recording format of this embodiment differs from the recording format of Embodiment 18 in that the recording format generating blocks which are recorded in the central regions of the tracks are recorded on different tracks. Other arrangements of the data may be employed. For instance, it may be a modification of the arrangement of the data of Embodiment 17, with the modification that the recording format generating blocks which are recorded in the end parts of the tracks are recorded on different tracks.

It is assumed in the description of the above embodiment, that shuffling is not made. However, video data having been subjected to shuffling may be divided into the recording format generating blocks, and recording data may be thus generated. Different shuffling pattern may be employed for odd and even fields.

The speed of the high-speed playback may be other than six times the normal playback speed, and yet the similar effects are obtained.

The positions at which the odd and even fields are recorded may be reversed.

In the embodiment, two-channel opposing heads are used. However, the embodiment is applicable where two-channel combination heads may alternatively be used.

Embodiment 20

Another embodiment, Embodiment 20, will next be described. The block diagram representations of the recording signal processing system and the playback signal processing system of the magnetic recording device of Embodiment 20 are identical to those of Embodiment 14, shown in FIGS. 1 and 2.

The block diagram representations of the recording format generator 100 and the playback data synthesizer 110 is also identical to those of Embodiment 14, shown in FIGS. 17 and 18.

It is assumed that two-channel opposing heads are employed.

Before describing the operation of the recording format generator 100, the concept of the present embodiment is described. Like Embodiment 14, arrangement of the video information on the magnetic tape is so determined that during high-speed playback, the video information of all the positions on the screen are obtained, if the playback signals of the odd and even Fields are all synthesized.

In Embodiment 14, the recording format shown in FIG. 20A is used, and the tracking is adjusted at the center of the tape, so that the playback outputs of the odd and even fields are for the positions on the screen complementary to each other, so that the contents of the Field memory are renewed periodically. Thus, the playback picture of a satisfactory quality is obtained. The present embodiment employs two-channel opposing heads.

Figure 35A:
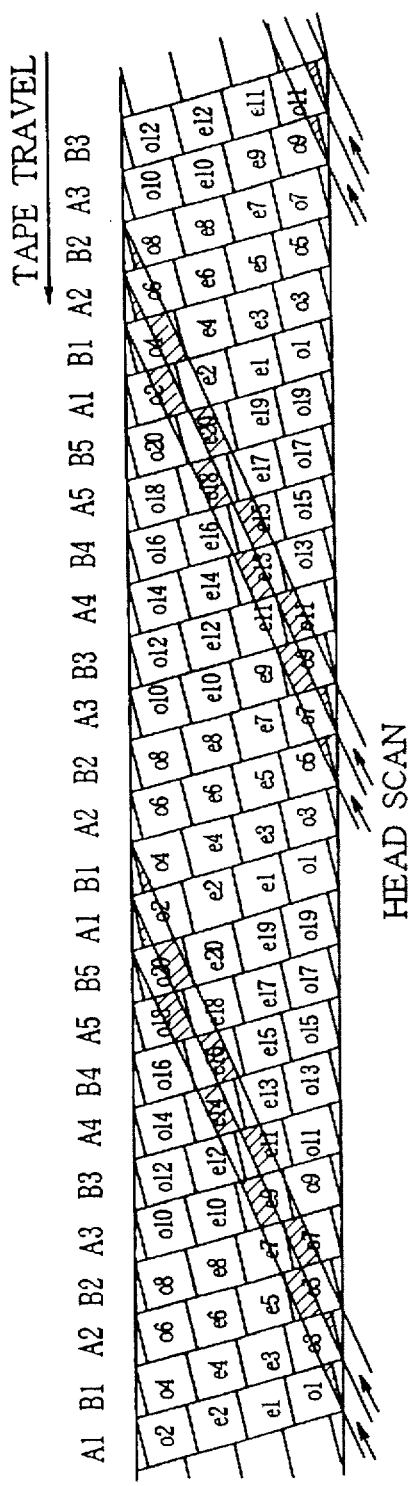
FIG. 35A is a diagram showing the track pattern of the recording format of Embodiment 20 and the scanning traces of the rotary heads at the time of six-time speed playback.
Figure 35B:
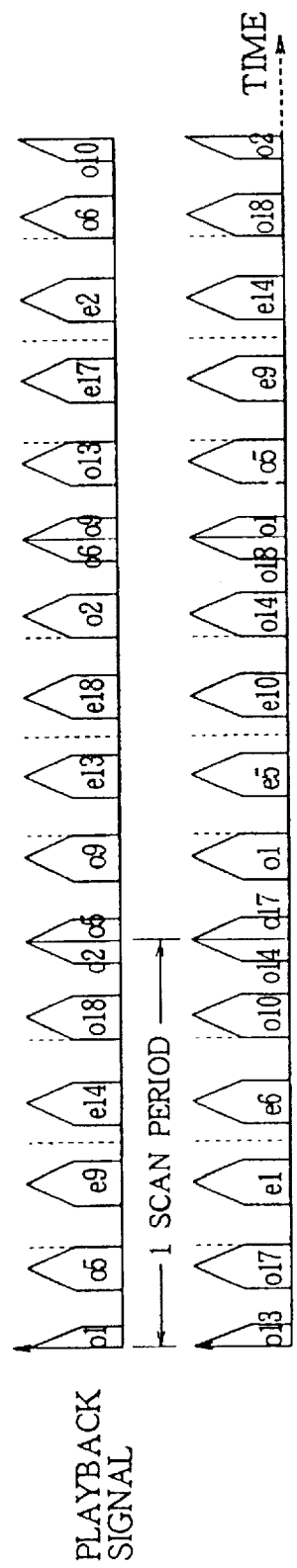
FIG. 35B shows the playback signals that can be restored as correct data through error correction in the embodiment of FIG. 35A.

FIG. 35A shows the track pattern and the traces of the rotary heads when two-channel opposing heads are used, and a six-time speed playback is performed using the recording format of Embodiment 14. FIG. 35B shows the playback data that can be corrected by error correction. The reference marks in the drawing indicate the numbers of the recording format blocks that are played back. The tracking is adjusted at the lower edge of the tape.

Figure 36A:
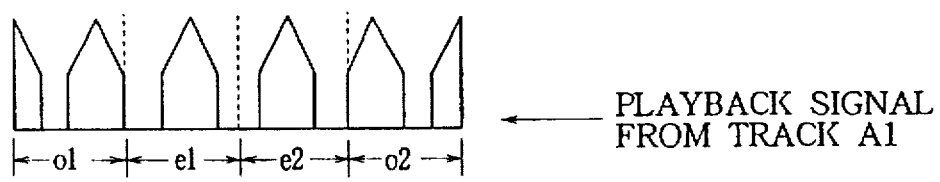
FIG. 36A shows the playback signals of blocks which are recorded on one of the tracks and which can be restored as correct data through error correction in the embodiment of FIG. 35A.
Figure 36B:
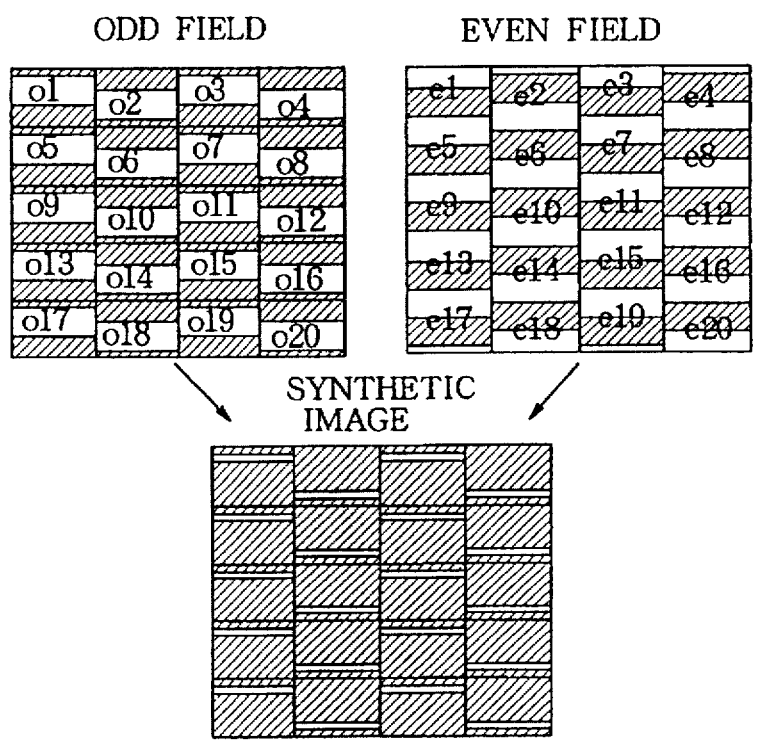
FIG. 36B shows the positions on the screen of the playback signals which can be restored through error correction in the embodiment of FIG. 35A.

FIG. 36A shows the playback signals of the blocks 1 and 2 (i.e., (o1, e1) and (o2, e2) from the first track (A1).

FIG. 36A shows the data reproduced during a six-time speed playback, on the respective positions within the screen. The hatching indicates the parts of which the video data are obtained. As illustrated, after synthesis of the data of the odd and even fields, there remain parts of which the video data are not obtained during the high-speed playback. Accordingly, the resultant picture contains parts which are fixed or do not change, and is not satisfactory.

According to present embodiment, shuffling is performed. This improves the quality of the high-speed playback picture, when the recording format of Embodiment 14 are used and a two-channel opposing heads are used.

Figure 36C:
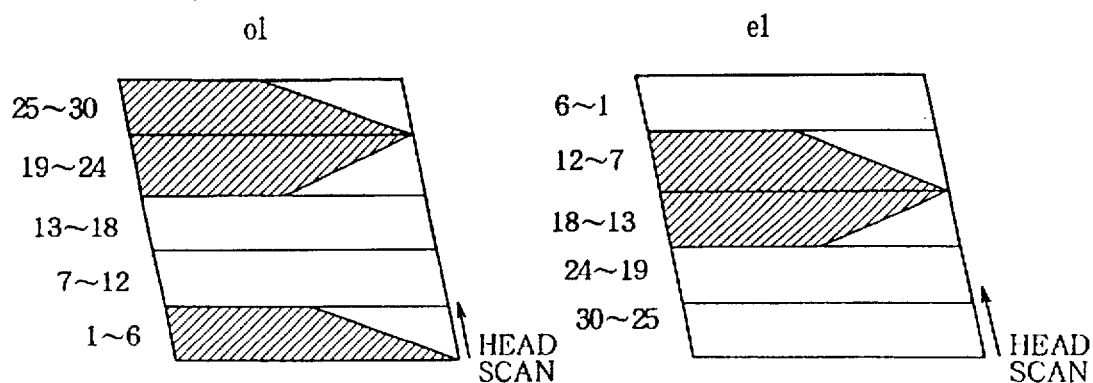
FIG. 36C shows the manner of shuffling of the DCT blocks in one each of recording format generating blocks of odd and even fields corresponding to each other.

The concept of shuffling adopted in the embodiment will next be described with reference to FIG. 36C. The shuffling of this embodiment is performed taking, as a unit, each of DCT blocks within in each recording-format generating block. Moreover, the shuffling pattern within the recording format generating blocks of the odd fields and the shuffling pattern within the recording format generating blocks of the even fields are reverse to each other. An example of shuffling pattern of one block (o1, e1) is shown in FIG. 36C. To simplify the explanation, each recording format generating block is assumed to consist of 30 DCT blocks. It is observed from FIG. 35B and FIG. 36A, that the boundaries between the parts where the playback signals are obtained correctly and the parts where the playback signals are not obtained correctly appear at positions n/5 (n being an integer within the range of 0 to 4) of each block as measured from either end of the block. In view of this, each region of the track for recording one recording format generating block is divided into five sub-regions.

The 30 DCT blocks are shuffled, and the DCT blocks obtained as a result of the shuffling are divided into five groups, each group consisting of six consecutive DCT blocks sequentially produced by the shuffling. That is, the DCT blocks Nos. 1 to 6 Form a first group, the DCT groups Nos. 7 to 12 form a second group, the DCT blocks Nos. 13 to 18 form a third group, the DCT groups Nos. 19 to 24 form a fourth group, and the DCT blocks Nos. 25 to 30 Form a fifth group. The five groups of the DCT blocks are recorded in the five sub-regions. The five groups of each odd field are recorded in sequence from the lower end of the region. The five groups of each even field are recorded in a reverse sequence, i.e., from the upper end of the region.

The operation of the recording-Format generator 100 of the present embodiment will now be described with reference to the recording format using the shuffling. The recording data having been variable-length coded from the high-efficiency encoder 3 are input to the recording format generating memory 201, which divides the data of the DCT blocks into 20 recording format generating blocks according to the position of the respective data.

The data having been written in the recording format generating memory 201 are delayed by a predetermined amount of time (1 Frame period, in the example under consideration), and the data of CH-A are output in the order of o1, e1, e2, o2, o5, e5, e6, o6, and so on, while the data of CH-B are output in the order of o3, e3, e4, o4, o7, e7, o8, o8, and so on. The shuffling is applied to the DCT blocks within each recording format generating block. The order in which the DCT blocks within each recording format generating block are output are as described above. That is, the DCT blocks of each recording format generating block of an odd field are produced in the order of the groups, first to fifth groups, while the DCT blocks of each recording format generating block of an even field are produced in the reverse order of groups, fifth to first groups.

In this way, the shuffling pattern within the recording format generating block of an odd field and the shuffling pattern within the recording format generating block of an even field are different from each other. The recording format generation controller 202 provides write control and read control signals For the recording Format generating memory 201.

The data from the recording format generator 100 are supplied to the error correction encoder 4 where error correction codes are appended, and are then subjected to digital modulation at the digital modulation circuits 5a and 5b, and are then sent to the sync signal appending circuits 6a and 6b, where sync signals and ID signals are appended. The data with the sync signals and the ID signals appended thereto are amplified at the recording amplifiers 7a and 7b, and are recorded on the magnetic tape 9.

The operation of the playback data synthesizer 110 will next be described with reference to FIG. 18. The playback digital data having been error-corrected by the error correcting decoder 13 are stored in the playback data synthesizing memory 211, at the designated addresses, in accordance with the ID signals separated from the playback signals. The playback data that have been written in the respective addresses are deshuffled and returned to assume the original order. The fact that the order of data of each recording format generating block of the odd field and of each recording format generating block of the even field are reversed at the time of shuffling is of course taken into consideration. That is, the order of the DCT blocks in each recording format generating block of the even fields is reversed during deshuffling. The control for the deshuffling is made by the playback data synthesis controller 212. The playback data having been deshuffled are delayed by a predetermined time, and are read out from the playback data synthesis memory 211 in accordance with the address information supplied from the playback data synthesis controller 212.

The playback digital signals from the playback data synthesizer 110 are variable-length decoded at the variable-length decoder 23 and converted into fixed-length data, which are then read out at a fixed rate by the buffer memory 24, and sent to the inverse DCT circuit 26. The inverse DCT circuit 26 applies inverse discrete cosine transformation (inverse DCT) to the input playback digital signals. The playback luminance signal Y and the two chrominance signals CB and CR obtained as a result of the inverse DCT are temporarily stored in the field memories 27a and 27b, and are delayed by a predetermined time, and the block formed at the time of recording is decoded. The signals are then sent to the D/C converter 15a to 15c.

As has been described, according to this embodiment, the arrangement of the recording format generating blocks is similar to that of Embodiment 14, and the shuffling pattern of the DCT blocks within each recording format generating block of the odd field and the shuffling pattern of the DCT blocks within each recording format generating block of the even field are reverse to each other. As a result, as shown in FIG. 36C, the positions of which the DCT blocks of the odd fields obtained by playback and the positions of the DCT blocks of the even fields obtained by playback are complementary to each other. For example, DCT blocks Nos. 1 to 6, 19 to 24, and 25 to 30 of the recording format generating block o1 of the odd field and the DCT blocks Nos. 7 to 12, and 13 to 18 of the recording format generating block e1 of the even field, which are for positions complementary to each other, are obtained. By synthesizing the playback data of o1 and e1, the data of all the DCT blocks 1 to 80 are obtained.

Thus, according to the present embodiment, at the time of generating the recording format, the shuffling pattern is changed depending on whether the recording format generating block is of an odd field or an even field. With such an arrangement, at the time of high-speed playback using two-channel opposing heads, the playback outputs of the odd fields and even fields are complementary to each other, so that the contents of the field memory (forming the synthetic image) are renewed periodically, and the resultant picture does not contain any fixed or unchanging parts.

The embodiment is not limited to application to six-time speed playback, but can be applied to high-speed playback of any other speed, and yet a similar effect is obtained.

The method of shuffling is not limited to that described above.

The positions at which the odd and even fields are recorded may be reversed.

In the embodiment, two-channel opposing heads are used. However, the embodiment is applicable where two-channel combination heads are used.

Embodiment 21

Another embodiment, Embodiment 21, will next be described. In Embodiment 14, two-channel combination heads are used, and the tracking is adjusted at the center of the track. When playback at a six-time speed is performed with the recording format of Embodiment 14, the playback signals from the rotary heads 8a and 8b of odd and even fields are complementary to each other.

Figure 37A:
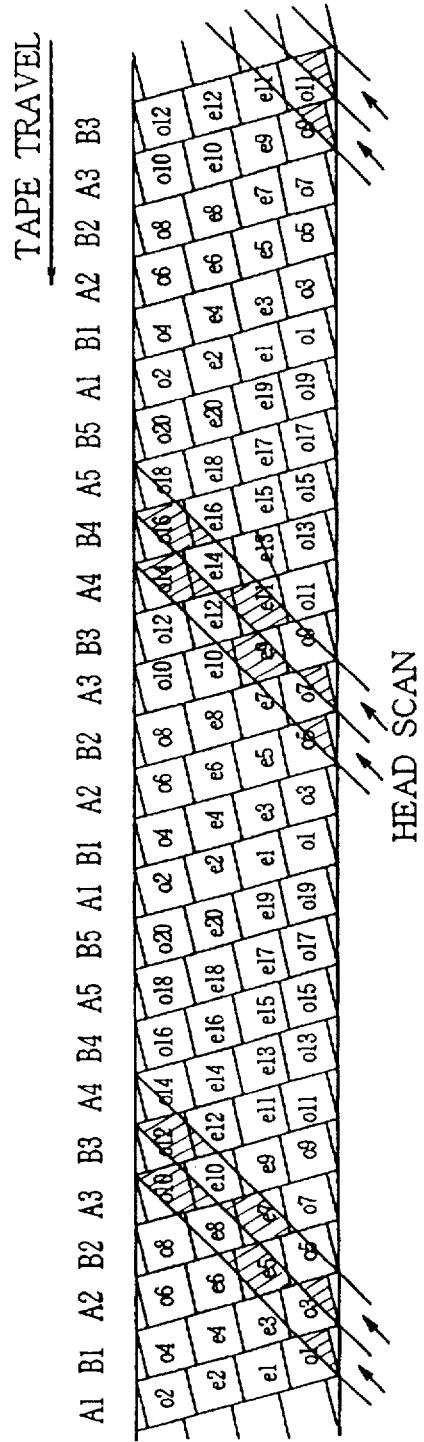
FIG. 37A is a diagram showing the track pattern of Embodiment 21 and the scanning traces of the rotary heads at the time of six-time speed playback.
Figure 37B:
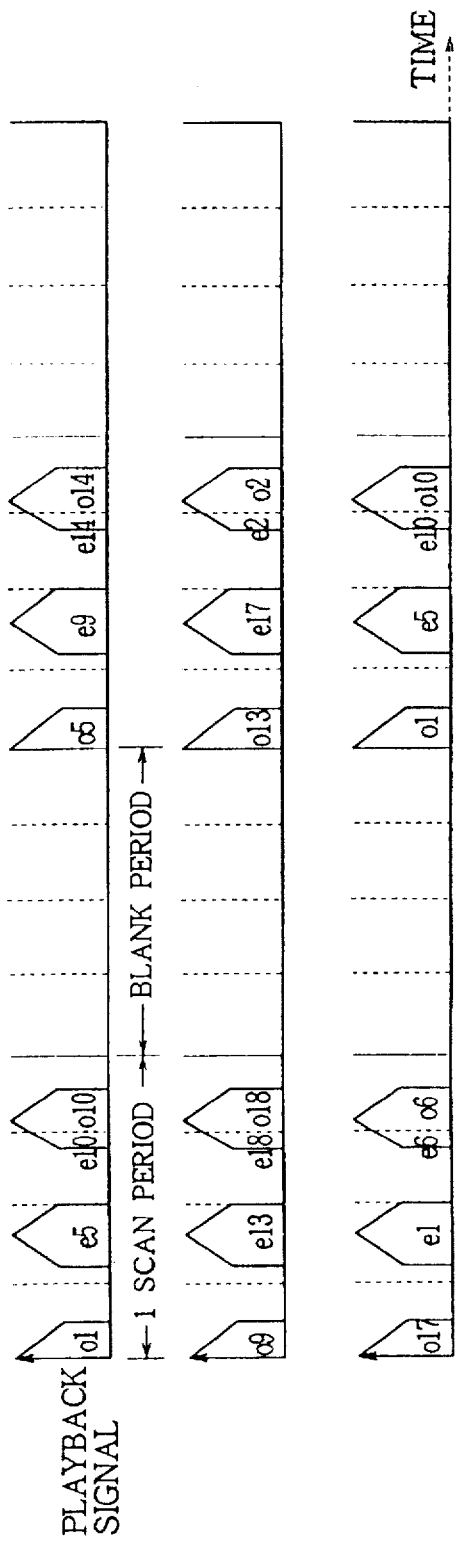
FIG. 37B shows the playback signals that can be restored as correct data through error correction in the embodiment of FIG. 37A.
Figure 38A:
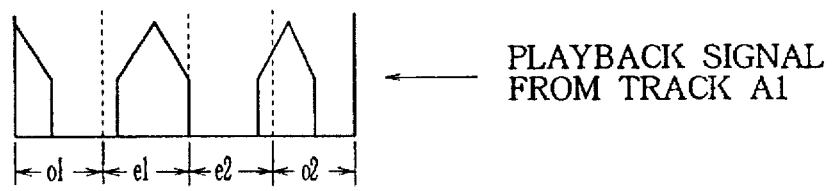
FIG. 38A shows the playback signals of blocks which are recorded on one of the tracks and which can be restored as correct data through error correction in the embodiment of FIG. 37A.
Figure 38B:
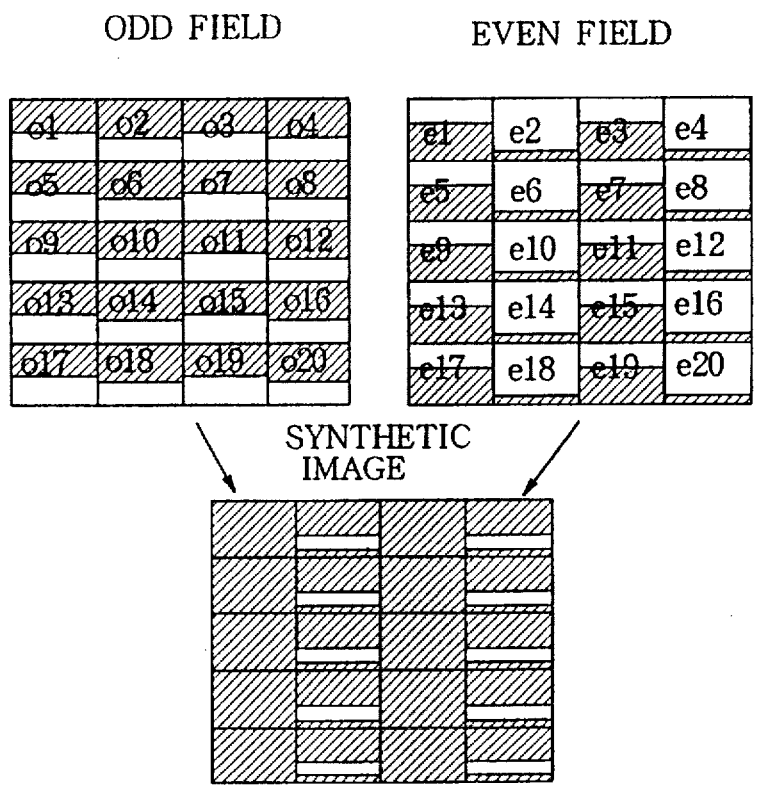
FIG. 38B shows the positions on the screen of the playback signals which can be restored through error correction in the embodiment of FIG. 37A.

Let us now consider a situation where high-speed playback is performed with the recording format of Embodiment 14, using two-channel combination heads, with the tracking being adjusted at the lower end of the track. FIG. 37A shows the track pattern and the traces of the rotary heads followed when playback at a six-time speed is performed. FIG. 37B shows the parts of the data that are obtained correctly, by error correction. The reference marks indicate the numbers of the recording format generating blocks reproduced by the rotary head 8a. FIG. 38A shows the playback signals of the blocks 1 and 2 (i.e., (o1, e1) and (o2, e2)) of the respective fields recorded in the first track A1. FIG. 38A is depicted by observing FIG. 37B, by synthesizing the recording format generating blocks recorded in the track No. A1 and reproduced upon different scans.

It is seen from FIG. 38A that the playback outputs of the odd fields and the even fields are not complementary to each other, so that the there are parts where the contents of the synthetic video data within the field memory are not renewed, and the picture does not change, so that the quality of the picture is poor.

By adjusting the tracking at the center of the track, when performing a high-speed playback, using two-channel combination head, in accordance with Embodiment 21, the data efficiency is improved, and the contents of the synthetic image stored in the field memory are periodically renewed, and a high-speed playback picture without fixed or unchanging parts is obtained.

As has been described, according to Embodiment 21, two-channel combination heads are used, and the tracking of the rotary heads 8a and 8b is adjusted at the center of the tape, so that the data playback efficiency is improved, and the resultant high-speed playback picture does not contain a fixed or unchanging part.

In the embodiment, the recording format of Embodiment 14 was used. But the arrangement of data may be other than that of the recording format of Embodiment 14.

The playback may be at a speed other than the six-time speed.

Instead of the two-channel combination heads, two-channel opposing heads may be used. It is however necessary to control the tracking such that the output at the center of the tape is fully obtained.

In the above embodiment, the tracking phase of the rotary heads is so controlled that the playback output is fully obtained at the center of the tape. The invention is not limited to this arrangement. Where audio signals or the like is recorded along the lower edge of the tape, the tracking may be so controlled that the playback output is fully obtained at the center of the part of the tape where the video signals are recorded. By doing so, similar effects are obtained.

Embodiment 22

Embodiments 14 to 21 employs discrete cosine transformation (DCT) for the high-efficiency encoding. However, one-dimensional or three-dimensional orthogonal transform (of which the DCT is a representative example), or predictive encoding, or motion compensation, KL transform, or the like with which the transform coefficients or the data having been band-compressed by combination of the above transforms may be used, and yet similar results are obtained. The band compression may be omitted.

Embodiment 23

In connection with Embodiment 20, shuffling which may be applied at the time of recording format generation was explained. The manner of shuffling is not limited to that described. For instance, the shuffling need not be applied taking each DCT block as a unit, but may instead be applied taking each DCT coefficient as a unit. In such a case, the number of the DCT blocks that are restored is increased, so that the proportion of the DCT blocks that are restored is therefore increased, and the quality of the playback synthetic image is improved.

In Embodiments 14 to 19 and 21, the shuffling is not applied. But shuffling may be applied in these embodiments, and yet similar results are obtained.

Embodiment 24

In Embodiments 14 to 21, two-channel recording system is used. Even in a multi-channel recording system, or a single-channel recording system, if the playback speed, the tracking and the data arrangement at the time of the recording format generation are determined in the manner taught by the invention, high-quality playback is realized.

Embodiment 25

In Embodiments 14 to 21, the video signals of one field are recorded on five tracks. The invention is not limited to the number of segments. For instance, the invention is applicable to a situation where the video signals of one field are recorded 2.5 tracks. To generalize, the recording format may be such that where the input video data, completed over M fields may be recorded on N tracks.

Embodiment 26

Figure 39A:
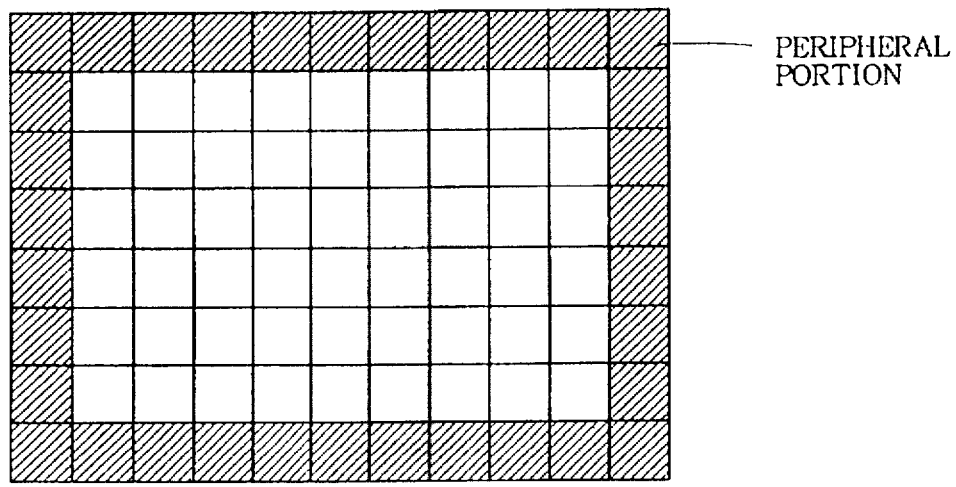
FIG. 39A shows division of the screen into recording format generating blocks in Embodiment 26.

In Embodiments 14 to 21, the video data of one field are divided into 20 blocks, which are taken as a unit for forming a recording format. The invention is not limited to the particular number of the blocks into which the video data of one field is divided. For instance, the video data of one field may be divided into a larger number of smaller blocks. Further, as shown in FIG. 39A, the data of the blocks which are less prominent, e.g., the blocks at the peripheral portion of the screen (as indicated by hatching in the figure), may be recorded at such regions of the tracks from which playback signals are not obtained during high-speed playback. Such regions from which the playback signals are not obtained during high-speed playback is known from the playback speed, the manner of tracking and the like.

Figure 39B:
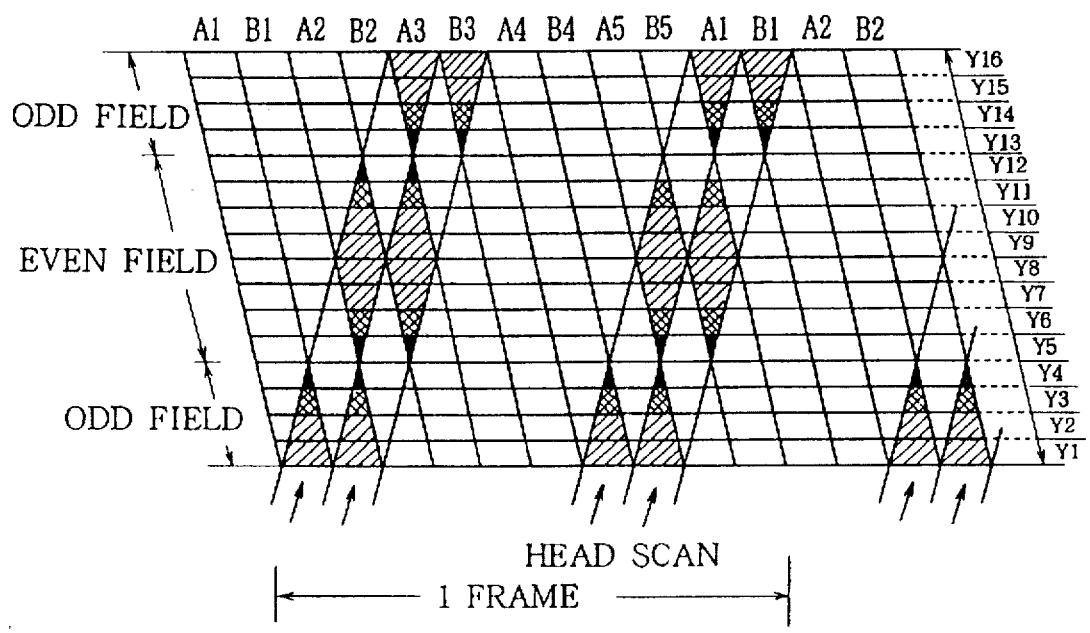
FIG. 39B shows the arrangement of data of the recording format generating blocks of FIG. 39A.

Let us assume that two-channel opposing heads are used and three-time speed playback is performed. FIG. 39B shows the track pattern and the traces of the rotary heads 8a and 8b. As illustrated, each of the tracks is divided into 16 regions Y1 to Y16 along the direction of the scanning by the head. It is seen from FIG. 39B that no playback signals are obtained from the regions Y4, Y5, Y12 and Y13, and little playback signals are obtained from the regions Y3, Y6, Y11 and Y14. It is assumed that if the rotary head scans more than half the width of the track, playback signals can be restored as correct data through error correction. In the example illustrated, the rotary head 8a or 8b scans less than half the width of the track at the regions Y3 to Y6 and Y11 to Y14, and the playback data of the recording format generating blocks recorded in these regions are not restored.

In this way, the recording format generating blocks of the peripheral portion of the screen, which are less prominent or objectionable to the viewer's eye are recorded in the regions of the tape from which playback signals are not obtained during high-speed playback. In this way, the quality of the high-speed playback picture is effectively improved.

Allocation of the regions may be such that data of the peripheral portion of the screen are first recorded in the regions Y4, Y5, Y12 and Y13, and if the regions Y4, Y5, Y12 and Y13 do not accommodate all the data of the peripheral portions, then the remainder are recorded in part or entirety of the regions Y4, Y5, Y12 and Y13.

Embodiment 27

In Embodiments 14 to 21 and 26, the recording format is generated for each field. The recording format may alternatively be generated for each frame.

Figures 40A, 40B:
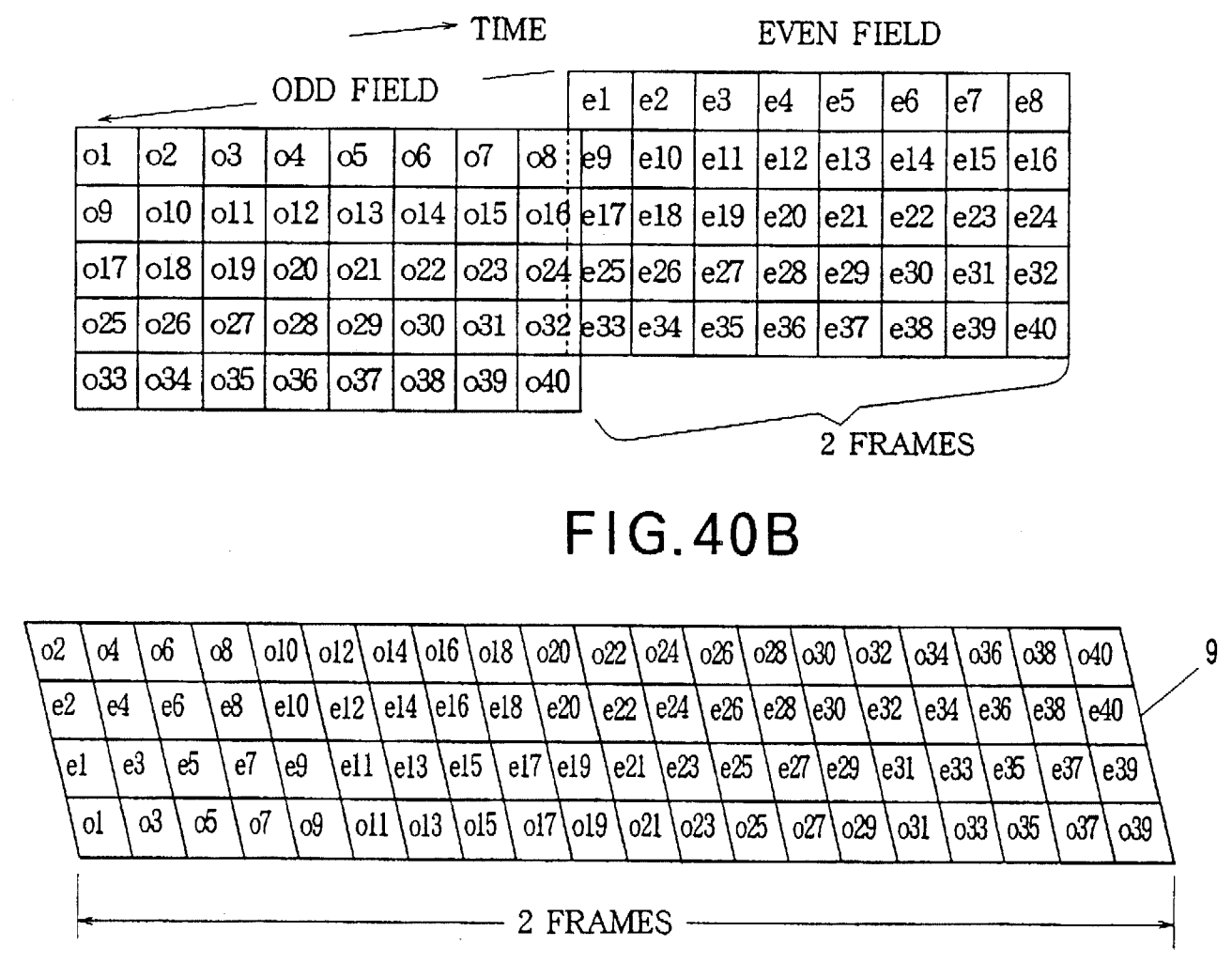

FIGS. 40A and 40B show an example of the manner of generating a recording format for each frame. FIG. 40A shows division of the video data of each frame into 40 recording format generating blocks, and numbering the recording Format generating blocks in the order of scanning on the screen. FIG. 40B shows disposition of the video data of the respective recording format generating blocks on the magnetic tape.

The manner of dividing each frame into the recording format generating blocks may be other than that illustrated.

The manner of forming the recording format generating blocks may be other than illustrated, and the arrangement of the odd frames and even frames may be reversed.

The data interleaving may be applied in generating the recording format, as explained in connection with Embodiments 18 and 19.

Embodiment 28

In Embodiments 14 to 17, 20 and 21, the recording format generating blocks at the same positions of the screen of each field are recorded on the same track. But the invention is not limited to such an arrangement.

Advantages

As has been described, according to one aspect of the invention, a magnetic recording/playback apparatus is so configured as to play back digital video signals recorded on helical tracks on a magnetic tape using at least two rotary heads, and the phase of the tracking of the rotary heads is offset by ½ track-pitch with reference to the tracking phase of the tracking during normal playback, and the tape travel speed during the high speed playback is set substantially at an even multiple of a normal playback speed. As a result, the amount of the video data which is played back per one scanning of the rotary head is increased, and the quality of the high-speed playback image is improved.

When the tracking is so controlled that the playback output from the central part along the longitudinal direction of the recording tracks are fully obtained, the amount of video data obtained per scanning of the rotary head is further increased, and the picture quality is further improved.

By providing an envelope detector (130) provided for detecting an envelope of the playback signal obtained by the rotary head, and controlling the tracking so as to maximize the output of the envelope detector means at the central part along the longitudinal direction of the track, even where the tracks are not straight due, for example, to the characteristics of the mechanical system, a maximum output is obtained at the central part of each track.

Forming the control circuit to permit selection of the speeds of the high-speed playback from a double speed and a six-time speed, and forming the tape travel and tracking controller to be responsive to a command from the control circuit to causes the tape to travel at a speed substantially twice or a six times the speed of the normal playback, will further increase the amount of video data played back per scanning of the rotary head.

According to another aspect of the invention, digital video data for a plurality of pixels is collected to form blocks, to thereby perform a high-efficiency coding, and is subjected to high-efficiency coding, and are divided into essential information and high-precision information. Further, the essential information is recorded at central regions along the longitudinal direction of tracks, and regions near upper and lower ends of the tracks. The high-precision information is recorded in intermediate regions positioned between the central region and the regions near upper and lower ends of the tracks. Thus, so that at the time of high-speed playback of a relatively low speed when the details of the picture are important, the high-precision information in the DCT blocks are also reproduced. Further, while at the time of high-speed playback of a relatively high speed, when the details of the picture do not matter much, the essential information alone is reproduced. Thus, so pictures of satisfactory quality are obtained in either situation.

According to a further aspect of the invention, the data are so arranged that the video data of one of two consecutive fields or frames are recorded in a central part of each recording track and the recording video data of the other of the two consecutive fields or frames are recorded at end parts of each track. Thus, so that during high-speed playback, the playback output of the odd and even fields or frames are from positions complementary to each other. Therefore, the contents of the field memories or frame memories are rewritten periodically and the resultant picture does not contain a fixed or unchanging part.

By separating the region of a track in which video data of a certain position in the screen of one of the two consecutive fields or frames and the region of a track in which video data of the certain position in the screen of the other of said two consecutive fields or frames by at least another region, the video data of the same positions within the screen of consecutive fields or frames are not the adjacent regions on the same track. Therefore, and the playback outputs during a high-speed playback of the odd and even fields or frames are of positions complementary to each other. Accordingly, and the contents of the field or frame memories are rewritten periodically and the resultant picture does not contain a fixed or unchanging part.

By arranging the video data in the order from one of the upper and lower edges to the other of said upper and lower edges of the tape in regions in the central region of each track, and in the order from the other of said upper and lower edges to the one of said upper and lower edges of the tape in regions at both end parts of each track, the playback outputs during a high-speed playback of the odd and even fields or frames are of positions complementary to each other. Therefore, the contents of the field or frame memories are rewritten periodically and the resultant picture does not contain a fixed or unchanging part.

By setting the tape speed during high-speed playback at an even multiple of a normal playback speed, the efficiency of data reproduction is improved.

By performing the tracking control during high-speed playback such that the tracking of the rotary heads is adjusted at or near the center of each track, the efficiency of data reproduction is improved.

By arranging the video data such that the video data of the two consecutive fields or frames are divided into a plurality of tracks, the video data for the same position on the screen of the two fields or frames are recorded on different tracks. Further, at least part of the data of two consecutive fields or frames are recorded in the same track, and the video data at the same position in the consecutive fields or frames are recorded in different tracks. Thus, the data is interleaved, and even when one of the heads clogs and is unable to pick up the video data, interpolation is conducted to obtain the lost data using the data of the other field or frame. The degradation in picture quality is thereby minimized.

By arranging the video data such that each track is divided into 2M (M being a positive integer) regions, and the video data of one of the two consecutive fields or frames are recorded in M of the 2M regions, and the video data of the other of the two consecutive fields or frames are recorded in the remaining M regions, the playback output during a high-speed playback of the odd and even fields or frames are of positions complementary to each other. Accordingly, the contents of the field or frame memories are rewritten periodically and the resultant picture does not contain a fixed or unchanging part.

What is claimed is:

1. A magnetic recording/playback apparatus comprising:
   first means for performing high-efficiency encoding by assimilating input digital video data for a plurality of pixels into blocks;
   second means for recording digital video data encoded by the first means onto a magnetic tape using at least two rotary leads;
   third means for playing back the recorded digital video data from the magnetic tape using the at least two rotary heads; and
   recording format generating means for dividing the high-efficiency encoded digital video data into essential information and high-precision information, and for generating a recording format for recording the essential information at central portions along a longitudinal direction of tracks of the magnetic tape and at portions near upper and lower ends of the tracks, and for recording the high-precision information at intermediate portions between the central portions and the portions near upper and lower ends of the tracks, the second means recording the essential and high-precision information onto the magnetic tape based upon the generated recording format, wherein the essential information includes DC, relatively low frequency AC, and mid-range frequency AC components of the digital video data and the high-precision information includes relatively high frequency AC components of the digital video data, and wherein the DC and relatively low frequency AC components of the digital video data are stored in a first relatively central location in at least one of the central, upper end or lower end portions of the tracks and mid-range frequency AC components of the digital video data are stored in a second relatively peripheral location in the same at least one of the central, upper end or lower end portions of the tracks.

2. The magnetic recording/playback apparatus of claim 1, further comprising:
   rotary speed control means for controlling a rotary speed of the at least one of the rotary heads;
   tape travel and tracking control means for controlling a speed of magnetic tape travel and for controlling a tracking phase at a beginning of tracking on the magnetic tape by the at least one rotary head; and
   a control circuit for selectively causing one of normal playback and high-speed playback, and for providing a ½ track-pitch offset command to said tape travel and tracking control means at a time of selectively caused high speed playback,
   said tape travel and tracking control means, responsive to said ½ track-pitch offset command, offsetting the lateral position of the at least one rotary head relative to the track by a ½ track-pitch from the lateral position of the rotary head relative to the track during normal playback, at a beginning of tracking on the magnetic tape.

3. The magnetic recording/playback apparatus of claim 1, wherein the third means plays back the essential and high-precision information of the recorded digital video data when operated at a first playback speed and plays back only the essential information of the recorded digital video data when operated at a second relatively faster playback speed.

4. The magnetic recording/playback apparatus of claim 3, wherein the third means plays back only a portion of the essential information of the recorded digital video data when operated at a third playback speed, relatively faster than the second playback speed.

5. The magnetic recording/playback apparatus of claim 1, wherein the third means plays back the essential information and high-precision information when operated at a first playback speed and plays back only the essential information when operated at a second relatively faster playback speed.

6. The magnetic recording/playback apparatus of claim 5, wherein the third means plays back only the DC and relatively low AC components of the essential information when operated at a third playback speed, relatively faster than the second playback speed.

7. A magnetic recording/playback apparatus comprising:
recording format generating means for dividing digital video data into essential information and non-essential information and for generating a recording format for recording the essential information on each of an area proximate an end portion and a central portion of one track on a magnetic tape and for recording the non-essential information in at least one portion of the same one track of magnetic tape between the area proximate an end portion and the central portion, wherein the essential information includes DC, relatively low frequency AC, and mid-range frequency AC components of the digital video data and the non-essential information includes relatively high frequency AC components of the digital video data, and wherein the DC and relatively low frequency AC components of the digital video data are stored in a first relatively central location in at least one of the areas proximate to an end portion or a central portion of one track and mid-range frequency AC components of the digital video data are stored in a second relatively peripheral location in the same at least one area proximate to an end portion or a central portion of the one track; and
recording means for recording the digital video data onto the magnetic tape based upon the generated recording format.

8. The magnetic recording/playback apparatus of claim 7, wherein the recording format generating means generates a recording format for recording essential information in each of two areas, each proximate an end portion, and a central portion of the one track on the magnetic tape.

9. The magnetic recording/playback apparatus of claim 7, further comprising:
reproducing means for reproducing the recorded essential and non-essential information at a first playback speed and for reproducing only recorded essential information at a second relatively faster playback speed.

10. The magnetic recording/playback apparatus of claim 9, wherein the reproducing means reproduces only a portion of the essential information at a third playback speed relatively faster than the second playback speed.

11. A magnetic recording/playback apparatus comprising:
first means for performing high-efficiency encoding by assimilating input digital video data for a plurality of pixels into blocks;
second means for recording digital video data encoded by the first means onto a magnetic tape using at least two rotary heads;
third means for playing back the recorded digital video data from the magnetic tape using the at least two rotary heads;
recording format generating means for dividing the high-efficiency encoded digital video data into essential information and high-precision information, and for generating a recording format for recording the essential information at central portions along a longitudinal direction of tracks of the magnetic tape and at portions near upper and lower ends of the tracks, and for recording the high-precision information at intermediate portions between the central portions and the portions near upper and lower ends of the tracks, the second means recording the essential and high-precision information onto the magnetic tape based upon the generated recording format;
rotary speed control means for controlling a rotary speed of the at least one of the rotary heads;
tape travel and tracking control means for controlling a speed of magnetic tape travel and for controlling a tracking phase at a beginning of tracking on the magnetic tape by the at least one rotary head; and
a control circuit for selectively causing either normal playback or one of a plurality of high-speed playback speeds, and for providing a same ½ track-pitch offset command to said tape travel and tracking control means upon selectively causing each of the plurality of high speed playback speeds,
said tape travel and tracking control means, responsive to said ½ track-pitch offset command, offsetting the lateral position of the at least one rotary head relative to the track by a ½ track-pitch from the lateral position of the rotary head relative to the track during normal playback, at a beginning of tracking on the magnetic tape.

12. The magnetic recording/playback apparatus of claim 11, wherein the third means plays back the essential and high-precision information of the recorded digital video data when operated at a first playback speed and plays back only the essential information of the recorded digital video data when operated at a second relatively faster playback speed.

13. The magnetic recording/playback apparatus of claim 12, wherein the third means plays back only a portion of the essential information of the recorded digital video data when operated at a third playback speed, relatively faster than the second playback speed.

14. The magnetic recording/playback apparatus of claim 11, wherein the recording format generating means further divides the essential information into relatively most important essential information and relatively less important essential information and generates the recording format for recording the relatively most important essential information in a central area, of each of the central portions and portions near the upper and lower ends of the tracks, between the relatively less important essential information.

15. The magnetic recording/playback apparatus of claim 14, wherein the third means plays back the essential information and high-precision information when operated at a first playback speed and plays back only the essential information when operated at a second relatively faster playback speed.

16. The magnetic recording/playback apparatus of claim 15, wherein the third means plays back only the most important essential information when operated at a third playback speed, relatively faster than the second playback speed.

17. A magnetic recording/playback apparatus comprising:

recording format generating means for dividing digital video data into essential information and non-essential information and for generating a recording format for recording the essential information on each of an area proximate an end portion and a central portion of one track on a magnetic tape and for recording the non-essential information in at least one portion of the same one track of magnetic tape between the area proximate an end portion and the central portion;

recording means for recording the digital video data onto the magnetic tape based upon the generated recording format using at least two rotary heads;

reproducing means for playing back the recorded digital data from the magnetic tape using the at least two rotary heads;

rotary speed control means for controlling a rotary speed of the at least one of the rotary heads;

tape travel and tracking control means for controlling a speed of magnetic tape travel and for controlling a tracking phase at a beginning of tracking on the magnetic tape by the at least one rotary head; and a control circuit for selectively causing either normal playback or one of a plurality of high-speed playback speeds, and for providing a same ½ track-pitch offset command to said tape travel and tracking control means upon selectively causing each of the plurality of high-speed playback speeds, said tape travel and tracking control means, responsive to said ½ track-pitch offset command, offsetting the lateral position of the at least one rotary head relative to the track by a ½ track-pitch from the lateral position of the rotary head relative to the track during normal playback, at a beginning of tracking on the magnetic tape.

18. The magnetic recording/playback apparatus of claim 17, wherein the essential information is further divided into a first category and a second category of essential information.

19. The magnetic recording/playback apparatus of claim 17, wherein the essential information includes DC, relatively low frequency AC, and mid range frequency AC components of the digital video data, and the non-essential information includes relatively high frequency AC components of the digital video data.

20. The magnetic recording/playback apparatus of claim 17, wherein the recording format generating means generates a recording format for recording essential information in each of two areas, each proximate an end portion, and a central portion of the one track on the magnetic tape.

* * * * *